United States Patent
Smith et al.

(10) Patent No.: US 10,511,456 B2
(45) Date of Patent: Dec. 17, 2019

(54) PRESENTING ACCESSORY GROUP CONTROLS

(71) Applicant: Apple Inc., Cupertino, CA (US)

(72) Inventors: Benjamin A. Smith, Oakland, CA (US); Reed Olsen, San Jose, CA (US); Kevin McLaughlin, Waikoloa, HI (US); Anush Nadathur, San Jose, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 15/275,329

(22) Filed: Sep. 23, 2016

(65) Prior Publication Data

US 2017/0359191 A1  Dec. 14, 2017

Related U.S. Application Data

(60) Provisional application No. 62/349,042, filed on Jun. 12, 2016.

(51) Int. Cl.
*H04L 12/28* (2006.01)
*G05B 15/02* (2006.01)

(52) U.S. Cl.
CPC .......... *H04L 12/2816* (2013.01); *G05B 15/02* (2013.01); *G05B 2219/2642* (2013.01)

(58) Field of Classification Search
CPC .............. H04L 12/281; H04L 12/2816; G05B 2219/2642; G05B 15/02
See application file for complete search history.

(56) References Cited

U.S. PATENT DOCUMENTS

| | | |
|---|---|---|
| 8,490,006 B1 | 7/2013 | Reeser et al. |
| 8,640,038 B1 | 1/2014 | Reeser et al. |
| 9,661,120 B1 | 5/2017 | Skeffington |
| 9,686,094 B2 | 6/2017 | Kim et al. |
| 2007/0073870 A1 | 3/2007 | Park et al. |
| 2007/0198663 A1 | 8/2007 | Helander |
| 2009/0179988 A1 | 7/2009 | Reibel et al. |
| 2010/0052843 A1 | 3/2010 | Cannistraro |

(Continued)

OTHER PUBLICATIONS

International Search Report and Written Opinion dated Aug. 28, 2017 in International Application No. PCT/US2017/033873. 14 pages.

(Continued)

*Primary Examiner* — Mohammad Ali
*Assistant Examiner* — Vincent W Chang
(74) *Attorney, Agent, or Firm* — Kilpatrick, Townsend & Stockton

(57) ABSTRACT

In some implementations, a computing device can automatically generate a service group. For example, accessories can be automatically grouped together based on various criteria (such as historical usage patterns). The accessories in the service group can be managed and/or controlled as if the accessories were a single accessory or entity. In some implementations, a computing device can intelligently select service group controls for presentation to the user so that the user can control the service group. For example, the computing device can select which service group controls to present and the order in which to present the controls based on features that are common among different accessories in the service group.

18 Claims, 36 Drawing Sheets

(56) References Cited

U.S. PATENT DOCUMENTS

| | | |
|---|---|---|
| 2010/0138007 A1 | 6/2010 | Clark et al. |
| 2012/0062734 A1 | 3/2012 | Mironichev et al. |
| 2012/0245752 A1 | 9/2012 | Borrett et al. |
| 2013/0113928 A1 | 5/2013 | Feldman |
| 2013/0226316 A1 | 8/2013 | Duchene et al. |
| 2014/0020635 A1 | 1/2014 | Sayers et al. |
| 2014/0244834 A1 | 2/2014 | Guedalia et al. |
| 2014/0129032 A1 | 5/2014 | Harris |
| 2014/0136481 A1 | 5/2014 | Quan et al. |
| 2014/0136484 A1 | 5/2014 | Beatty et al. |
| 2014/0267716 A1 | 9/2014 | Child et al. |
| 2015/0082225 A1 | 3/2015 | Shearer |
| 2015/0382436 A1 | 12/2015 | Kelly et al. |
| 2016/0043962 A1* | 2/2016 | Kim .................. H04L 67/02 709/224 |
| 2016/0055422 A1 | 2/2016 | Li |
| 2016/0070244 A1 | 3/2016 | Cipollo et al. |
| 2016/0073482 A1 | 3/2016 | Fok et al. |
| 2016/0091871 A1 | 3/2016 | Marti et al. |
| 2016/0104371 A1* | 4/2016 | Selfe .................. G08C 17/02 340/4.32 |
| 2016/0139575 A1 | 5/2016 | Funes |
| 2016/0173318 A1 | 6/2016 | Ha et al. |
| 2016/0182249 A1 | 6/2016 | Lea |
| 2016/0381475 A1 | 12/2016 | Starobin et al. |
| 2017/0034468 A1 | 2/2017 | Won et al. |
| 2017/0053210 A1 | 2/2017 | Duong |
| 2017/0097618 A1 | 4/2017 | Cipollo et al. |
| 2017/0127235 A1 | 5/2017 | Yagami et al. |
| 2017/0140285 A1 | 5/2017 | Dotan-Cohen et al. |
| 2017/0250835 A1 | 8/2017 | Kim et al. |
| 2017/0294115 A1* | 10/2017 | Goto .................. G05B 15/02 |
| 2018/0091381 A1 | 3/2018 | McLaughlin et al. |

OTHER PUBLICATIONS

Non-Final Office Action dated Apr. 6, 2018 in U.S. Appl. No. 15/275,340. 19 pages.

Non-Final Office Action dated Nov. 30, 2018 in U.S. Appl. No. 15/275,264. 30 pages.

Preliminary Amendment Report on Patentability dated Dec. 27, 2018 in International Application No. PCT/US2017/033873. 8 pages.

Non-Final Office Action dated Jul. 2, 2018 in U.S. Appl. No. 15/275,339. 13 pages.

Final Office Action dated Nov. 6, 2018 in U.S. Appl. No. 15/275,340. 17 pages.

Notice of Allowance dated Jan. 31, 2019 in U.S. Appl. No. 15/275,339. 7 pages.

Notice of Allowance dated Jul. 18, 2019 in U.S. Appl. No. 15/275,340. 5 pages.

Final Office Action dated Aug. 7, 2019 in U.S. Appl. No. 15/275,264. 20 pages.

Non-Final Office Action dated Feb. 25, 2019 in U.S. Appl. No. 15/626,819. 24 pages.

Advisory Action dated Mar. 14, 2019 in U.S. Appl. No. 15/275,340. 2 pages.

* cited by examiner

| Accessory ID | Label | Features |
|---|---|---|
| 902 | L Table Light | On/Off; Dimmer; Color |
| 904 | R Table Light | On/Off; Dimmer |
| 906 | Ceiling Fan | On/Off; Speed |
| 908 | Livingrm Spkr1 | On/Off; Volume |
| 910 | Livingrm Spkr2 | On/Off; Volume |
| 912 | F Doorbell | |
| 914 | F Door Lock | Lock/Unlock |
| 916 | F Door Cam | On/Off |
| 918 | F Door Light | On/Off |

FIG. 9

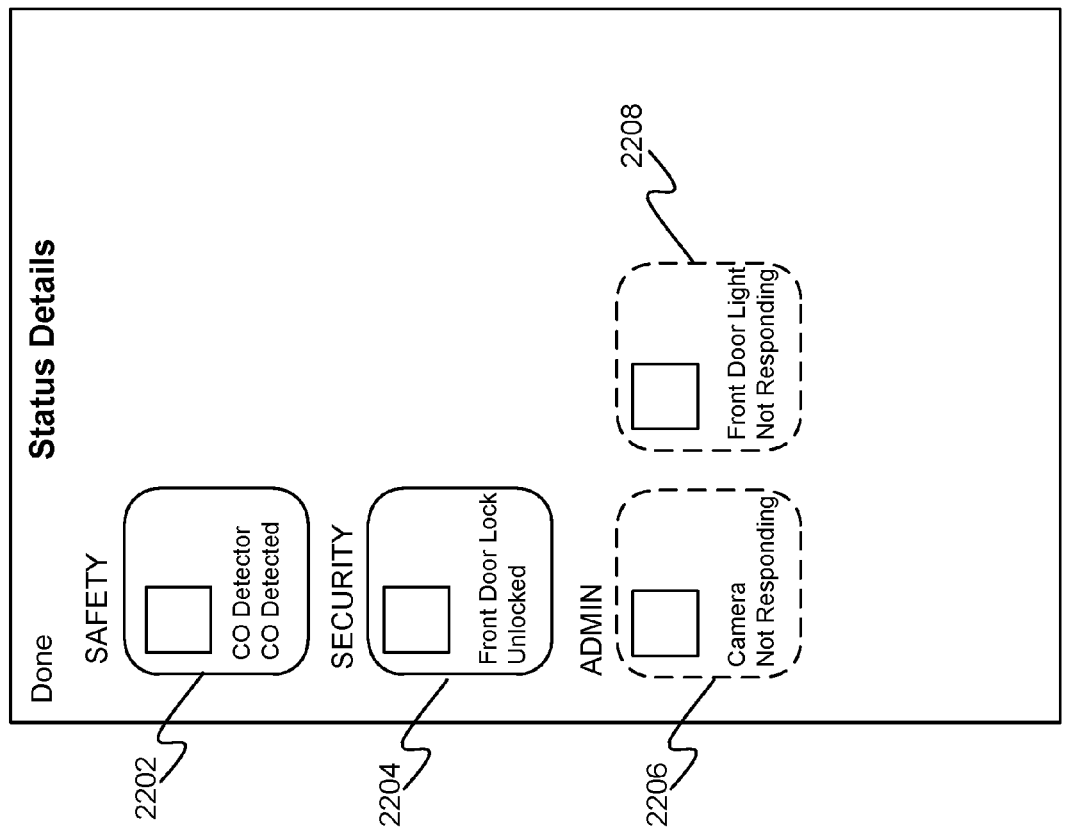

PRESENTING ACCESSORY GROUP CONTROLS

RELATED APPLICATION

This application claims the benefit of U.S. Provisional Application No. 62/349,042 filed on Jun. 12, 2016, and which is incorporated herein by reference.

TECHNICAL FIELD

The disclosure generally relates to controlling remote accessory devices using a computing device.

BACKGROUND

Home automation is becoming more and more popular. Starting with home clothes and dish washing machines years ago to the smart (e.g., computerized) fixtures, appliances, and accessories we have today, more and more people are automating their homes. With the increasing availability of smart accessories and appliances comes more ways to control these smart devices. For example, a software application on a user's mobile device can be configured to control individual accessories, appliances, and/or fixtures in the user's home or office. However, as accessories get smarter, they also provide a more varied feature set which makes controlling these devices more and more complicated for the user.

SUMMARY

In some implementations, a computing device can automatically generate a service group. For example, accessories can be automatically grouped together into a service group based on various criteria (such as historical usage patterns). The accessories in the service group can be managed and/or controlled as if the accessories were a single accessory or entity.

In some implementations, a computing device can intelligently select service group controls for presentation to the user so that the user can control the service group. For example, the computing device can select which service group controls to present and the order in which to present the controls based on features that are common among different accessories in the service group.

In some implementations, a computing device can automatically generate a scene. For example, a scene can be a collection of accessories and corresponding accessory states. When the scene is invoked, the computing device can cause the accessories associated with the scene to assume the corresponding accessory states. The computing device can automatically determine the accessories and/or corresponding accessory states for a scene based on historical patterns of use represented in historical accessory state data.

In some implementations, a computing device can present service group notifications. For example, the computing device can be configured with service groups that include related accessories. The accessories can be related based on user input defining a relationship between accessories. The accessories can be related based on a historical pattern of use. When the computing device receives a notification from an accessory in a service group, the computing device can present a notification representing the service group. In some implementations, the notification can present service group controls for adjusting the state of the accessories in the service group.

In some implementations, a computing device can present accessory state information. For example, the computing device can receive accessory state information from various accessories and present status items representing the current state of the accessories. The status items can be prioritized according to classifications assigned to accessories and/or accessory state information. The status items can be filtered based on a role assigned to the user of the computing device. Additional implementations and details are described in the paragraphs that follow.

In some implementations, a computing device can automatically select a home environment to present on a display of the computing device based on home environment location data collected or determined when adding an accessory to the home environment. The home environment location data can be determined in response to adding an accessory to a home environment in which the computing device is currently located. The identification of the home environment can be specified by the user when adding the accessory to the home environment. The computing device can determine the geographical location of the home environment based on the current geographical location of the computing device and generate a home environment geofence based on the geographical location of the home environment. The computing device can collect wireless access point identifiers, and/or accessory identifiers associated with the user selected home environment. The computing device can store the home environment identifier, geographical location, geofence, wireless access point identifier, and/or accessory identifiers as home environment location data that can be used to determine when the computing device is located within the home environment.

Particular implementations provide at least the following advantages. A user can control accessories as a group instead of being burdened with controlling accessories individually. Service groups can be automatically generated by the computing device, relieving the user of the burden of creating or specifying service groups. Accessories can be grouped even though individual accessories may have different features and the computing device can automatically determine and present controls common to all accessories so that the user is not burdened with controlling these heterogeneous accessories individually. Scenes can be automatically created that allow the user to recreate an environment with a single input. Service group notifications can allow the user to adjust the settings of a service group without having to invoke a separate application or graphical user interface.

Details of one or more implementations are set forth in the accompanying drawings and the description below. Other features, aspects, and potential advantages will be apparent from the description and drawings, and from the claims.

DESCRIPTION OF DRAWINGS

FIG. 9 illustrates an example database storing accessory control information.

FIG. 22 illustrates an example graphical user interface for presenting a detailed view of home application status data.

Like reference symbols in the various drawings indicate like elements.

DETAILED DESCRIPTION

Example Environment

Figure 1:
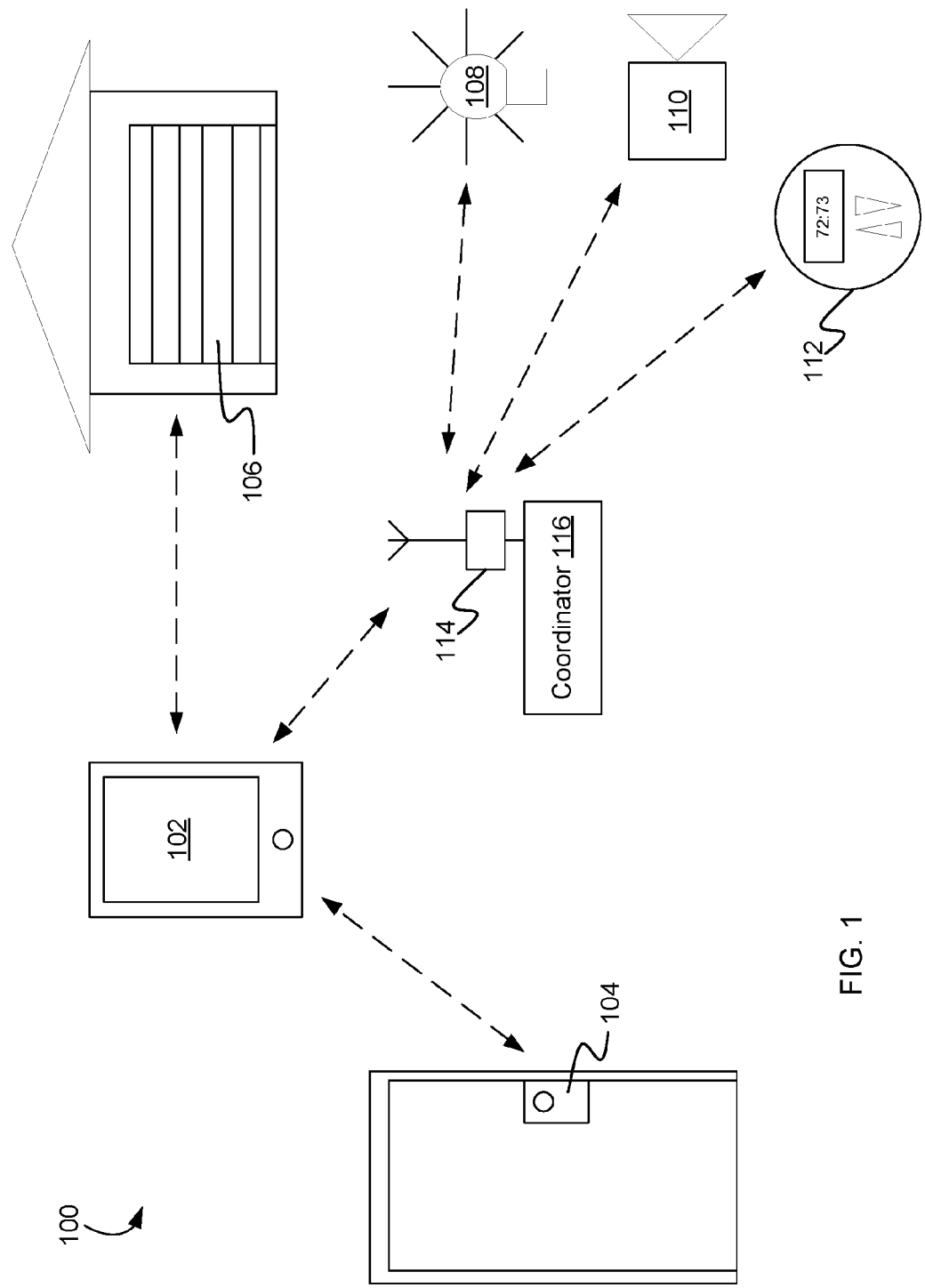
FIG. 1 shows an example home environment.

FIG. 1 shows an example home environment 100. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 104, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which, in addition to operating as a controller; can relay messages between other controllers and accessories. In some embodiments, coordinator 116 can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileges can be configured and controlled, for example, using techniques described below, and in above-referenced U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

In some embodiments, controllers (or their users) can be assigned various permissions or privileges in regard to the accessories. For example, an administrator (or "admin") privilege may be a highest level of privilege, and a controller with admin privileges may establish pairings with accessories and control any controllable characteristic of the accessory state. In some embodiments, admin privilege may be granted to the first controller to perform pair setup with a particular accessory, and after the admin controller performs pair setup, the accessory can decline to perform pair setup with any other controllers; instead, the admin controller can grant access to other controllers (or other users) by performing pair add. In some embodiments, the admin controller can specify privileges for each added controller (including admin privileges).

It will be appreciated that home environment 100 is illustrative and that variations and modifications are possible. Embodiments described herein can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive notifications of updates to) the service and/or its characteristics. Accordingly, protocols and communication processes used in embodiments of the technology described herein can be uniformly applied in any context with one or more controllers and one or more accessories, regardless of accessory function or controller form factor or specific interfaces.

Figure 2:
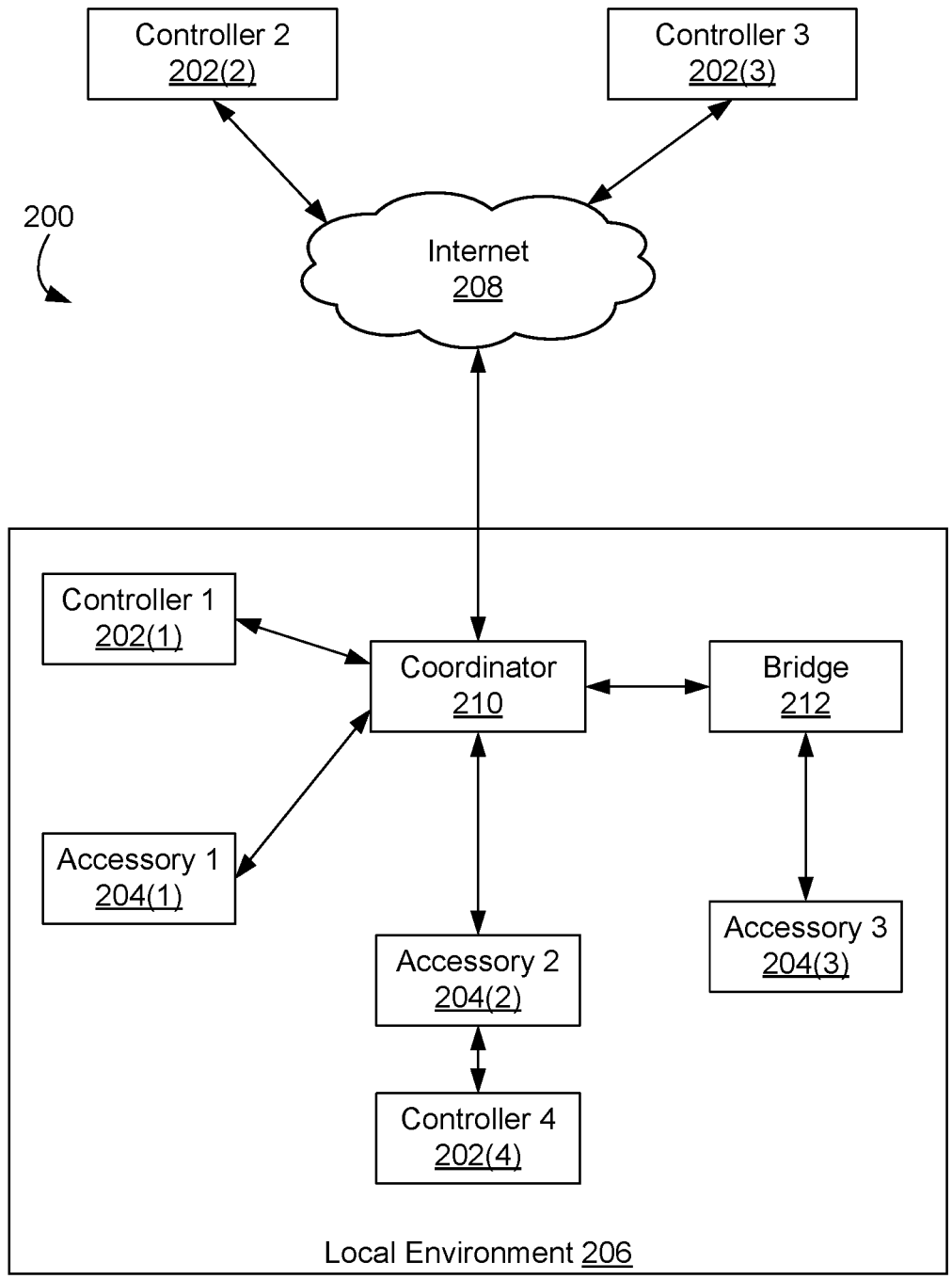
FIG. 2 shows an example network configuration.

FIG. 2 shows an example network configuration 200. Configuration 200 allows controllers 202 to communicate with accessories 204 located in local environment 206 (e.g., a home environment) via a coordinator 210. Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in U.S. application Ser. No. 14/725,891. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208 (although they can be if desired). In some embodiments, coordinator 210 can be connected to communication network 208 and can facilitate access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 and/or coordinator 210 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. application Ser. No. 14/725,891.

In some implementations of network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202 (1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2).

As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present technologies described herein incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

In some embodiments, the environment model for a given environment can be represented as a data object (or set of data objects). The environment model can be created on a controller associated with the environment (e.g., a controller with admin privileges) and can be shared with other controllers through a synchronization operation. For instance, controllers 202 of FIG. 2 can synchronize with a "master" copy of the environment model maintained by coordinator 210 (which can receive updates from controllers 202), or cloud-based synchronization (in which the master copy is stored in a location accessible via network 208 and automatically synchronized with the controllers and coordinator(s) associated with the environment) can be used. Accordingly, all controllers and coordinators associated with a given environment can have shared access to the same environment model.

Additional examples related to defining and using an environment model are described in above-referenced U.S. application Ser. No. 14/725,912. It is to be understood that an environment model is not required to make use of at least some of the features described below.

Figure 3:
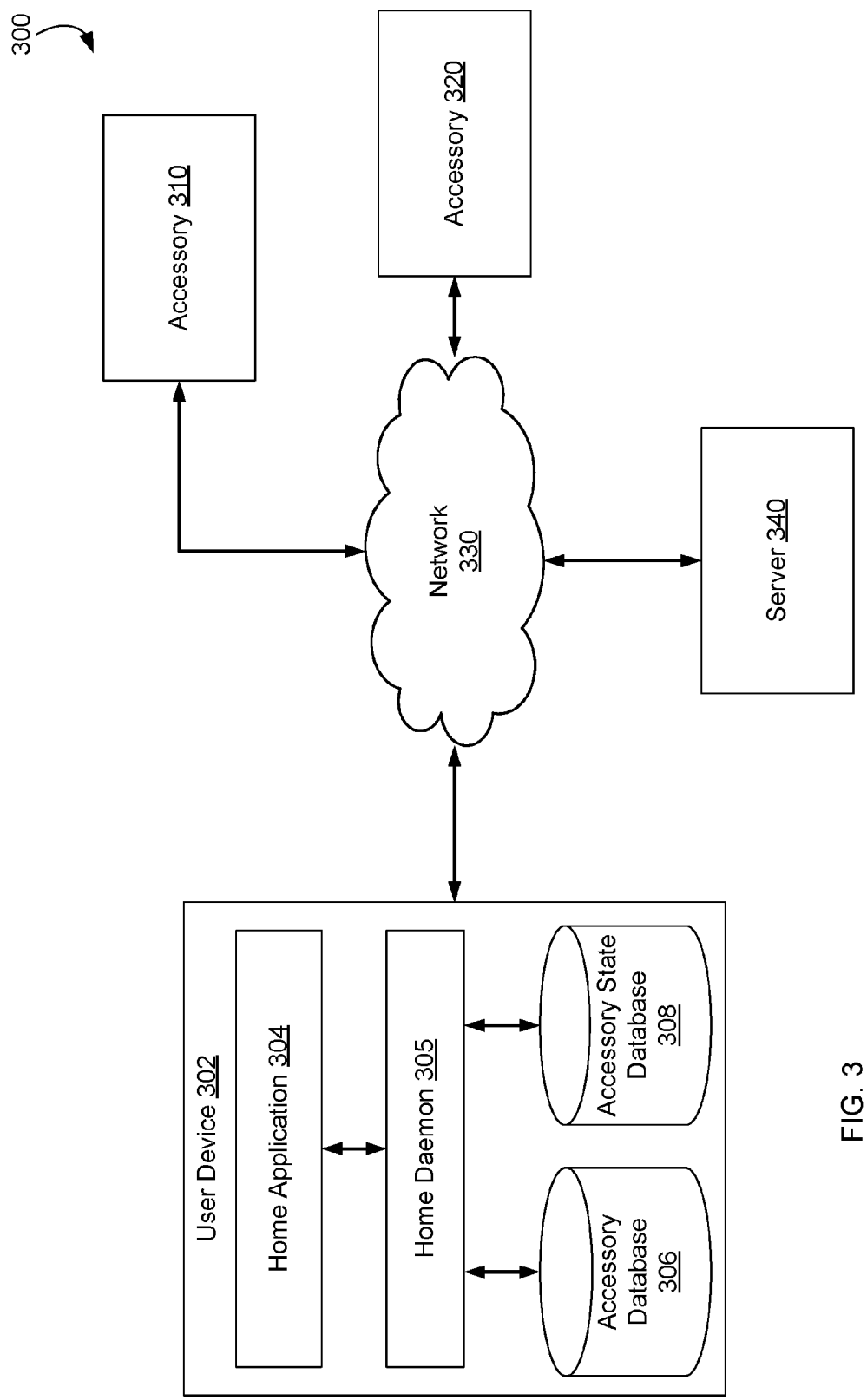
FIG. 3 is a block diagram of an example system for managing accessories.

FIG. 3 is a block diagram of an example system 300 for managing accessories. In some implementations, system 300 can include user device 302. User device 302 can, for example, correspond to one of controllers 202 (e.g., controller 202(1), controller 202(2), etc.), as described above with reference to FIG. 2. User device 302 can correspond to coordinator 210 (e.g., coordinator 116), as described above with reference to FIG. 2. For example, user device 302 can be a computing device, such as a laptop computer, tablet computer, smartphone, or wearable device (e.g., a smartwatch, smart glasses, smart clothing, etc.). User device 302 can be a computing device, such as a desktop computer, streaming media device, home media server, router, or other computing device. User device 302 can include, for example, home application 304. Home application 304 can be a standalone user application or a system application (e.g., tightly integrated with or part of the operating system) of user device 302.

In some implementations, user device 302 can include home daemon 305. For example, home daemon 305 can be a daemon or background process running on user device 302 that monitors the state of various accessories and/or coordinates communication between accessories and other user devices (e.g., other home applications), as described above and below. For example, in a coordinator device, home daemon 305 can serve as a router of messages from accessories to user devices (e.g., controllers), as described above. In some implementations, home daemon 305 can be configured to collect state information, configuration information, and/or feature information from various smart accessories and store the accessory information in the appropriate databases (e.g., accessory database 306, accessory state database 308, etc.). When home application 304 requires accessory information (e.g., state information, configuration information, feature information, accessory control information, etc.) for accessories managed by home application 304, home application 304 can request the accessory information from home daemon 305 and home daemon 305 can obtain the information from the appropriate databases (e.g., accessory database 306, accessory state database 308, etc.) or directly from the accessories, as described below. While many of the features disclosed herein are described as features of home application 304, the same or similar features can be performed by home daemon 305. For example, analysis of historical data, generation of new scenes, service groups, and other machine learning activities can be performed by home daemon 305. Home daemon 305 can then deliver the results of such analysis (e.g., new scenes, service groups, etc.) to home application 304 (e.g., on the same device, on a different device, etc.) for presentation to the user.

In some implementations, when user device 302 is configured as a controller (e.g., controller 202(1), controller 202(2)), user device 302 can include home application 304, home daemon 305, accessory database 306, and/or accessory state database 308. When user device 302 is configured as a coordinator (e.g., coordinator 116, coordinator 210), user device 302 may include a reduced feature set or different feature set and include home daemon 305, accessory database 306 and/or accessory state database 308. As described above, as a controller, user device 302 can act as both controller and coordinator using home application 304 and home daemon 305.

Home application 304 can be configured to manage and control accessories and accessory states. For example, when a user installs or configures an accessory (e.g., accessory 310, accessory 320) in the user's home, the smart accessory can broadcast a message (e.g., a Bluetooth signal) advertising the existence of the smart accessory. Home application 304 can receive the broadcast message and add the smart accessory to the accessories managed by home application 304. For example, home application 304 can receive state information from individual accessories (e.g., accessory 310, accessory 320, etc.) through network 330 (e.g., a WAN, LAN, WLAN, peer-to-peer Wi-Fi, Bluetooth, etc.) and present the state information to the user on a display of user device 302. Home application 304 can send commands (e.g., automatically and/or in response to user input) to change the current state of the individual accessories through network 330. Thus, home application 304 can turn on and off smart lights, lock and unlock smart locks, turn on and off cameras, receive alarms from smoke detectors, and manage other smart accessories and appliances throughout the user's home.

In some implementations, home application 304 can manage groups of accessories. For example, when managing a home environment, home application 304 can group accessories (e.g., accessory 310 and accessory 320, etc.) according to the rooms in the house where the accessories are located, as described above. Thus, a user can interact with home application 304 to control all of the accessories in a room as a group. For example, a single user input to home application 304 can cause home application 304 to send a command to each accessory (e.g., accessory 310, accessory 320, etc.) in an accessory group (e.g., service group) through network 330 to change the current state (e.g., turn on, turn off) of all of the accessories assigned to a room.

In some implementations, home application 304 can group accessories based on function, classification, or category. For example, accessories related to external security (e.g. external lights, door locks, etc.) can be grouped together even though the accessories are not located in the same room. In some implementations, these service groups can be generated by home application 304 in response to user input assigning accessories to specific groups (e.g., to rooms, to functional categories, etc.). For example, the user can apply labels (e.g., room names, categories, etc.) to accessories and home application 304 can assign the accessories to service groups based on a set of rules for processing the labels assigned to the accessories. In some implementations, home application 304 can automatically group accessories according to various criteria, as described further below. In some implementations, home application 304 can group accessories based on a user-defined grouping. In some implementations, home application 304 can group accessories based on related uses. For example, home application 304 can learn, based on historical accessory state change data, which accessories the user typically uses together and/or what settings or states the user specifies for the accessories and generate service groups and/or scenes based on the learned user behavior, as described in detail below. As described herein, home daemon 305 can perform the same or similar operations as home application 304. When home daemon 305 generates accessory groups (e.g., service groups), home daemon 305 can distribute the generated accessory group to home application 304 on the same user device 302 or other (e.g., remote) user devices 302 for presentation to the user.

In some implementations, system 300 can include accessory 310. For example, accessory 310 can correspond to one of accessories 204 (e.g., accessory 204(1)) of FIG. 2. As described above, accessory 310 can include logic (e.g., software) and hardware (e.g., integrated circuits, radio frequency transmitters, memory, etc.) that cause accessory 310 to determine its current state and report its current state to user device 302 through network 330. Accessory 310 can include logic and hardware that cause accessory 310 to receive commands from user device 302 through network 330 that cause accessory 310 to change its current state (e.g., turn on/off, adjust volume, change speed, etc.). For example, accessory 310 can include lights, locks, doorbells, appliances, smoke detectors, carbon monoxide detectors, motion detectors, blinds, garage door openers, and/or other electrical devices that might be in a home, workplace, or other environment.

In some implementations, system 300 can include accessory 320. For example, accessory 310 can correspond to one of accessories 204 (e.g., accessory 204(2)) of FIG. 2. For example, accessory 320 can include the same or similar features as accessory 310. Accessory 320 can, for example, be the same type of device as accessory 310. Accessory 320 can be a different type of device (e.g., a fan vs. a light) and have different features (e.g., fan speed vs. light color) than accessory 310. However, both accessory 310 and accessory 320 can be smart accessories that can communicate with and be managed by home application 304.

In some implementations, user device 302 can include accessory database 306. For example, accessory database 306 can include accessory configuration information for accessories (e.g., accessory 310, accessory 320) managed by user device 302. Home application 304 and/or home daemon 305 can, for example, obtain accessory configuration information (e.g., features, APIs, controls, commands, etc.) from accessory 310 when home application 304 and/or home daemon 305 connects to accessory 310 through network 330. For example, accessory 310 can send its configuration information to home application 304 upon establishing a connection to home application 304 and/or home daemon 305 through network 330. Accessory 310 can send its configuration information to home application 304 and/or home daemon 305 in response to a request for configuration information from home application 304 and/or home daemon 305.

In some implementations, home application 304 and/or home daemon 305 can obtain accessory configuration information from a network service (e.g., server 340) that has configuration information for accessory 310. For example, when home application 304 and/or home daemon 305 connects to accessory 310, home application 304 and/or home daemon 305 can receive an accessory identifier (e.g., make, model, serial number, etc.) from accessory 310. Home application 304 and/or home daemon 305 can send the accessory identifier to server 340 in a request for accessory configuration information. Server 340 (e.g., a server for the accessory vendor) can obtain the configuration information associated with accessory 310 (e.g., from the vendor's database) based on the accessory identifier received from home application 304 and/or home daemon 305. Server 340 can send the configuration information for the identified accessory to home application 304 and/or home daemon 305 on user device 302 through network 330. Home application 304 and/or home daemon 305 can store the accessory configuration information in accessory database 306.

Monitoring Accessory States

Figure 4:
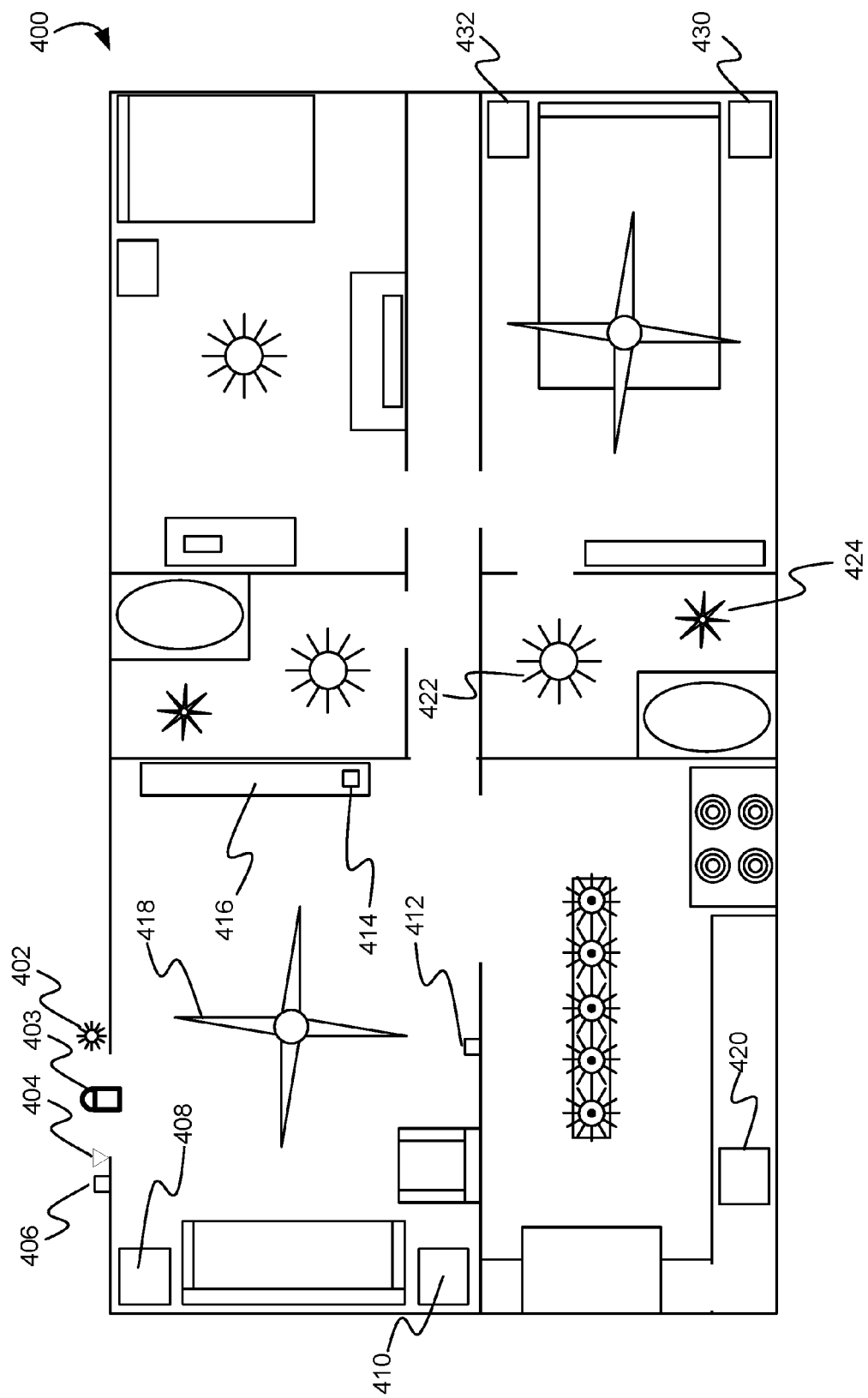
FIG. 4 is an illustration of an example house having various smart accessories.

FIG. 4 is an illustration of an example home environment 400 having various smart accessories 402-432. While the description of the technologies described herein are described with reference to a home or residence, a person of ordinary skill in the art will understand that the features, processes, algorithms, and mechanisms implemented by these technologies can be easily applied to other contexts such as an office, a warehouse, a garage, or other building.

In some implementations, home environment 400 can be configured with smart accessories 402-432. For example, smart accessories 402-432 can correspond to accessories 310 and/or 320 of FIG. 3. Smart accessories 402-432 can be managed and/or controlled by home application 304 and/or home daemon 305 on user device 302, as described herein.

In an example scenario (e.g., scenario 'A'), at the front entrance (e.g. front door) of home environment 400, the owner (i.e., the user of user device 302) of home environment 400 has installed an external light 402, an external camera 404, and an external doorbell 406. When a visitor rings doorbell 406, doorbell 406 can send a status message to home application 304 on user device 302 indicating that someone manipulated (e.g., pressed a button) doorbell 406 to cause doorbell 406 to ring. In response to receiving the message, home application 304 can present a notification on the display of user device 302 notifying the user that doorbell 406 has been rung. The user can then provide input to home application 304 to turn on external light 402 and camera 404 so that the user can view the person at the door using a video feed from camera 404 presented on the display of user device 302. The user may unlock the door using door lock 403 when the user knows the visitor and wants the visitor to enter home environment 400.

In another example scenario (e.g., scenario 'B'), the living room of home environment 400 can include lamp 408 and lamp 410. For example, lamp 408 (e.g., a light bulb, light fixture, lamp, etc.) can be an accessory (e.g. accessory 310) that has various features. Lamp 408 may, for example, simply turn on and off like a normal light. Lamp 408 may be able to illuminate different colors. Lamp 408 may be dimmable such that lamp 408 can illuminate at different brightness levels. Lamp 410, for example, can have similar or different features than lamp 408. For example, lamp 408 may only be able to turn on and off, while lamp 410 might have a dimmer and color selection features. When the user enters the living room to watch television (e.g., smart television 416 and/or streaming media device 414), read a book, or play a game, the user can turn on (e.g., when watching television) or off (e.g., when reading or playing a game) lamps 408 and 410. The user can turn on and off lamps 408 and lamp 410 using home application 304 or manually by interacting with each lamp individually.

As another example scenario (e.g., scenario 'C'), the living room of home environment 400 can include air conditioner controller 412 (e.g., a smart thermostat), streaming media device 414, smart television 416, and/or smart fan 418. When the user watches television in the living room, the user may turn on smart television 416, streaming media device 414, fan 418, and turn on the home air conditioner using controller 412 to make the room nice and cool for watching television. The user can turn on these accessories manually using switches on the accessories and/or typical remote controls. The user can turn on these accessories using home application 304 on user device 302. When the user is finished watching television, the user can turn off these accessories manually using switches on the accessories and/or typical remote controls. The user can turn off these accessories using home application 304 on user device 302.

As another example scenario (e.g., scenario 'D'), in a bedroom of home environment 400 the user may have installed smart lamps 432 and 434 next to the user's bed. The user's morning routine might be that the user turns on lamp 432 and/or lamp 434 and goes to the kitchen and turns on smart coffee maker 420 before going to the bathroom and turning on smart light 422 and smart fan 424 before taking a shower. The user can turn on each of these accessories manually and individually by interacting physically with each device. The user can turn on each of these accessories using home application 304 on user device 302.

When the user interacts, manipulates, or changes the state of the accessories (e.g., as described in the scenarios above), each accessory can report a state change event that identifies its new state (e.g., now current state) to home application 304 and/or home daemon 305 on user device 302. Home application 304 and/or home daemon 305 can store the state change event information (e.g., accessory state information) received from the accessories in accessory state database 308. For example, accessory state database 308 can store for each state change event an accessory identifier, a timestamp indicating when the event occurred, and/or the new state for the accessory. Thus, accessory state database 308 can store a history of accessory state changes over time.

In some implementations, accessories (e.g., accessory 310) can report other state information to home application 304 and/or home daemon 305. For example, accessory 310 can send error state information to home application 304 and/or home daemon 305. For example, accessory 310 can determine a problem with the power supply (e.g., battery level is low, external power disconnected, etc.) for accessory 310 and report the power supply problem to home application 304 and/or home daemon 305. Accessory 310 can determine a problem with the configuration of accessory 310 (e.g., the firmware or software is out of date) and report the configuration problem to home application 304 and/or home daemon 305. Accessory 310 can determine a security problem (e.g., an unauthorized user attempted to access the accessory) and report the security problem to home application 304 and/or home daemon 305. As described above, when home application 304 and/or home daemon 305 receives information describing a state change event, home application 304 can store the state change event data in accessory state database 308.

Automatically Determining Related Accessories

In some implementations, home application 304 can use the historical accessory state information to determine patterns of use and determine relationships between accessories based on the historical patterns of use. For example, in scenario 'A' described above, the user uses doorbell 406, external light 402, camera 404, and/or lock 403 within a short period of time of each other to determine who rang the doorbell and/or to let the visitor in home environment 400. Because these accessories are reporting their states and/or state changes to home application 304 and/or home daemon 305, accessory state database 308 can include state change entries for light 402, lock 403, camera 404, and/or doorbell 406 indicating that all of these accessories change state within a short period of time. For example, the accessory state change entries can include an identifier for the accessory, a timestamp for when the state change occurred, and a description of the state change (e.g., on, off, locked, unlocked, etc.). Home application 304 can compare the timestamps for entries in database 308 to determine that the each of these accessories change state at about the same time (e.g., within a threshold period of time). Based on the timing of the accessory state change entries in database 308, home application 304 can determine a historical pattern of use that indicates that light 402, lock 403, camera 404, and/or doorbell 406 are typically used together and are, therefore, related.

In some implementations, home application 304 can determine that accessories are related based on metadata associated with the accessory. For example, accessories can be assigned to rooms specified by the user. Home application 304 can use these room labels (e.g., living room, family room, bedroom, etc.) to automatically determine which accessories are related. For example, home application 304 can determine that accessories that have the same room label are related. Other accessory metadata (e.g., accessory type, accessory classification, accessory features, etc.) can be used by home application 304 to automatically determine which accessories are related.

Similarly, in scenario 'B' described above, the user uses lamp 408 and lamp 410 within a short period of time of each other to set up the living room to watch television or read a book. Because these accessories are reporting their states and/or state changes to home application 304 and/or home daemon 305, accessory state database 308 can include state change entries for lamp 408 and lamp 410 indicating that these accessories change state within a short period of time of each other. For example, the accessory state change entries can include an identifier for the accessory, a timestamp for when the state change occurred, and a description of the state change (e.g., on, off, dimmer level, light color, etc.). Home application 304 can compare the timestamps for entries in database 308 to determine that each of these accessories changes states at about the same time (e.g., within a threshold period of time). Based on the timing of the accessory state change entries in database 308, home application 304 can determine a historical pattern of use that indicates that lamp 408 and lamp 410 are typically used together and are, therefore, related.

In scenario 'C' described above, the user uses air conditioner controller 412, streaming media device 414, smart television 416, and/or smart fan 418 within a short period of time of each other to set up the living room to watch television. Because these accessories are reporting their states and/or state changes to home application 304 and/or home daemon 305, accessory state database 308 can include state change entries for air conditioner controller 412, streaming media device 414, smart television 416, and smart fan 418 indicating that these accessories change state within a short period of time of each other. For example, the accessory state change entries for each accessory can include an identifier for the accessory, a timestamp for when the state change occurred, and a description of the state change (e.g., on, off, television channel, fan speed, streaming media source, etc.). Home application 304 can compare the timestamps for entries in database 308 to determine that each of these accessories changes states at about the same time (e.g., within a threshold period of time). Based on the timing of the accessory state change entries in database 308, home application 304 can determine a historical pattern of use that indicates that air conditioner controller 412, streaming media device 414, smart television 416, and smart fan 418 are typically used together and are, therefore, related.

In scenario 'D' described above, the user uses smart lamp 432, smart lamp 434, coffee maker 420, smart light 422 and smart fan 424 within a short period of time of each other as part of the user's morning routine. Because these accessories are reporting their states and/or state changes to home application 304 and/or home daemon 305, accessory state database 308 can include state change entries for smart lamp 432, smart lamp 434, coffee maker 420, smart light 422 and smart fan 424 indicating that these accessories change state within a short period of time of each other. For example, the accessory state change entries for each accessory can include an identifier for the accessory, a timestamp for when the state change occurred, and a description of the state change (e.g., on, off, coffee maker setting, etc.). Home application 304 can compare the timestamps for entries in database 308 to determine that each of these accessories changes states at about the same time (e.g., within a threshold period of time). Based on the timing of the accessory state change entries in database 308, home application 304 can determine a historical pattern of use that indicates that smart lamp 432, smart lamp 434, coffee maker 420, smart light 422 and smart fan 424 are typically used together and are, therefore, related.

Automatically Generating Service Groups

In some implementations, home application 304 can automatically generate service groups based on related accessories. For example, when home application 304 determines that accessories are related, as described above, home application 304 can automatically create a service group that includes the related accessories. For example, home application 304 can create a service group (e.g., "Front Door Security") that includes light 402, lock 403, camera 404, and/or doorbell 406, as described in scenario 'A' above. Home application 304 can automatically create a service group (e.g., "Living Room Lights") that includes lamp 408 and lamp 410, as described in scenario 'B' above. Home application 304 can automatically create a service group (e.g., "Living Room Entertainment") that includes air conditioner controller 412, streaming media device 414, smart television 416, and smart fan 418, as described in scenario 'C' above. Home application 304 can automatically create a service group (e.g., "Wake Up") that includes smart lamp 432, smart lamp 434, coffee maker 420, smart light 422 and smart fan 424, as described in scenario 'D' above.

In some implementations, home application 304 can manage accessories in a service group as a collective (e.g., as a single entity). For example, even though a service group may include multiple accessories, home application can provide a group control that allows the user to adjust the settings of multiple accessories in a service group with a single input. Similarly, notifications generated by an accessory in a service group can be treated and/or presented as a service group notification rather than an individual accessory notification. By combining accessories into a service group, the user can more easily find, control, and interact with accessories to adjust or control the user's environment.

Automatically Generating Scenes

In some implementations, home application 304 can automatically generate scenes based on related accessories.

For example, while a service group provides group controls for the user to specify settings for the service group, a scene is configured with settings so that when a user invokes or selects a scene home application 304 automatically adjusts the state of the accessories in the scene to match the configured settings for the scene. For example, when creating a scene, home application 304 can determine that accessories are related based not only on timing, as described above, but also based on the states of the related accessories. For example, home application 304 can determine a pattern of use where accessories are used at about the same time and the settings are the same in each instance of the pattern of use over time.

For example, in scenario 'A' above, when doorbell 406 rings, the user turns on both light 402 and camera 404. Home application 304 can create scene (e.g., scene 'A') that includes light 402 and camera 404 because database 308 will have historical state data that indicates a historical pattern of use that includes turning on light 402 and camera 404 at about the same time. Home application 304 can configure scene 'A' so that when the user invokes or selects scene 'A', home application 304 will cause light 402 and camera 404 to turn on.

As another example, in scenario 'C' above, the user may set air conditioner controller 412 to 60 degrees, set smart fan 418 to medium speed, turn on streaming media device 414, and turn on smart television 416 and set the television to the input for streaming media device 414. Home application 304 can create scene (e.g., scene 'C') that includes air conditioner controller 412, smart fan 418, streaming media device 414, and smart television 416 because database 308 will have historical state data that indicates a historical pattern of use that includes changing the setting of air conditioner controller 412 to 60 degrees, changing the setting of smart fan 418 to medium speed, turning on streaming media device 414, and turning on smart television 416 and setting the input to the input corresponding to streaming media device 414 at about the same time. Home application 304 can configure scene 'C' so that when the user invokes or selects scene 'C', home application 304 will set air conditioner controller 412 to 60 degrees, set smart fan 418 to medium speed, turn on streaming media device 414, and turn on smart television 416 and set the television to the input for streaming media device 414.

Thus, home application 304 can automatically generate scenes that recreate a previous state of related accessories that are typically used or adjusted at about the same time. Stated differently, home application 304 can automatically generate a scene based on a historical pattern of use that is based not only on which accessories are used within a short period of time (e.g., 1 minute, 3 minutes, 7 minutes, etc.) of each other but also the settings of each accessory when the accessories are used together.

Defining a Service Group

Figure 5:
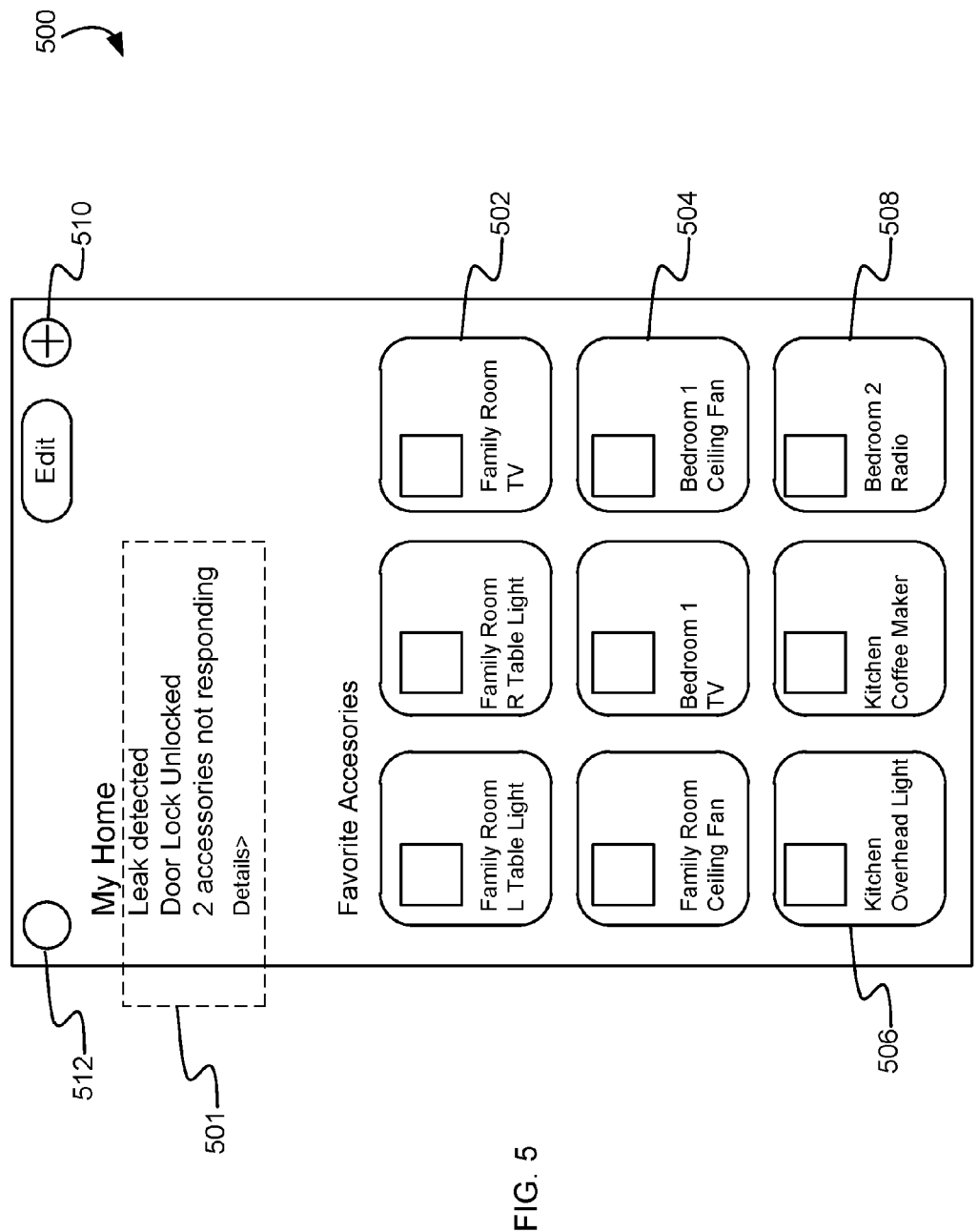
FIG. 5 is an example graphical user interface presented by an home application.

FIG. 5 is an example graphical user interface 500 presented by home application 304. For example, graphical user interface (GUI) 500 can be the initial graphical interface (e.g., home screen, default GUI, etc.) presented when home application 304 is invoked on user device 302. GUI 500 can be presented on a display of user device 302, for example. GUI 500 can be an interface for managing accessories within a home, office, or other building. Home application 304 can be configured to manage accessories within different homes, offices, buildings, etc., and the user can provide input to home application 304 to switch between buildings to view the accessories, service groups, scenes, etc., configured for each building. The descriptions that follow will describe various implementations, features, processes, and graphical user interfaces of home application 304 with respect to the user's home (e.g., labeled "My Home"), however the implementations described herein can be applied to any building, not just the user's home.

In some implementations, GUI 500 can include status element 501. For example, status element 501 can present accessory status data reported by the various accessories (e.g., accessory 310, accessory 320) connected to (e.g., registered with, paired with, etc.) home application 304, as described above. Status element 501 can present accessory status data as determined by home application 304. For example, home application 304 may determine that accessory 320 is unreachable or unresponsive when the connection between home application 304 and accessory 320 is broken (e.g., the network is unavailable, the accessory has lost power, etc.). Status element 501 can provide the user a quick view of the current status of the user's home accessories. Status element 501 is described in further detail below in reference to FIG. 21A and FIG. 21B.

In some implementations, GUI 500 can include graphical elements 502-508 representing accessories that have been paired with home application 304. For example, if home application 304 has been configured to communicate with or has previously established a connection with an accessory, the accessory can be represented on GUI 500. However, because of the limited display space available on most mobile devices, GUI 500 may only display accessories that the user has designated as favorites. If an accessory is currently connected to home application 304, the corresponding graphical element (e.g., graphical element 502) can present a full, bright color representation of the accessory. If an accessory is not current connected to home application 304, the corresponding graphical element can present a subdued, greyed, or otherwise diminished representation of the accessory.

In some implementations, graphical elements 502-508 can appear as tiles that include information (e.g., accessory type, location, status, etc.) describing the corresponding accessory. For example, graphical element 502 can represent and describe a television (e.g., smart television 416) that is located in the user's family room. Graphical element 504 can represent and describe a ceiling fan that is located in the user's bedroom. Graphical element 506 can represent and describe an overhead light that is located in the user's kitchen. Graphical element 508 can represent and describe a radio that is located in the user's bedroom. The user can select (e.g., tap) any of the tiles to turn on and off (e.g., toggle back and forth) or cycle through settings (e.g., heat, cool, off, etc.) of the corresponding accessory. The user can select (e.g., touch and hold, apply pressure, etc.) any of the tiles to cause home application 304 to present a detailed view (not shown) of the corresponding accessory, including presenting any additional controls the user can select to manipulate the settings of the corresponding accessory. In some implementations, GUI 500 can include graphical element 510 for adding an accessory, creating a new service group, and/or creating a new scene.

In some implementations, GUI 500 can include graphical element 512 for selecting a home environment to present on GUI 500. For example, a user may have different home environments configured in home application 304. The user may have a primary home environment, a vacation home environment, an office environment, etc. Each one of these home environments can be configured with smart accessories and managed by home application 304, as described herein. As depicted in FIG. 5, home application 304 is currently presenting accessories and status information for the user's primary home environment labeled "My Home." However, the user can select graphical element 512 to cause home application 304 to present or represent a different home environment on GUI 500, as described further below with respect to FIG. 23.

Figure 6:
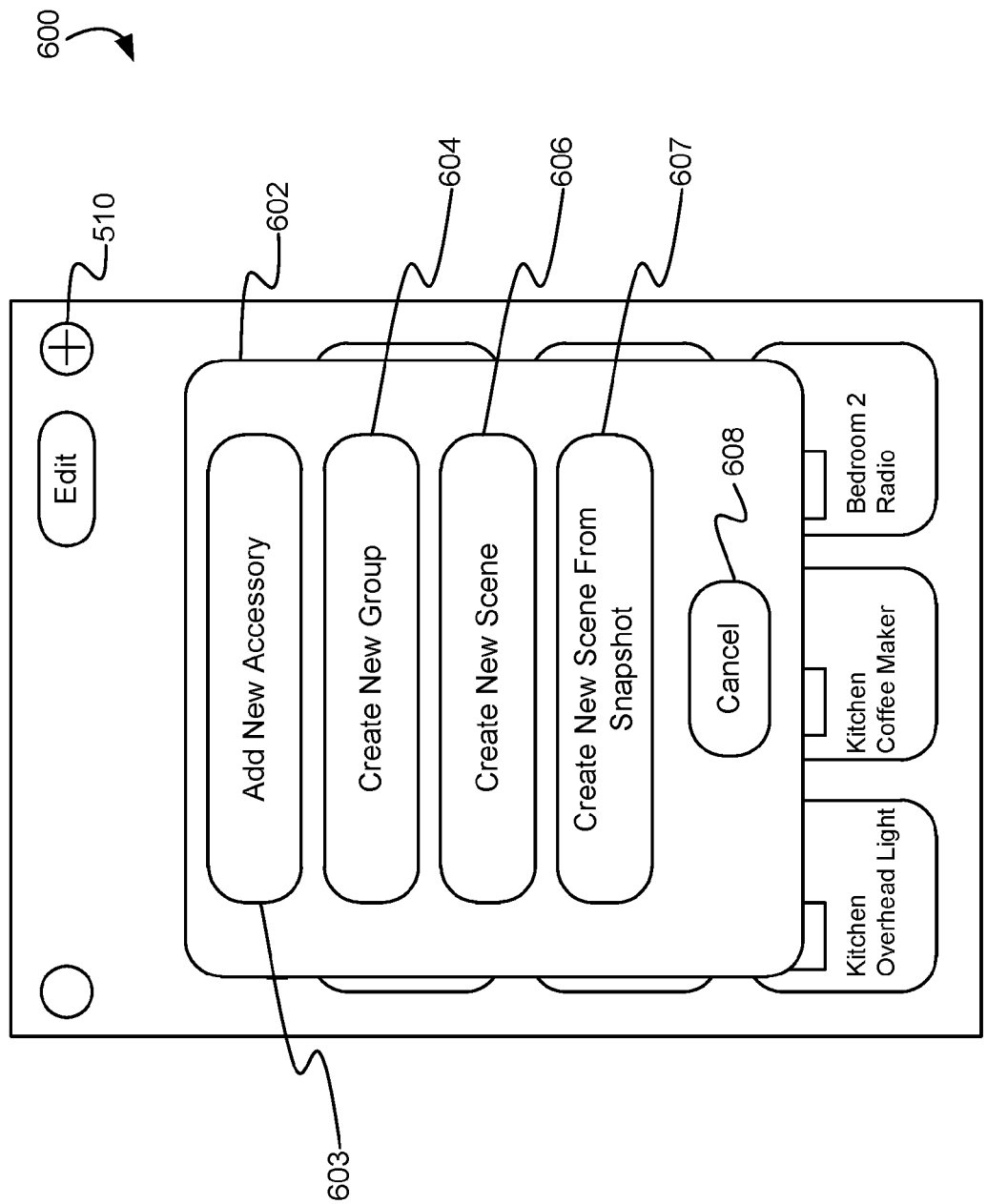
FIG. 6 illustrates an example graphical user interface for adding an accessory, creating a new service group, and/or creating a new scene.

FIG. 6 illustrates an example graphical user interface 600 for adding an accessory, creating a new service group, and/or creating a new scene. For example, a user can select graphical element 510 of FIG. 5 to invoke graphical element 602 (e.g., a menu, options window, etc.). Graphical element 602 can include graphical element 604 (e.g., a button) for creating a new service group. Graphical element 602 can include graphical element 606 for creating a new scene. Graphical element 602 can include graphical element 608 that when selected closes, removes, or hides graphical element 602.

Figure 7:
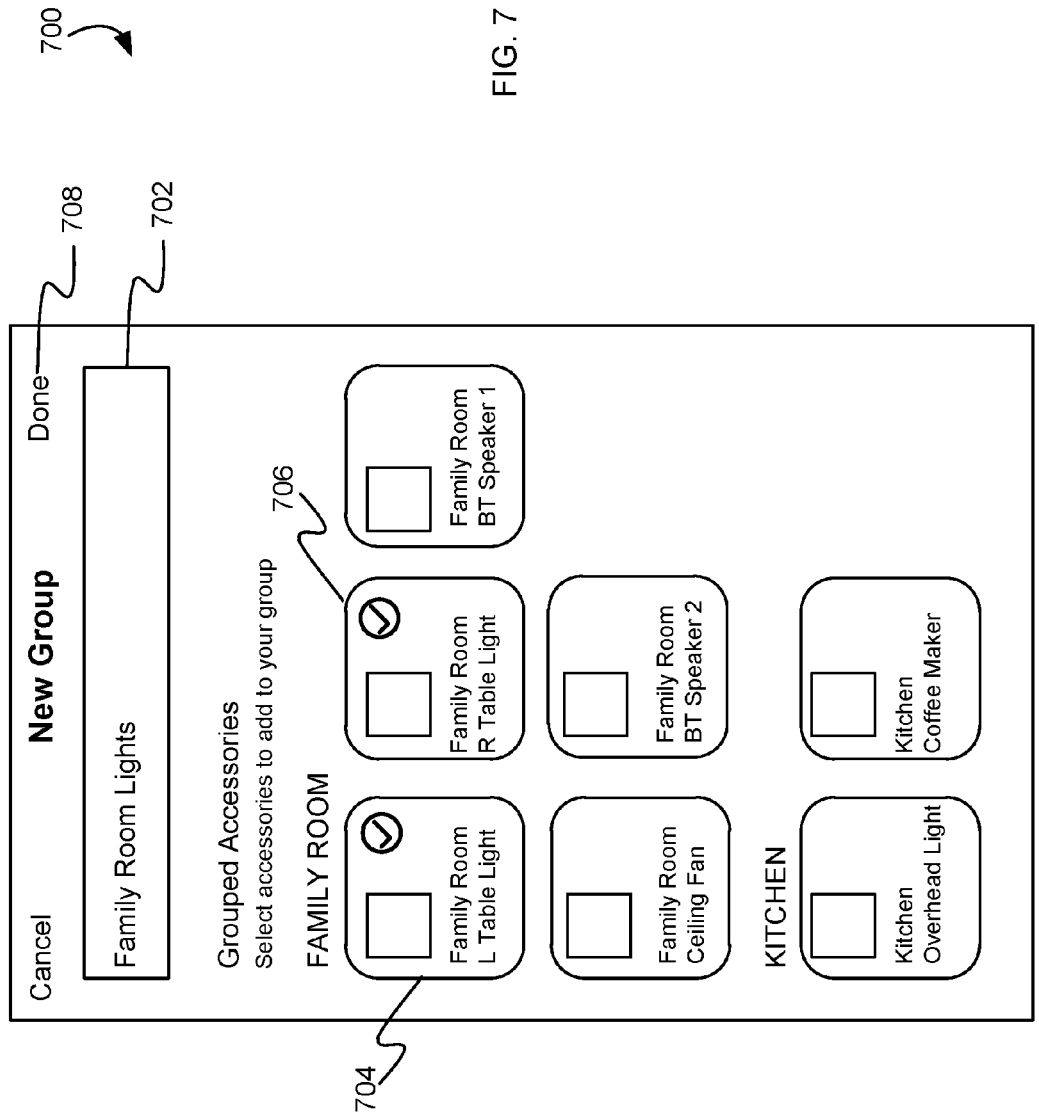
FIG. 7 illustrates an example graphical user interface for defining a new service group.

FIG. 7 illustrates an example graphical user interface 700 for defining a new service group. For example, GUI 700 can be presented by home application 304 on a display of user device 302 in response to the user selecting graphical element 604 of FIG. 6. GUI 700 can include graphical element 702 for specifying a label or name to assign to the new service group. For example, the user can select graphical element 702 (e.g., a text input box, text input control, etc.) to invoke a virtual keyboard (not shown). The user can type a name (e.g., "Family Room Lights") for the new service group onto the virtual keyboard to cause the name to be displayed in graphical element 702.

In some implementations, GUI 700 can present representations of accessories configured in home application 304. For example, GUI 700 can present graphical elements (e.g., tiles) representing the accessories in the user's house. The user can provide input to the graphical elements (e.g., graphical elements 704 and 706) to select specific accessories to add to the new service group. The accessories selected for the new service group can be indicated with a graphical object (e.g., the check mark on graphical elements 704 and 706) or some other graphical highlighting. After the user has selected the accessories to be included in the service group, the user can select graphical element 708 to finish the service group definition and cause home application 304 to create the service group.

Presenting Service Group Controls

Figure 8:
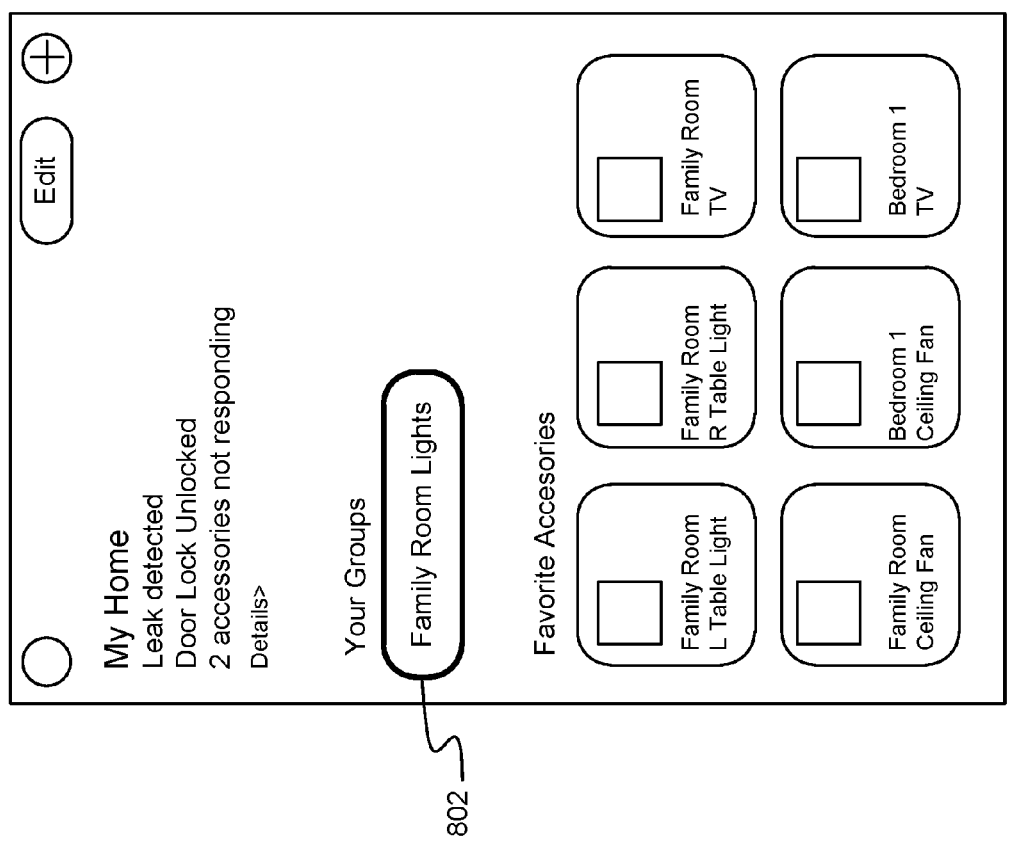
FIG. 8 illustrates an example graphical user interface presenting a service group.

FIG. 8 illustrates an example graphical user interface 800 presenting a service group. For example, GUI 800 can correspond to GUI 500 of FIG. 5. As described above, a service group can provide a mechanism for the user to control multiple accessories within the service group with a single control. The service group also provides a convenient way to organize, view, and access related accessories. A service group can be created in response to user input, as described with reference to FIG. 7. A service group can be automatically created by home application 304 when home application 304 determines that accessories are related in use, as described above.

In some implementations, GUI 800 can include graphical element 802 representing a service group. For example, graphical element 802 can represent the "Family Room Lights" group created by the user as discussed with reference to FIG. 7. Graphical element 802 can represent a "Family Room Lights" group automatically created by home application 304. For example, the service group represented by graphical element 802 can include two smart lamps (e.g., lamp 408, lamp 410). The user can select graphical element 802 to turn on and off lamp 408 and lamp 410. For example, a single tap to graphical element 802 can cause all of the accessories (e.g., lamp 408, lamp 410) in the corresponding service group to turn on and/or off.

In some implementations, the user can select (e.g., long touch, pressure touch, etc.) graphical element 802 to view additional controls and/or details about the corresponding service group. For example, the controls displayed for a service group can be selected based on which features the accessories in a service group have in common. In some implementations, only common controls may be displayed. In some implementations, the user can navigate between controls and the order in which the controls are presented can be determined based on which controls are most common. Home application 304 can obtain a description of the controls available for each accessory in a service group from accessory database 306, as described above.

FIG. 9 illustrates an example database 900 storing accessory control information. For example, database 900 can correspond to accessory database 306 of FIG. 3. As described above, database 900 can include records for each accessory (e.g., accessory 310, accessory 320, etc.) configured in home application 304 and/or home daemon 305. Home application 304 and/or home daemon 305 can obtain accessory configuration information (e.g., including accessory identifier, accessory APIs, accessory features, accessory controls, etc.) from the accessories themselves or from a server managed by the accessory vendor or other entity.

In some implementations, home application 304 can determine how to present controls for a group of accessories based on the accessory configuration information in database 900. For example, since database 900 includes information describing the features and/or controls available for each accessory, home application 304 can compare the features and/or controls for each accessory in a service group to identify common controls. When the service group is selected by a user from a GUI of home application 304, home application 304 can select controls to present to the user based on the controls that each accessory in the service group have in common.

For example, in scenario 'B' described above, home application 304 automatically grouped two lamps (e.g., lamp 408, lamp 410) into a service group. Similarly, when referring to FIG. 7, the user may create a "Family Room Lights" service group that includes two lamps (e.g., lamp 408, lamp 410). If lamp 408 corresponds to accessory 902 in database 900 and lamp 410 corresponds to accessory 904 in database 900, then home application 304 can compare the features listed for each accessory in database 900 to determine which controls to present for the service group. As illustrated in FIG. 9, accessory 902 provides on/off, dimmer, and color controls. Accessory 904 provides on/off and dimmer controls. Thus, on/off and dimmer controls are common to both accessory 902 and accessory 904. Since, the on/off control is the default behavior when a user selects (e.g., taps) a service group graphic (e.g., tile or button), as described above, the on/off group control is provided by default for each service group.

However, when the user selects to view the details of a group (e.g., long touch, pressure touch, etc.), home application 304 can present the dimmer control because the dimmer control is common to both accessory 902 and accessory 904. In some implementations, home application 304 may provide access to other controls of individual accessories at the group level by scrolling, or navigating through the other accessory controls. However, the most common accessory controls can be presented first. Thus, home application 304 can present (e.g., prioritize) accessory controls based on which controls are most common amongst the accessories in a service group.

Figure 10:
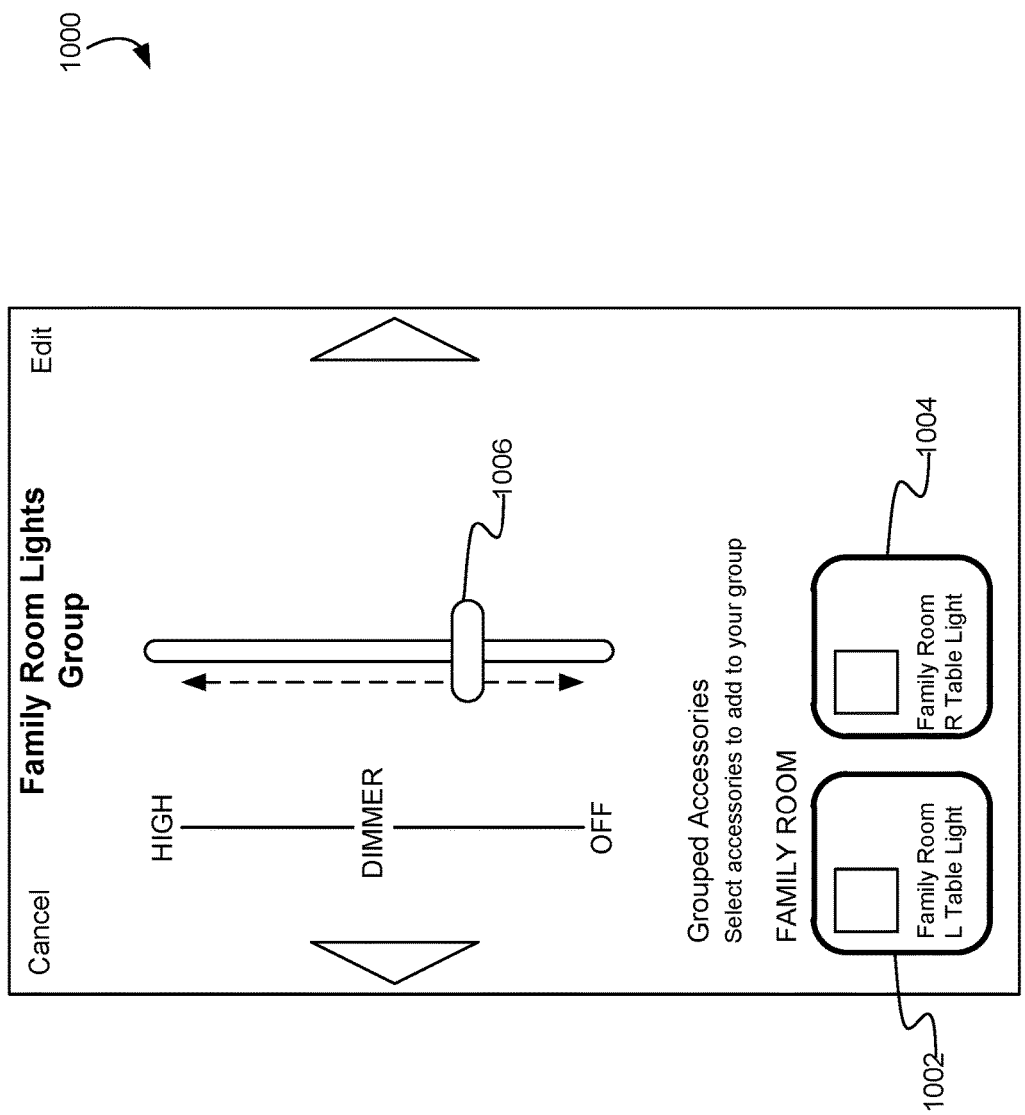
FIG. 10 illustrates an example graphical user interface for presenting service group controls.

FIG. 10 illustrates an example graphical user interface 1000 for presenting service group controls. For example, GUI 1000 can be presented by home application 304 on a display of user device 302 in response to the user selecting (e.g., long touch, pressure touch, etc.) graphical element 802 (e.g., a service group button) of FIG. 8.

In some implementations, GUI 1000 can present a detailed view of a service group. For example, GUI 1000 can present graphical elements 1002 and/or 1004 representing each accessory in the service group. For the "Family Room Lights" group, GUI 1000 can present graphical element 1002 representing the left table light (e.g., lamp 408) and a graphical element 1004 representing the right table light (e.g., lamp 410). In some implementations, the user can select graphical element 1002 or graphical element 1004 to view details about individual accessories and/or individual accessory controls. Thus, the user can control specific accessories in the service group by selecting the representation of the specific accessory. The controls for individual accessories can be the same or similar as service group controls described herein. However, when the user manipulates an individual accessory control, only the state of individual corresponding accessory will change based on the user input; the other accessories in the service group will not be affected.

In some implementations, GUI 1000 can present a control for the service group. As described above, lamp 408 represented by graphical element 1002 can have on/off, dimmer, and color controls. Lamp 410 represented by graphical element 1004 can have on/off and dimmer controls. Thus, the accessories in the "Family Room Lights" service group have on/off and dimmer controls in common. Since the on/off control is provided by selecting graphical element 802 of GUI 800 (e.g., the service group graphic), home application 304 can select the remaining common control (e.g., dimmer control 1006) as the first (or only) service group control to present on GUI 1000. For example, GUI 1000 can be configured to present only controls common to all accessories in the service group. GUI 1000 can be configured to present all controls associated with accessories in the service group according to a sequence determined based on how common a control is among the accessories in a group. For example, the most common controls can be presented first, followed by less common accessory controls, and followed by accessory controls only associated with specific (e.g., single, one, etc.) accessories. In some implementations, the user can provide input (e.g., a tap, a swipe, etc.) to GUI 1000 to cause home application 304 to present the next accessory control for the group.

In some implementations, GUI 1000 can present an indication of which accessory the presented accessory control controls. For example, GUI 1000 can highlight graphical element 1002 and graphical element 1004 because dimmer control 1006 controls both lamp 408 and lamp 410. When the user provides input to GUI 1000 to manipulate dimmer control 1006, the brightness level of both lamp 408 and lamp 410 will be adjusted according to the user input. For example, home application 304 can send a message or command to both lamp 408 and lamp 410 to adjust the current brightness setting or state of each lamp in response to receiving the user input manipulating dimmer control 1006.

Figure 11:
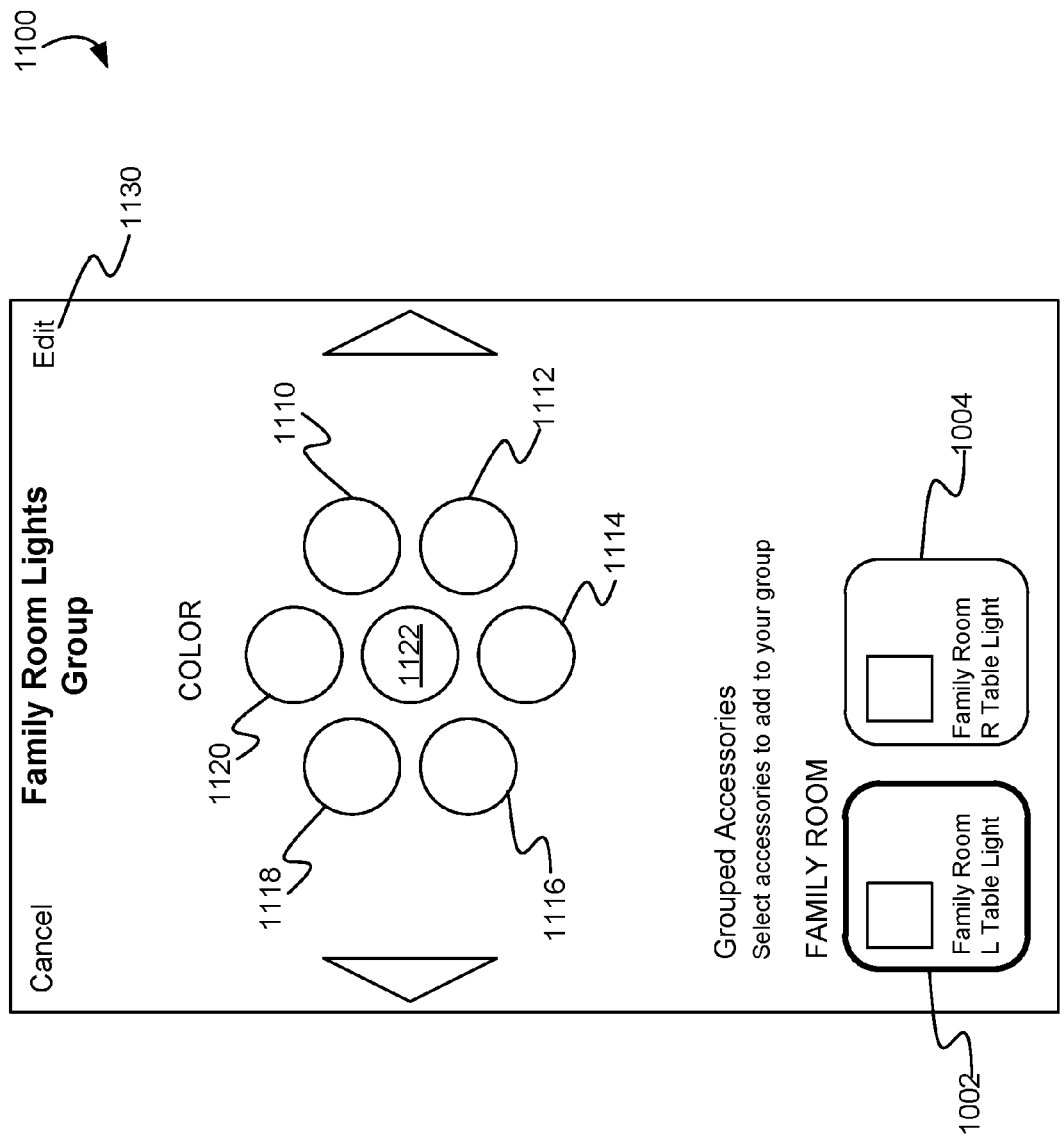
FIG. 11 illustrates an example graphical user interface for presenting service group controls.

FIG. 11 illustrates an example graphical user interface 1100 for presenting service group controls. For example, GUI 1100 can be similar to GUI 1000. However, GUI 1100 can present another service group control in response to GUI 1000 receiving a user input (e.g., a swipe gesture, a tap, etc.) to present the next service group control for the selected service group (e.g., the "Family Room Lights" group). As described above, the "Family Room Lights" service group can include lamp 408 and lamp 410. Lamp 408 represented by graphical element 1002 can have on/off, dimmer, and color controls. Lamp 410 represented by graphical element 1004 can have on/off and dimmer controls, but no color control. Thus, when GUI 1000 receives the user input to present the next service group control for the selected service group (e.g., the "Family Room Lights" group), home application 304 can present the color control for lamp 408 because the "Family Room Group" has no additional common controls shared between accessories in the service group.

In some implementations, GUI 1100 can present a service group control for a single accessory in a service group. For example, GUI 1100 can present a color control for lamp 408 represented by graphical element 1002. A user can select a graphical element 1110-1120 to specify a color for lamp 408. For example, graphical element 1110 can correspond to blue, graphical element 1112 can correspond to white, graphical element 1114 can correspond to orange, graphical element 1116 can correspond to yellow, graphical element 1118 can correspond to red, and graphical element 1120 can correspond to purple.

In some implementations, GUI 1100 can present an indication of which accessory the presented accessory control controls. For example, GUI 1100 can highlight graphical element 1002 and not highlight graphical element 1004 because the displayed color control controls only lamp 408 and not lamp 410. When the user provides input to GUI 1100 to manipulate the color control, the light color of only lamp 408 will be adjusted according to the user input. For example, when the user provides input to GUI 1100 selecting one of graphical elements 1110-1120 (e.g., collectively the color control) and then selects graphical element 1122 to indicate that the user is done selecting a color, home application 304 can send a message or command to lamp 408 indicating the selected color. Alternatively, each time one of graphical elements 1110-1120 is selected, home application 304 can send a message to lamp 408 indicating the selected color. Lamp 408 can then generate a light or illuminate according to the indicated color.

Editing a Service Group

Figure 12:
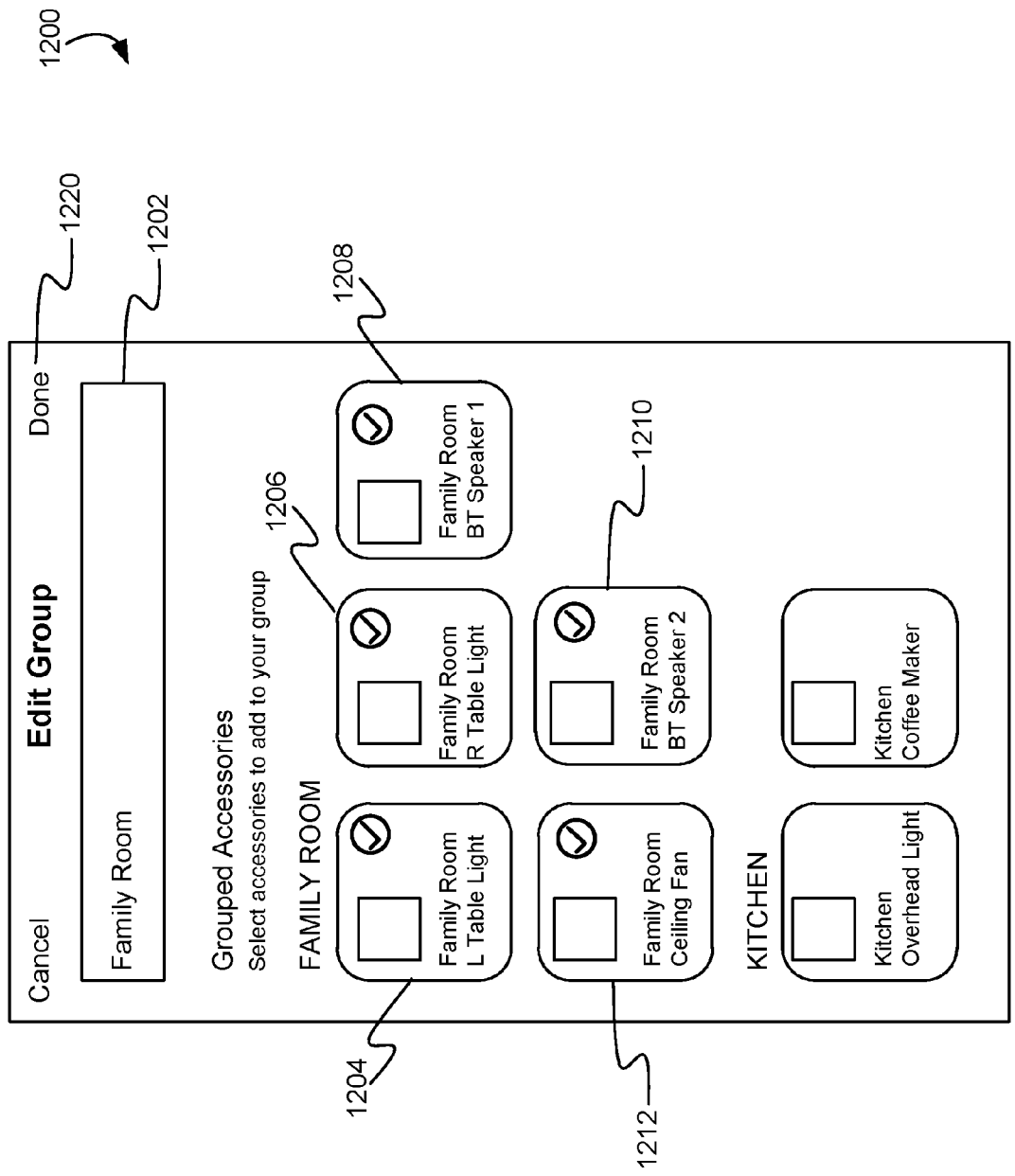
FIG. 12 illustrates an example graphical user interface for editing a service group.

FIG. 12 illustrates an example graphical user interface 1200 for editing a service group. For example, GUI 1200 can be presented by home application 304 on user device 302 in response to receiving a user selection of graphical element 1130 of GUI 1100. For example, graphical element 1100 can be a button or selectable text that the user can select to edit a service group (e.g., the "Family Room Lights" service group).

In some implementations, GUI 1200 can receive user input for editing an existing service group. For example, GUI 1200 can be used to edit a user-defined service group. GUI 1200 can be used to edit a service group automatically defined by home application 304, as described above. GUI 1200 can have similar features as GUI 700 of FIG. 7. For example, GUI 1200 can include graphical element 1102 (e.g., graphical element 702) for entering (e.g., editing) the name of the service group. For example, the user can change the name of the "Family Room Lights" service group to "Family Room."

In some implementations, GUI 1200 can include graphical elements (e.g., 1204-1212) representing the various accessories configured in (e.g., paired with, connected to, etc.) home application 304. The user of home application 304 can select the representations of various accessories to add and/or remove accessories from the service group being edited (e.g., the "Family Room" service group). For example, when GUI 1200 receives user input selecting an accessory (e.g., graphical element 1204) that is already in the service group, home application 304 can remove the selected accessory from the service group.

When GUI 1200 receives user input selecting an accessory (e.g., graphical element 1208) that is not already in the service group, home application 304 can add the selected accessory to the service group. For example, the user can select graphical element 1208 to add a Bluetooth speaker (e.g., speaker 1) located in the family room to the "Family Room" service group. The user can select graphical element 1210 to add a Bluetooth speaker (e.g., speaker 2) located in the family room to the "Family Room" service group. The user can select graphical element 1212 to add a ceiling fan located in the family room to the "Family Room" service group. While this example describes grouping accessories that are located in the same room into a service group, accessories located in different rooms can be grouped together as well. When the user is done editing the "Family Room" service group, the user can select graphical element 1220 to cause home application 304 to save the edited service group.

Figure 13:
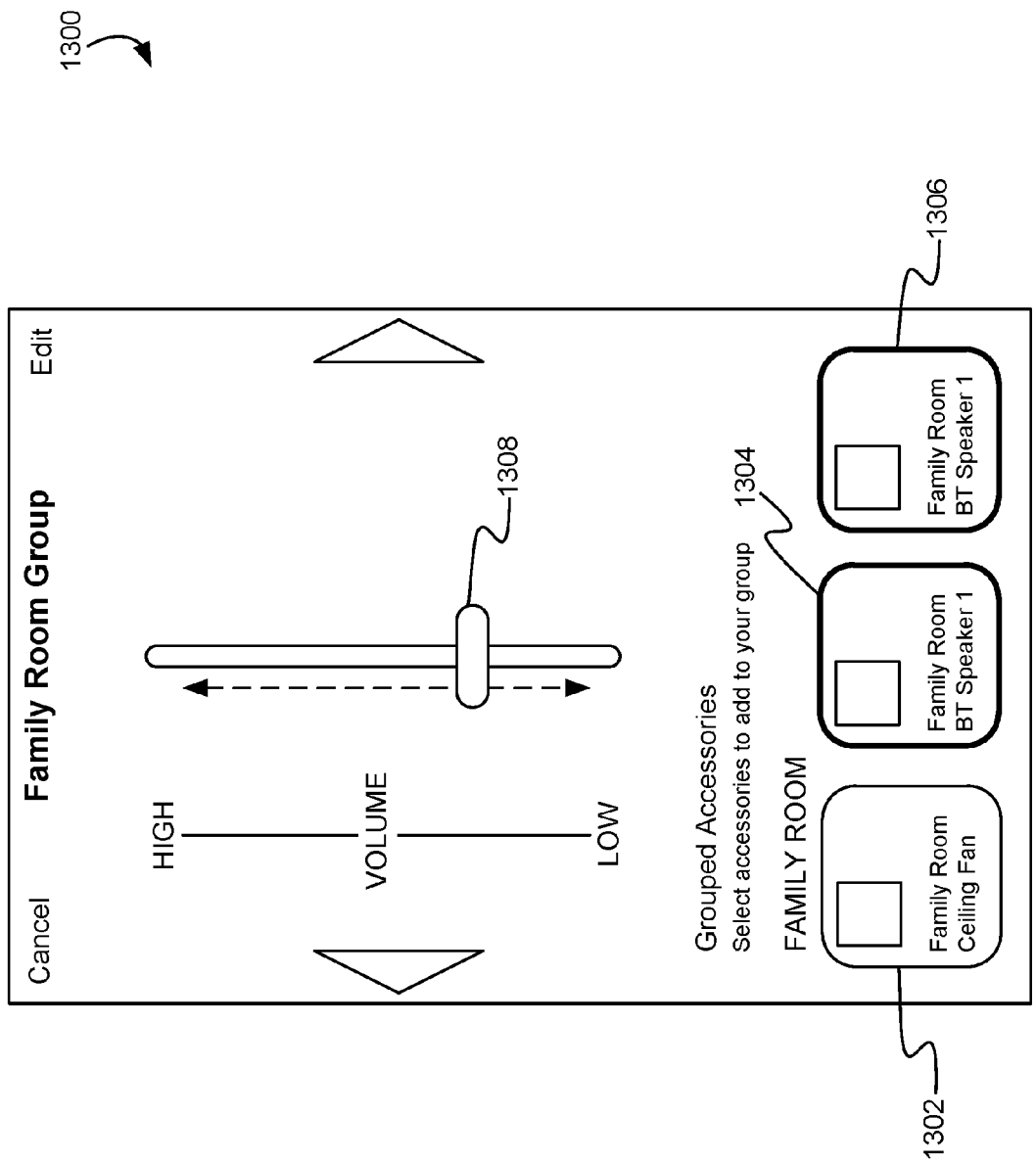
FIG. 13 illustrates an example graphical user interface for presenting a service group control for the edited service group.

FIG. 13 illustrates an example graphical user interface 1300 for presenting a service group control for the edited service group. For example, GUI 1300 can be presented by home application 304 on a display of user device 302. In some implementations, GUI 1300 can be presented by home application 304 in response to a user selecting a service group (e.g., the "Family Room" service group), as described with reference to FIG. 8. Alternatively, GUI 1300 can be presented by home application 304 in response to a user providing input (e.g., a tap, a swipe gesture) to GUI 900 to view the next service group control for a service group.

For example, the "Family Room" service group now includes two smart lamps (e.g., lamps 408 and 410) that have a common dimmer control and two speakers that have a common volume control (e.g., as determined based on entries 908 and 910 of database 900). Since these two controls (e.g., dimmer control, volume control) have equal commonality (e.g., two accessories out of the five accessories in the group), these two controls will be the first two controls presented by home application 304. The order in which these two controls are presented can be based on frequency of use, alphabetical order, or some random logic. However, these controls will be presented before other controls that are less common (e.g., one accessory out of the five) within the service group. Thus, home application 304 can present GUI 1000 when the user selects the service group from GUI 800. Home application 304 can present GUI 1300 in response to receiving a swipe or tap gesture indicating that the user wishes to view the next service group control (e.g., volume control 1308).

As described above, GUI 1300 can highlight the accessories controlled by the currently presented accessory control. Thus, when GUI 1300 presents volume control 1308 for controlling the Bluetooth speakers represented by graphical elements 1304 and 1306, GUI 1300 can highlight graphical elements 1304 and 1306. When the user provides input to manipulate volume control 1308 to specify a speaker volume, home application 304 can send a message or command to both of the Bluetooth speakers to change the current volume settings of both speakers according to the user's input.

In some implementations, GUI 1300 can receive user input indicating that the user would like to view the next group accessory control. For example, the user can tap or swipe GUI 1300 to cause home application 304 to present the next accessory control for the group. For example, home application 304 can present GUI 1100 that includes the color control for lamp 408, as described above. The user can provide input to GUI 1100 to view the last group accessory control (e.g., fan speed control), as illustrated by FIG. 14.

Figure 14:
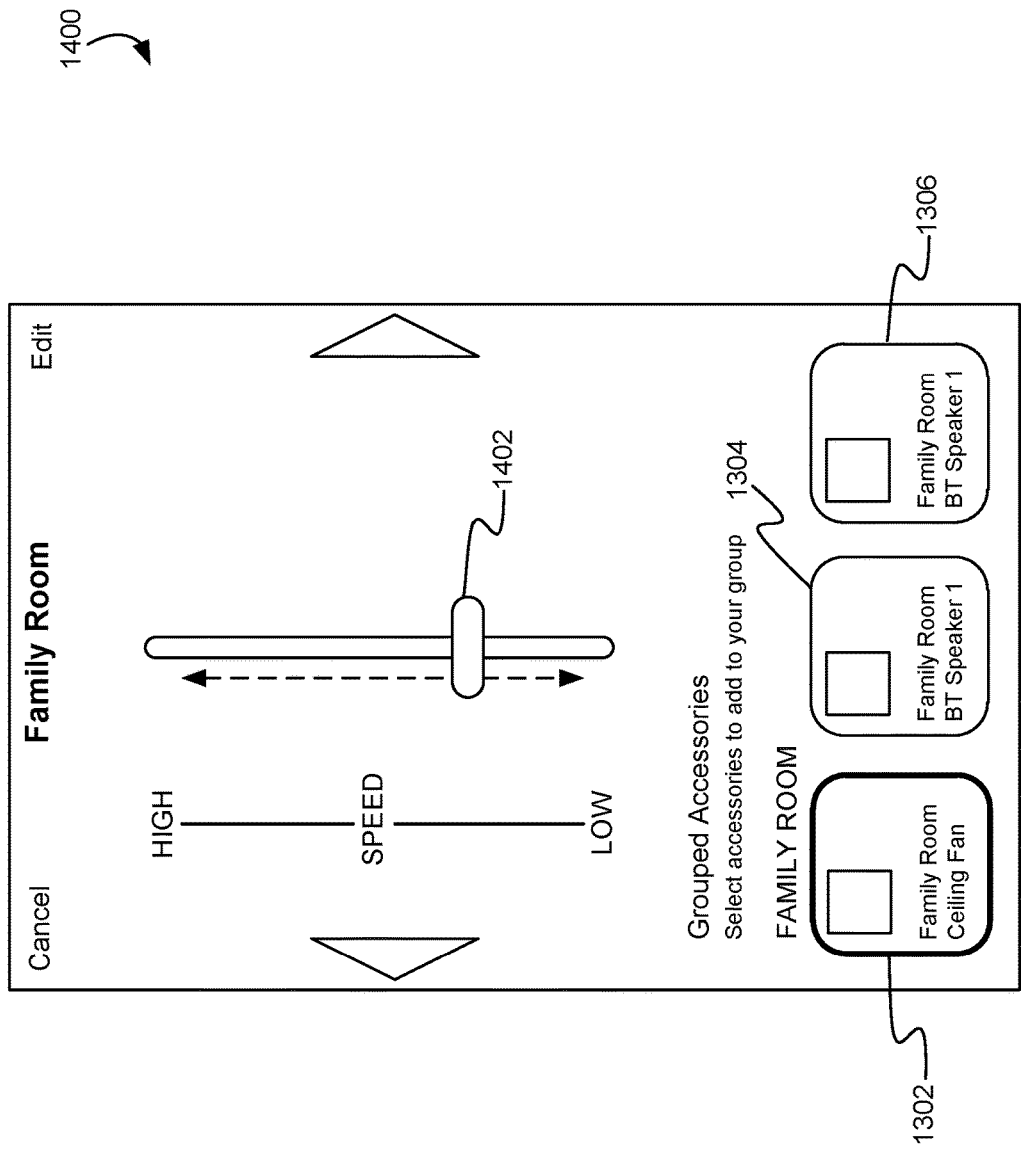
FIG. 14 illustrates an example graphical user interface for presenting a service group control for the edited service group.

FIG. 14 illustrates an example graphical user interface 1400 for presenting a service group control for the edited service group. For example, GUI 1400 can present speed control 1402. Since speed control 1402 only controls the ceiling fan, graphical element 1302 representing the family room ceiling fan will be highlighted to indicate to the user which accessory is being controlled by speed control 1402. When the user manipulates speed control 1402 to specify a fan speed, home application 304 can send a message or command to the family room ceiling fan to adjust the current speed of the fan according to the user's input.

Front Door Security Use Case

Figure 15:
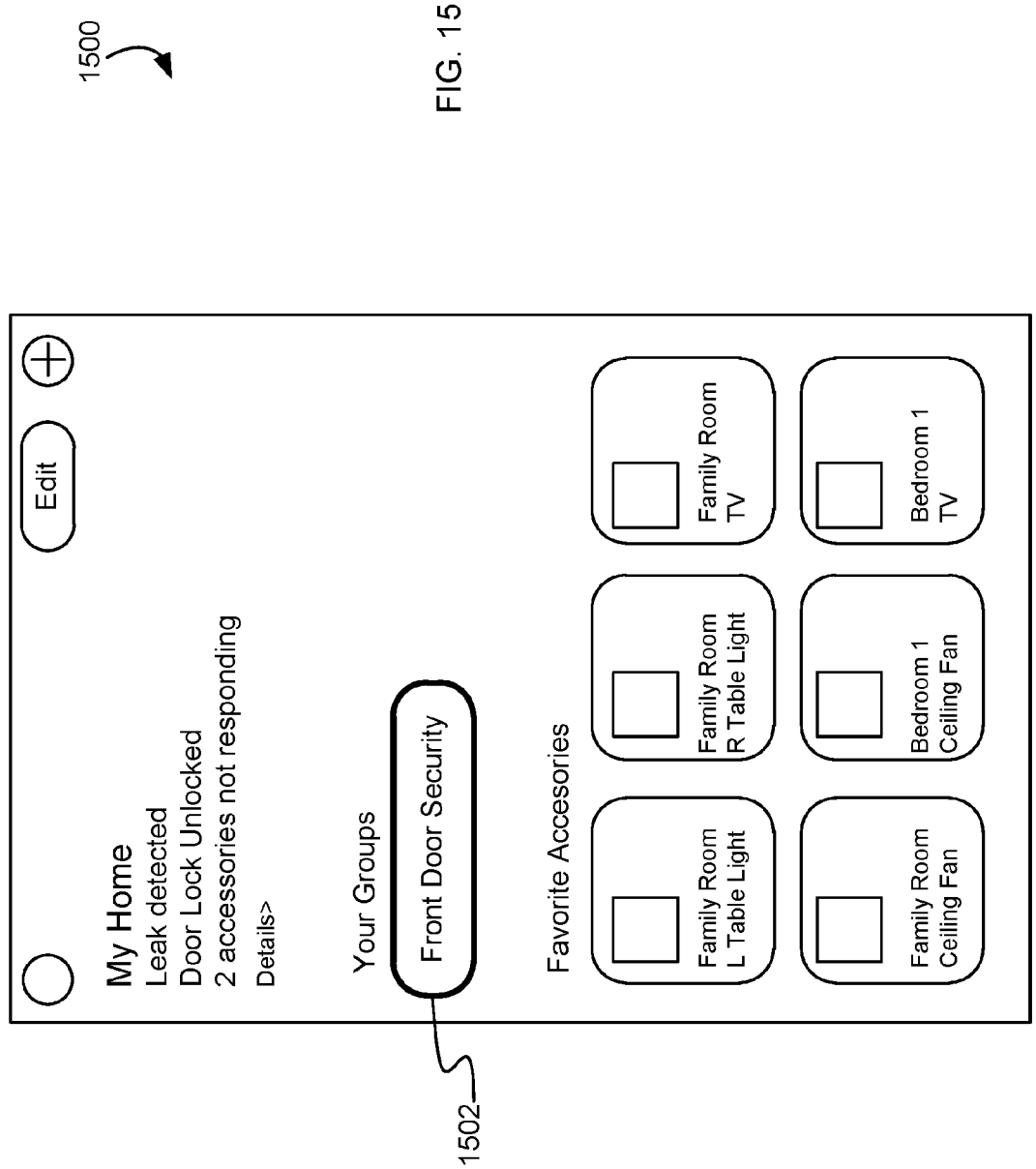
FIG. 15 illustrates an example graphical user interface for selecting an automatically generated service group.

FIG. 15 illustrates an example graphical user interface 1500 for selecting an automatically generated service group. For example, GUI 1500 can correspond to GUI 500 of FIG. 5. In some implementations, GUI 500 can include graphical element 1502 representing an automatically generated service group (e.g., "Front Door Security"), as described above. Similar to GUI 500, a user can select (e.g., tap) graphical element 1502 to turn on/off all of the accessories in the "Front Door Security" service group that have an on/off control.

For example, if the "Front Door Security" service group includes light 402, lock 403, camera 404, and/or doorbell 406, home application 304 can determine based on the accessory control data in database 900 (i.e., accessory database 306) that light 402 (718) and camera 404 (716) can be turned on and off but lock 403 (714) and doorbell 406 (712) cannot be turned on and off. For example, doorbell 406 can be rang (e.g., by physically interacting with doorbell 406) but may not be turned on and off. Similarly, lock 403 can be locked and unlocked but may not be turned on and off.

In some implementations, when the user turns on an accessory that provides a media feed, home application 304 can automatically present the media feed to the user. For example, if the user turns on (e.g., either specifically or as part of a service group) an intercom accessory for speaking with a visitor who rang the user's front door bell, home application 304 can automatically turn on the microphone and speakers of user device 302 so that the user can speak with the visitor at the front door. Similarly, if the user turns on (e.g., either specifically or as part of a service group) a camera accessory for viewing a visitor who rang the user's front door bell, home application 304 can automatically present a graphical user interface on a display of user device 302 that presents the video feed from the camera accessory (e.g., camera 404) so that the user can view the visitor at the front door. If the camera accessory includes two way audio, then home application 304 can turn on the microphone and speaker of user device 302 so that the user can view and speak with the visitor at the front door. For example, in response to the user input (e.g., tap) selecting graphical element 1502, home application 304 can present GUI 1600 of FIG. 16 so that the user can view the video feed from camera 404.

Figure 16:
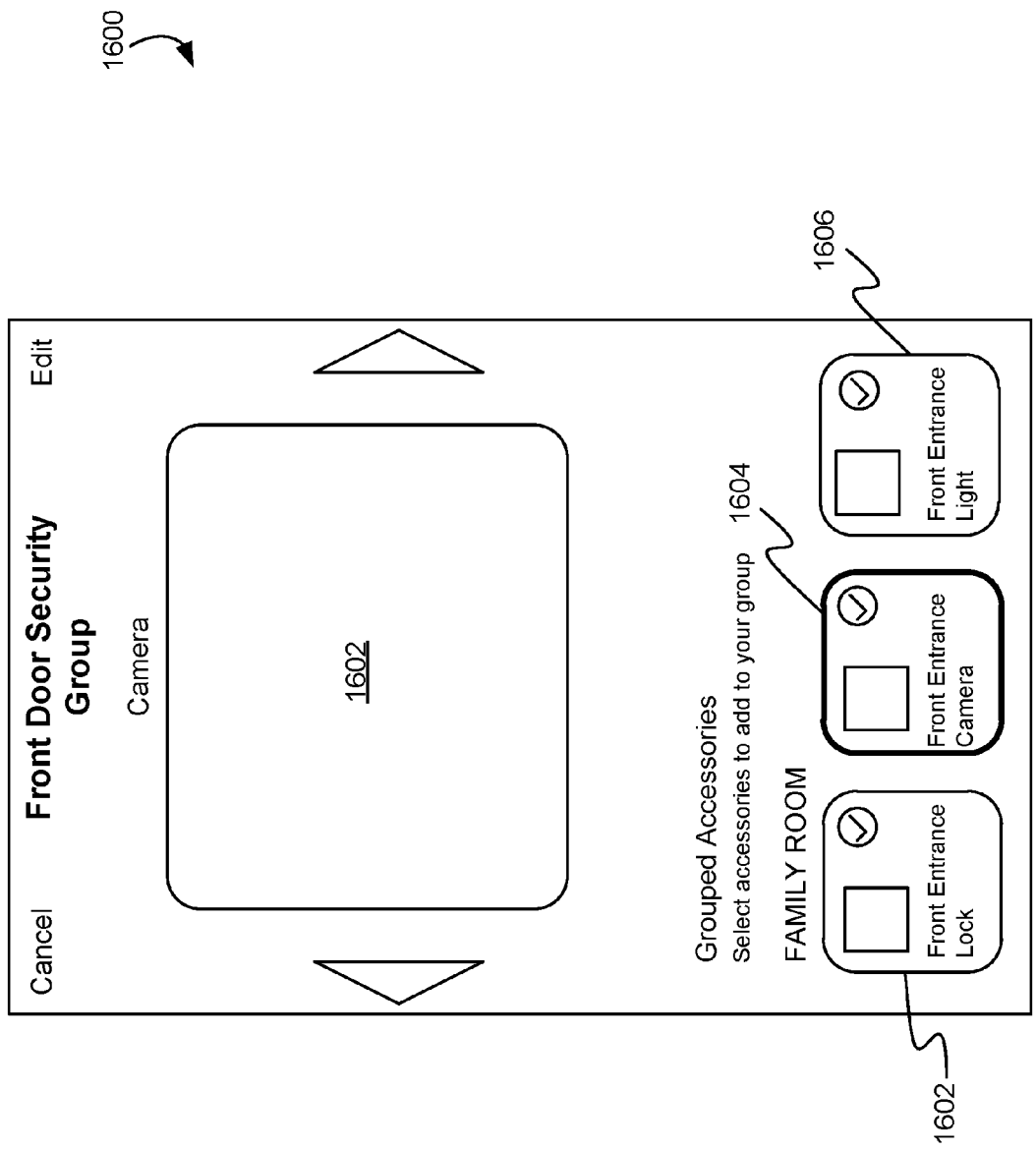
FIG. 16 illustrates an example graphical user interface for presenting controls for an automatically generated service group.

FIG. 16 illustrates an example graphical user interface 1600 for presenting controls for an automatically generated service group. For example, GUI 1600 can be presented by home application 304 on a display of user device 302 in response to user input (e.g., long touch, pressure touch, etc.) selecting graphical element 1302 of FIG. 5. For example, GUI 1600 can have similar features as GUI 1000, GUI 1100, GUI 1300 and GUI 1400 described above.

In some implementations, GUI 1600 can present service group controls for the selected service group. For example, GUI 1600 can present accessory controls for the "Front Door Security" service group described above. As described above, home application 304 can prioritize service group controls based on which controls are most common in the service group. Since the "Front Door Security" service group does not have a most common accessory control (e.g., other than on/off), home application 304 can present either a lock/unlock control for front door lock 403 or a video feed control for camera 404.

In some implementations, GUI 1600 can present a video feed control 1602 for camera 404. For example, the user can provide input (e.g., tap) to select control 1602 to cause camera 404 to initiate a live video feed. For example, in response to the selection of control 1602, home application 304 can send a command or message to camera 404 to cause camera 404 to start a live video feed. Camera 404 can send video images of the area around the front door to user device 302 and home application 304 can present the live video feed in camera video feed control 1602. To stop the video feed (e.g., to turn off the camera), the user can select control 1602 to cause camera 404 to terminate the live video feed.

In some implementations, while presenting an accessory control for a particular accessory in a service group, home application 304 can receive user input to change the state of other accessories in the service group. For example, while presenting video feed control 1602 for camera 404, GUI 1600 can present graphical element 1602 representing front door lock 403, graphical element 1604 representing camera 404, and/or graphical element 1606 representing front entrance light 402. As described above, graphical element 1604 is highlighted to indicate that video feed control presented on GUI 1600 is associated with camera 404.

However, instead of navigating to another accessory control GUI to change the state of door lock 403 and/or entrance light 402, the user can select (e.g., tap) graphical element 1602 to change the state of lock 403 and/or select (e.g., tap) graphical element 1606 to change the state of light 402. In response to receiving selection of graphical element 1602 and/or graphical element 1606, home application 304 can change the state of the respective accessories (e.g., lock 403 and/or light 402) without navigating away from GUI 1600 (e.g., without presenting a different GUI).

In some implementations, home application 304 can perform different operations based on the accessory selected by the user. For example, while typically a selection (e.g., a tap) of a graphical representation (e.g., graphical element 1606) of an accessory causes home application 304 to turn on/off the corresponding accessory, lock 403 does not have an on/off control. When home application 304 manages an accessory without an on/off control, home application 304 can select another control to actuate in response to receiving a selection of the corresponding graphical representation. In the case of lock 403, home application 304 can determine (e.g., based on entry 914 of database 900) that lock 403 does not have an on/off control but does have a lock/unlock control. When a user selects (e.g., taps) graphical element 1602, home application 304 can lock or unlock the front door. Thus, when viewing the camera feed using video control 1602, the user can turn on light 402 by selecting graphical element 1606 and unlock the front door lock 403 by selecting graphical element 1602 without navigating away from GUI 1600.

Service Group Notifications

Figure 17:
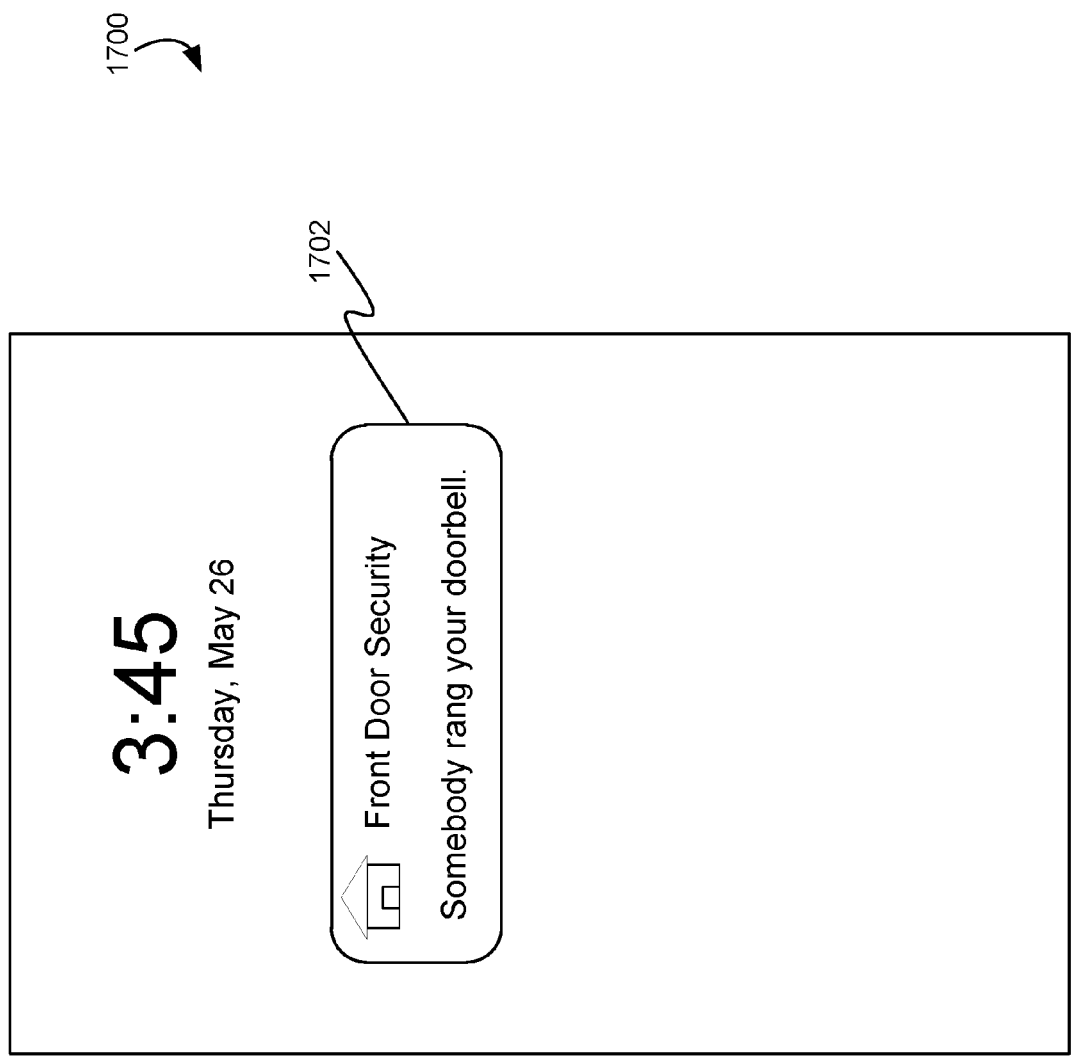
FIG. 17 illustrates an example graphical user interface presenting a service group notification.

FIG. 17 illustrates an example graphical user interface 1700 presenting a service group notification. For example, GUI 1700 can be presented by home application 304 in response to receiving a notification from an accessory managed by home application 304. GUI 1700 can be presented on user device 302 when user device 302 is locked. For example, GUI 1700 can correspond to a lock screen of user device 302 displayed when user device 302 is locked. GUI 1700 can be presented on user device 302 when user device 302 is unlocked. For example, GUI 1700 can correspond to a home screen or other graphical user interface (e.g., an application user interface) presented after user device 302 has been unlocked by the user (e.g., after the user has entered the user's passcode and user device 302 has authenticated the user as an authorized user of user device 302).

In some implementations, GUI 1700 can include graphical element 1702. For example, graphical element 1702 can be presented on GUI 1700 to notify the user of some event related to an accessory or service group. For example, graphical element 1702 can be presented by home application 304 in response to receiving a message or notification from doorbell 406 indicating that a visitor rang doorbell 406. In some implementations, graphical element 1702 can be an accessory notification (e.g., for a single, individual accessory) that simply indicates that doorbell 406 has been actuated. For example, GUI 1700 can present graphical element 1702 to simply provide information and the user can dismiss graphical element 1702 after viewing the notification.

In some implementations, graphical element 1702 can be a service group notification. For example, home application 304 can determine that the accessory sending the notification to home application 304 is part of a service group. Continuing the "Front Door Security" service group example above, when home application 304 receives a notification or message from doorbell 406 that indicates that a visitor has actuated doorbell 406, home application 304 can determine that doorbell 406 is part of the "Front Door Security" service group and present a service group notification (e.g., graphical element 1702) that indicates that the "Front Door Security" service group has been activated in response to the visitor ringing doorbell 406.

In some implementations, home application 304 can present service group controls in response to user input selecting a service group notification. For example, a user can provide user input (e.g., a long touch, swipe, pressure touch, etc.) to graphical element 1702 cause home application 304 to present service group controls for the service group represented by graphical element 1702. When graphical element 1702 represents a "Front Door Security" service group notification, the user can select graphical element 1702 to invoke service group controls for the "Front Door Security" service group.

Figure 18A:
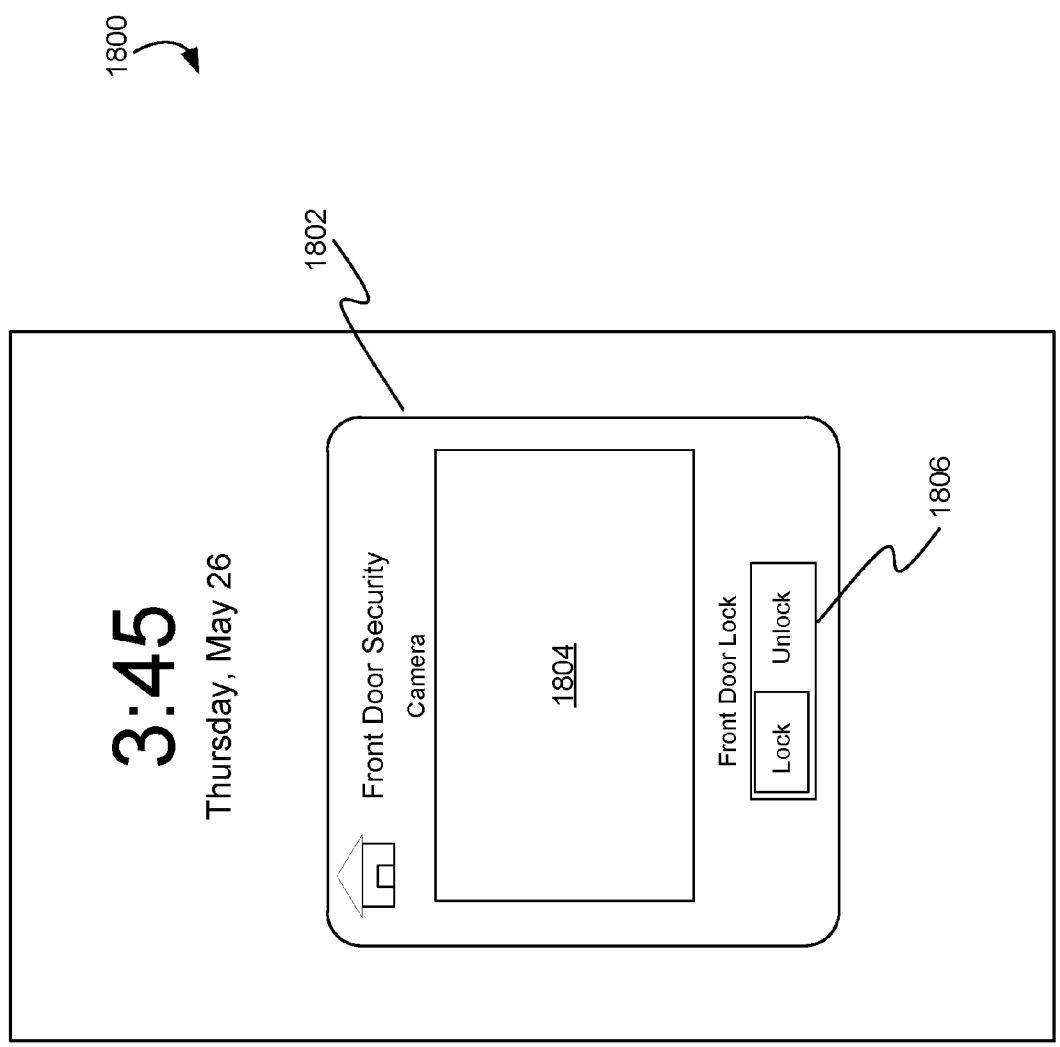
FIG. 18A illustrates an example graphical user interface for presenting service group controls with a notification.

FIG. 18A illustrates an example graphical user interface 1800 for presenting service group controls with a notification. For example, GUI 1800 can be presented on a locked or unlocked screen of user device 302 by home application 304. GUI 1800 can be presented in response to receiving user input selecting graphical element 1702 of FIG. 17.

In some implementations, GUI 1800 can include graphical element 1802. For example, graphical element 1802 can correspond to graphical element 1702 of FIG. 17. When the user selects graphical element 1702, graphical element 1702 can transform (e.g., expand) into graphical element 1802 to make room within graphical element 1802 for service group controls. For example, when graphical element 1702 represents a "Front Door Security" service group notification, graphical element 1702 can expand to make room for image control 1804 corresponding to camera 404 and/or lock control 1806 corresponding to front door lock 403. For example, image control 1804 can present a video feed generated by camera 404. Image control 1804 can present a still image captured by camera 404.

In some implementations, selection of graphical element 1702 can automatically initiate the video feed for camera 404. For example, instead of waiting for the user to select image control 1804 to initiate the video feed (e.g., as described above with reference to 1602 of FIG. 16), home application 304 can automatically initiate the video feed from camera 404 upon receiving the selection of the "Front Door Security" service group notification. Home application 304 can initiate the video feed by sending a message to camera 404 to start the video feed, as described above. After the video feed has been started, home application 304 can present the video feed in image control 1804. In some implementations, selection of graphical element 1702 can cause GUI 1700 to automatically obtain and present a still image from camera 404.

In some implementations, the user can unlock the front door using lock control 1806 presented on graphical element 1802. For example, if the user recognizes the visitor who rang doorbell 406 and wishes to allow the visitor access to the user's house, the user can select lock control 1806 to unlock lock 403. If the service group notification (e.g., graphical element 1802) is presented on the display of user device 302 when user device 302 is unlocked, then home application 304 can send a command or message to lock 403 to cause lock 403 to unlock the front door.

However, if the service group notification (e.g., graphical element 1802) is presented on the display of user device 302 when user device 302 is locked, then home application 304 can authenticate the user before sending a command or message to lock 403 to cause lock 403 to unlock the front door. For example, the state of security class accessories (e.g., locks, alarms, etc.) may not be manipulated by a user without first authenticating the user to ensure that the user is authorized to change the state (e.g., unlock, disarm, etc.) of the security class accessory. Accessory classes are described in further detail below. Thus, when the user selects graphical element 1804 when user device 302 is locked, home application 304 will prompt the user to enter the user's credentials to make sure that the user is authorized to unlock lock 403.

Figure 18B:
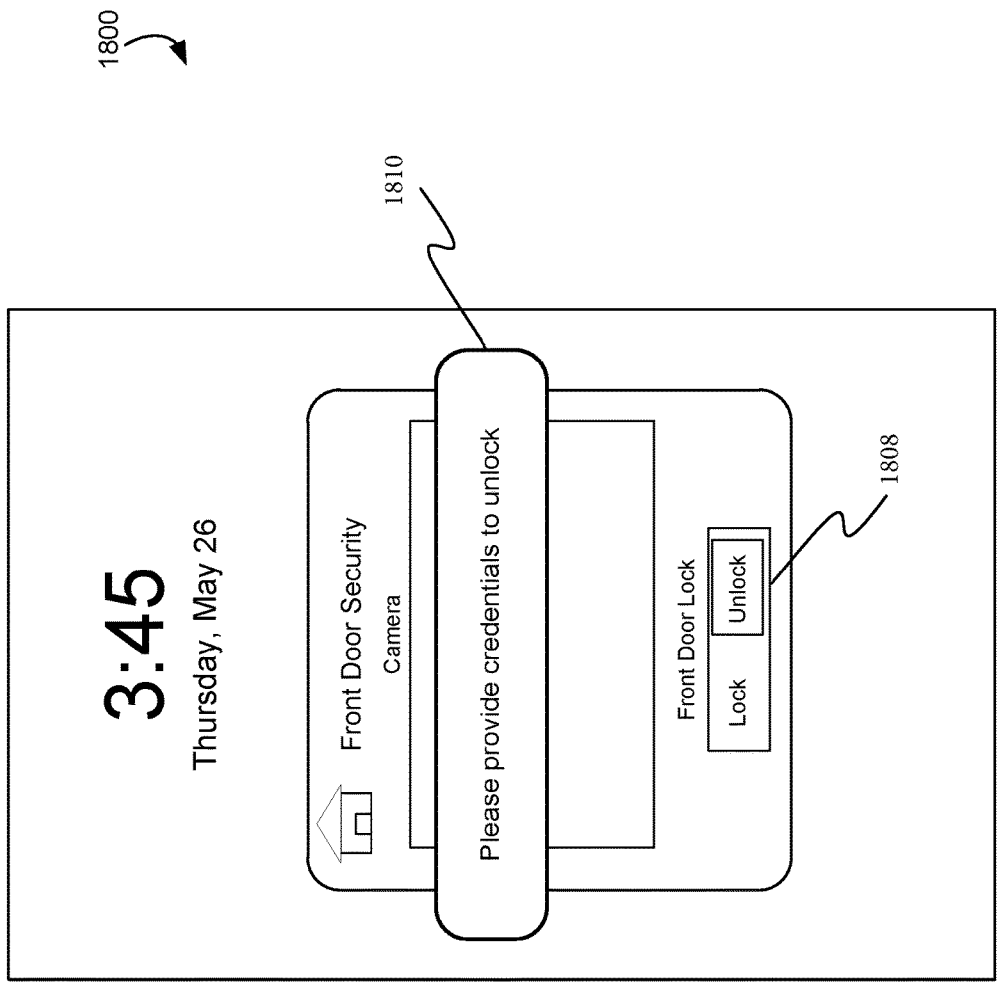
FIG. 18B illustrates an example graphical user interface presenting an authentication prompt.

FIG. 18B illustrates an example graphical user interface 1800 presenting an authentication prompt. For example, when the user attempts to change the state of a security class accessory and/or a safety class accessory (e.g., described below) when user device 302 is locked, home application 304 can prompt the user to enter the user's credentials to make sure that the user is authorized to change the state of the accessory. For example, in response to the user selecting graphical element 1808 to unlock lock 403, home application 304 can present graphical element 1810 prompting the user to enter the user's authentication credentials. For example, the user can be authenticated by fingerprint. The user can be authenticated by password or passcode. The user can be authenticated by voice or other authentication mechanism. After the user is authenticated and home application 304 determines that the user is authorized to change the state of lock 403, home application 304 can send a command or message to lock 403 to cause lock 403 to unlock.

Defining a Scene Using Snapshot of Accessory States

Figure 19:
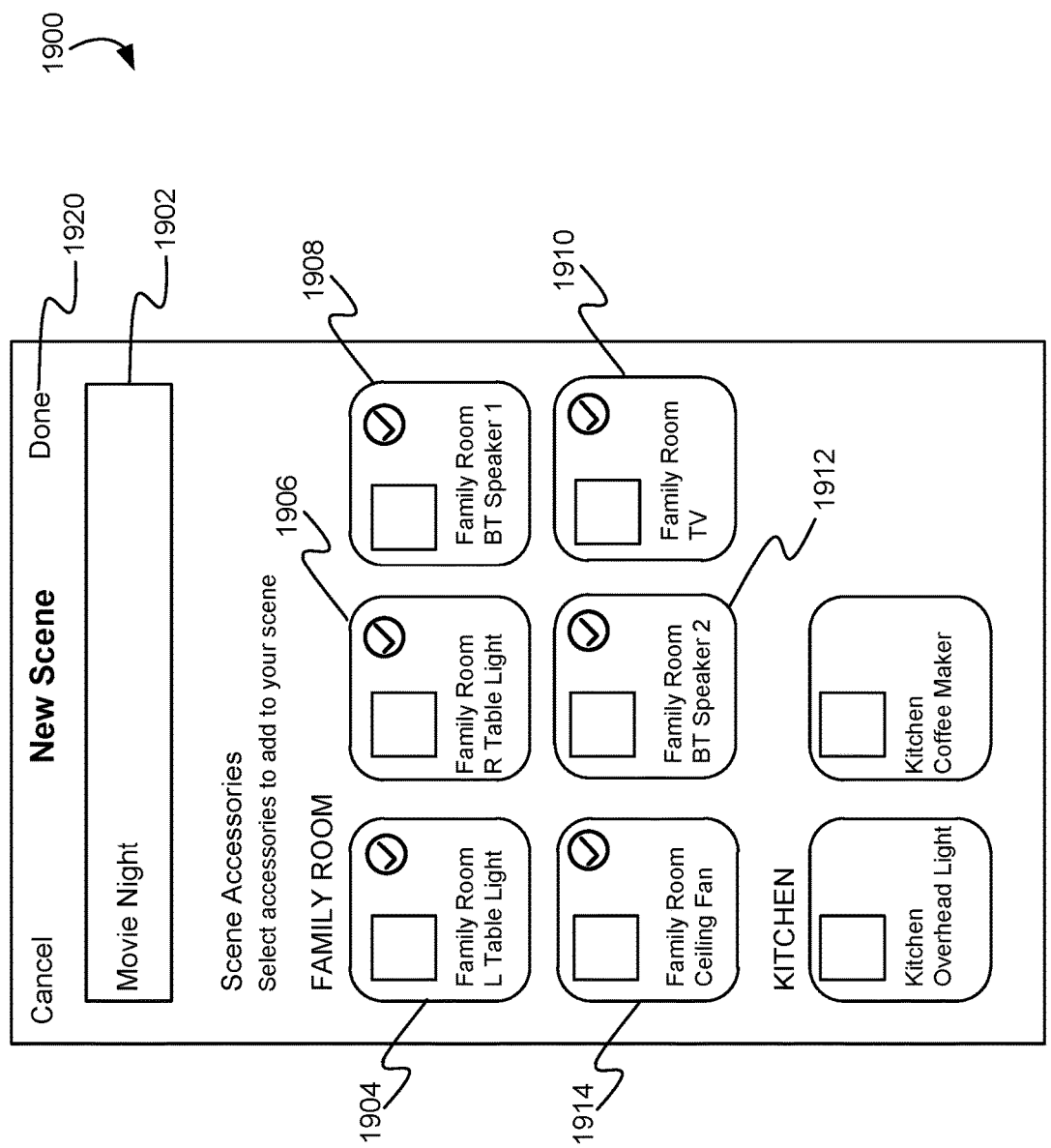
FIG. 19 illustrates an example graphical user interface for creating a scene.

FIG. 19 illustrates an example graphical user interface 1900 for creating a scene. For example, GUI 1900 can be presented by home application 304 on a display of user device 302 in response to the user selecting graphical element 606 of FIG. 6.

Similar to GUI 700 for creating a new service group, GUI 1900 can include graphical element 1902 (e.g., a text input box, a text control, etc.) for specifying a name for the new scene. For example, the user can provide input to a virtual keyboard (not shown) to name the new scene "Movie Night."

Also similar to GUI 700, GUI 1900 can present graphical elements (e.g., 1904-1914) representing accessories managed by home application 304. The user can configure the new scene by selecting accessories managed by home application 304 and presented on GUI 1900. For example, the user can select (e.g., tap) the accessories that the user wishes to include in the new scene. GUI 1900 can receive the user input selecting graphical elements 1904-1914 and add the corresponding accessories to the new scene. For example, when the user selects graphical elements 1904-1914, home application 304 can add lamp 408, lamp 410, smart television 416, smart fan 418, and two Bluetooth speakers from the user's living room to the new scene configuration.

In some implementations, home application 304 can automatically determine the initial settings for each accessory included in a scene. For example, as each accessory is added to a scene, home application 304 can determine the current state of the accessory. For example, when lamp 408 is added to the "Movie Night" scene in response to the user selecting graphical element 1904, home application 304 can determine the current state (e.g., on or off, illumination level, illumination color, etc.) of lamp 408. Home application 304 can save the current state of lamp 408 as the scene setting (e.g., scene state) for lamp 408 in the "Movie Night" scene. Similarly, when smart television 416 is added to the "Movie Night" scene in response to the user selecting graphical element 1910, home application 304 can determine the current state (e.g., on or off, channel, input source, volume, etc.) of smart television 416. Home application 304 can save the current state of smart television 416 as the scene setting for smart television 416 in the "Movie Night" scene. If the user wishes to adjust the initial settings for a specific accessory, the user can select (e.g., long touch, pressure touch, etc.) the graphical element (e.g., graphical element 1904) corresponding to the specific accessory to invoke a graphical user interface (not shown) for adjusting the settings of the specific accessory.

Later, when the "Movie Night" scene is invoked by the user, home application 304 can send messages to each accessory associated with the "Movie Night" scene specifying the scene setting saved for the accessory to cause each accessory to assume the saved scene setting. For example, if the "Movie Night" scene setting for lamp 408 is 50% illumination and blue color, home application 304 (or home daemon 305) can send a message to lamp 408 indicating 50% illumination and blue color. In response to receiving the message from home application 304, lamp 408 can generate a blue light at 50% illumination. Similarly, if the "Movie Night" scene setting for smart television 416 is 70% volume and channel 4, home application 304 (or home daemon 305) can send a message to smart television 416 indicating 70% volume and channel 4. In response to receiving the message from home application 304, smart television 416 can adjust its volume to 70% and change its channel to channel 4. Thus, a scene can be automatically configured by taking a snapshot of the current settings of the accessories associated with the scene.

In some implementations, home application 304 can automatically configure scenes. For example, home application 304 (or home daemon 305) can automatically determine which accessories should be combined into a scene and the scene settings for each accessory based on historical patterns of use, as described above.

In some implementations, home application 304 can automatically configure scenes based on the most recently adjusted accessories. For example, the user can cause home application 304 to create a new scene based on a snapshot of the most recently adjusted accessories and their current states by selecting graphical element 607 of FIG. 6. When home application 304 receives the user input selecting graphical element 607, home application 304 can analyze the historical accessory state change data in accessory state database 308 to determine which accessories were adjusted within a previous period of time (e.g., the last 5 minutes, the last 10 minutes, etc.) and/or within a period of time of each other (e.g., within 5 minutes of each other). For example, home application 304 can determine that within the last 10 minutes the user adjusted lamp 408, lamp 410, smart television 416, smart fan 418, and two Bluetooth speakers all within 5 minutes of each other. Thus, lamp 408, lamp 410, smart television 416, smart fan 418, and the two Bluetooth speakers can be included in the snapshot scene.

Alternatively, home application 304 can create a snapshot scene based on the last assemblage of accessories to be adjusted within a short period of time of each other. For example, home application 304 can determine that the last (e.g., immediately preceding the time when graphical element 607 was selected) assemblage of accessories to be adjusted within a short period of time of each other (e.g., within a 5 minute period) includes lamp 408, lamp 410, smart television 416, smart fan 418, and two Bluetooth speakers.

After identifying the accessories for the snapshot scene, home application 304 can configure the snapshot scene with the current states of the adjusted accessories. For example, each accessory in the snapshot scene can be configured with a scene setting corresponding to its current state at the time when the snapshot scene was created (e.g., at the time when graphical element 607 was selected).

Figure 20:
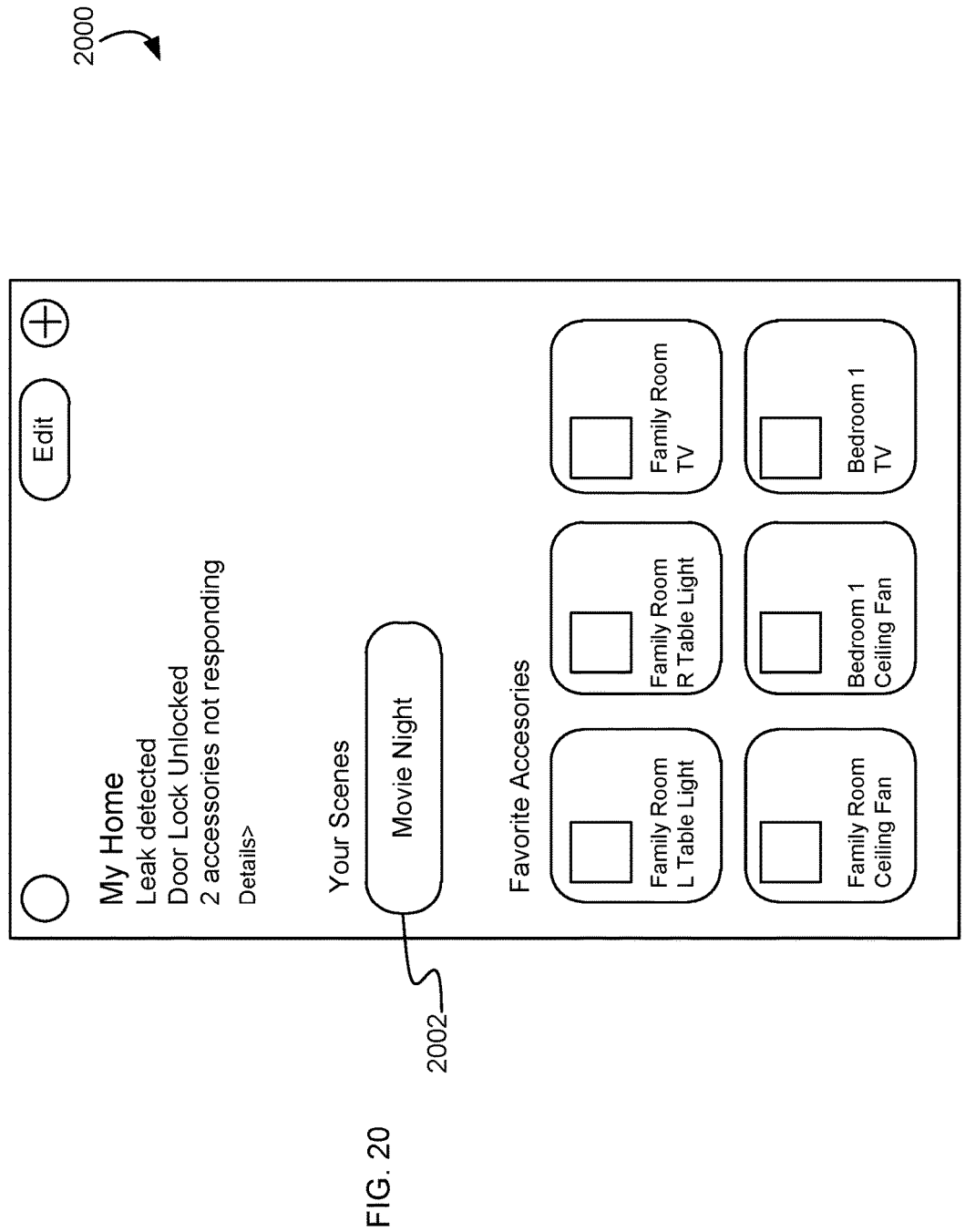
FIG. 20 illustrates an example graphical user interface presenting a representation of a scene.

FIG. 20 illustrates an example graphical user interface 2000 presenting a representation of a scene. For example, GUI 2000 can be presented by home application 304 on a display of user device 302. GUI 2000 can correspond to GUI 500 and/or GUI 800, for example.

In some implementations, GUI 2000 can include graphical element 2002 representing a scene managed by home application 304. For example, graphical element 2002 can represent a user-defined scene. Graphical element 2002 can represent a scene automatically generated by home application 304 based on historical patterns of accessory use, state changes, and/or settings. Graphical element 2002 can represent a snapshot scene, as described above.

In some implementations, home application 304 can perform a scene in response to the use selecting graphical element 2002. For example, when home application 304 receives input selecting graphical element 2002, home application 304 can send to each accessory associated with the corresponding scene a message specifying the scene setting for the accessory. When each accessory received the message, the accessories can adjust their settings to correspond to the specified scene setting. Thus, home application 304 can adjust the user's environment according to the configured scene.

Presenting Status Information

Figure 21A:
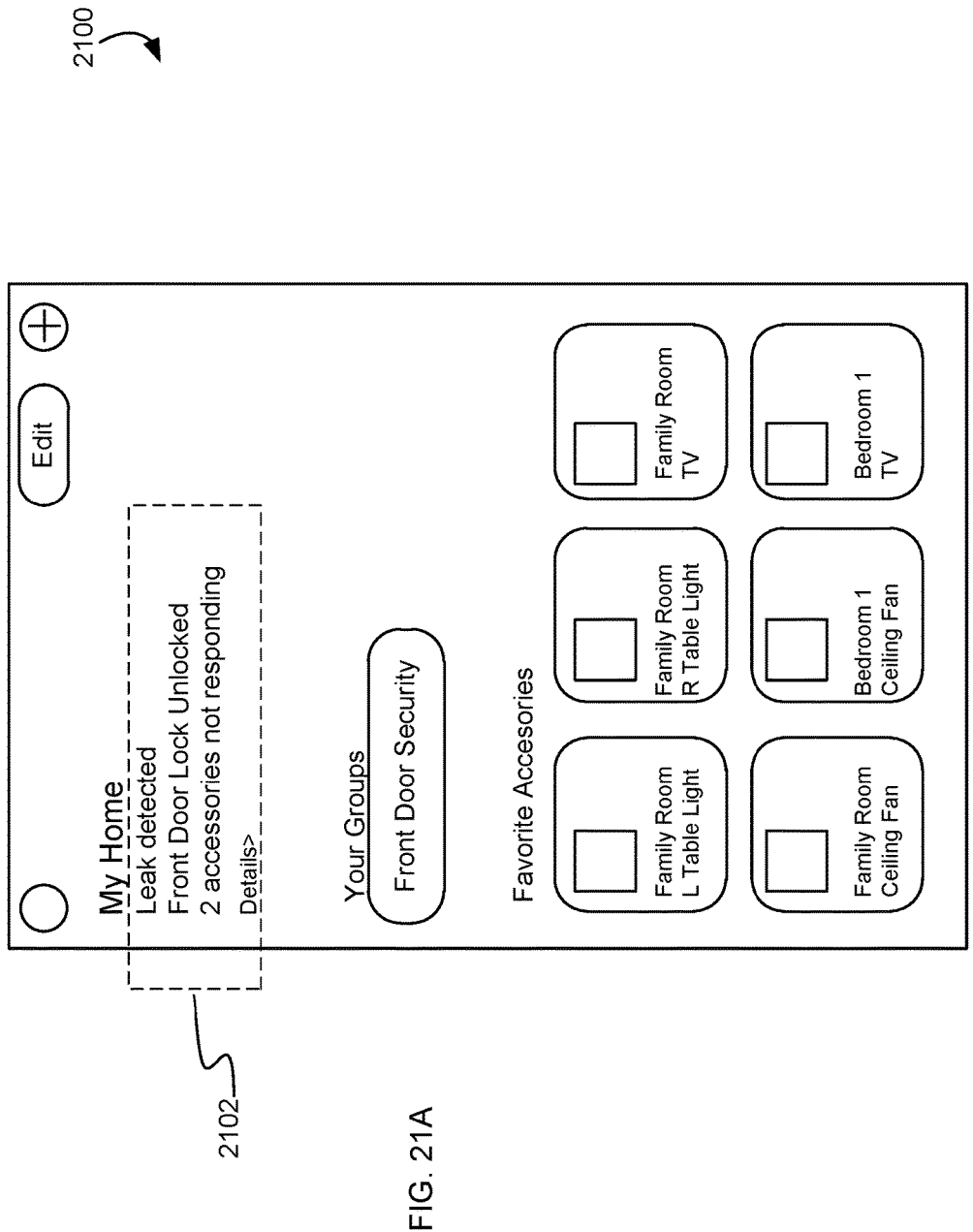
FIG. 21A illustrates an example graphical user interface presenting home application status information.

FIG. 21A illustrates an example graphical user interface 2100 presenting home application status information. For example, GUI 2100 can correspond to GUI 500 of FIG. 5. As described above, GUI 2100 can include status element 2102 (e.g., status element 501 of FIG. 5). Status element 2102 can, for example, present a graphical representation (e.g., text, images, etc.) of the status of home application 304 and/or accessories managed by home application 304 (e.g., accessory 310, accessory 320, etc.). For example, status element 2102 can present state information reported (e.g., sent) to home application 304 by accessories managed by home application 304. Because of the limited space available on GUI 2100 for status element 2102, status items presented by status element 2102 can be prioritized and/or aggregated to present the most important and greatest amount of status data in the least amount of space.

In some implementations, status data presented by status element 2102 can be prioritized based on status data classes. For example, high priority status items can be presented at the top of status element 2102 while lower priority status items can be presented in descending order of priority below the high priority status items. For example, home application 304 can classify status data into a safety class, security class, maintenance class, administrative class, and/or a general class, for example. The classes can be ranked, from high priority to low priority, 1) safety class, 2) security class, 3) maintenance class, 4) administrative class, and 5) general class. The classification for each item of status data (e.g., each state change event) can be determined by home application based on the accessory type reporting the status (e.g., state) data. For example, a lock accessory can be associated with the security class. A carbon monoxide detector can be associated with the safety class.

In some implementations, the classification for each piece of status data received by home application 304 can be determined based on a classification assigned to the state or status information by the reporting accessory or device. For example, while a carbon monoxide detector may report a high priority (e.g., safety class) alarm state when the carbon monoxide detector detects carbon monoxide, the carbon monoxide detector may report a low priority (e.g., maintenance class) state when the carbon monoxide detector's battery is low. The carbon monoxide detector (e.g., accessory 310) can specify the classification or priority of the reported state when reporting the state to home application 304.

In some implementations, home application 304 can aggregate or summarize status data items. For example, when home application 304 receives a single accessory status item for a classification (e.g., general class), home application 304 can present a detailed description of the status item on status element 2102. For example, when the bedroom fan reports that its state is 'on', home application 304 can present a status item (e.g., text) on status element 2102 indicating "bedroom fan is on." When home application 304 receives multiple accessory status items for a classification (e.g., general class), home application 304 can present a rolled up, aggregated or more abstract description of the status item on status element 2102. For example, if the bedroom fan and the living room fan both report that they are 'on', then home application 304 can present a status item indicating "2 fans are on" or "fans are on." If the bedroom fan, living room fan and kitchen light are on, then home application 304 can present a status item indicating "3 accessories are on." Thus, home application 304 can adjust the specificity of the status reported on status element 2102 based on the amount and/or classification of status data received by home application 304.

In some implementations, home application 304 can deprioritize status data items based on context. For example, when the front door lock accessory reports that the front door is unlocked, the unlocked status of the front door lock can be initially treated by home application 304 as a high priority, security class status item. However, when the front door lock accessory reports that the front door is unlocked, home application 304 can determine the location of user device 302 to determine whether the user is located at the user's home. If the user is at home (e.g., user device 302 is at home), home application 304 can deprioritize the unlocked status of the front door lock. For example, when the user is at home, home application 304 can change the classification of the unlocked status item from a security class status item to a general class status item. Thus, home application 304 can deprioritize a status item based on the user's context. However, if the user (e.g., user device 302) later leaves the user's home and the front door lock is still reporting an unlocked state, home application 304 can elevate the priority of the unlocked status by changing the classification of the unlocked status back to a security class status item.

In some implementations, certain classes of status items and/or accessories cannot be deprioritized. For example, the safety class of accessories and/or status items may not be deprioritized because deprioritizing the safety class of status items may prevent the user from being notified about a status or event that may harm the user and/or the user's family. For example, a safety class accessory can include a carbon monoxide sensor, smoke detector, or other accessory that monitors for safety issues.

In some implementations, home application 304 can filter status items based on a user role. For example, home application 304 can be installed on multiple different user devices belonging to different users. The home applications on the different devices may all manage and/or monitor accessories in the same house, building, etc. For example, the user of user device 302 may be a member of a family having multiple users each having a user device similar to user device 302. Each device can have an instance of home application 304 installed. Each instance of home application 304 can manage and/or monitor the accessories in the same house, as described above. However, each family member (e.g., user) can be assigned a user role. For example, a parent in the family can be assigned an administrator role, whereas a child can be assigned an operator role by an administrator. For example, the administrator role can allow a user (e.g., the parent) to modify the configuration (e.g., network configuration, security settings, etc.) of accessories on the house, while the operator role may limit a user (e.g., the child) to just using (e.g., turn on/off, manipulate features, etc.) the accessories in the house.

In some implementations, a visitor role can be defined that allows the administrator to assign access permissions to certain accessories to a user. For example, the administrator can assign a visitor role to the family's dog walker or house keeper that allows the dog walker or house keeper to access and/or unlock the front door lock. The access permissions can indicate a time period for accessing the specified accessory. For example, if the dog walker or the house keeper is expected to access the house at a specific time, the administrator can assign the visitor role to the dog walker and/or the house keeper and specify that the dog walker and/or the house keeper can access and/or unlock the front door lock for a specified time period (e.g., two hours) starting at an agreed upon time (e.g., 1 pm).

After the roles are assigned to users, home application 304 can filter status items presented on GUI 2100 according to the role assigned to the user. For example, home application 304 may present safety and security class status items to all users regardless of role. Home application 304 may present maintenance class and/or administrative class status items only to users having the administrator role. While general class status items can be presented to all user roles.

Figure 21B:
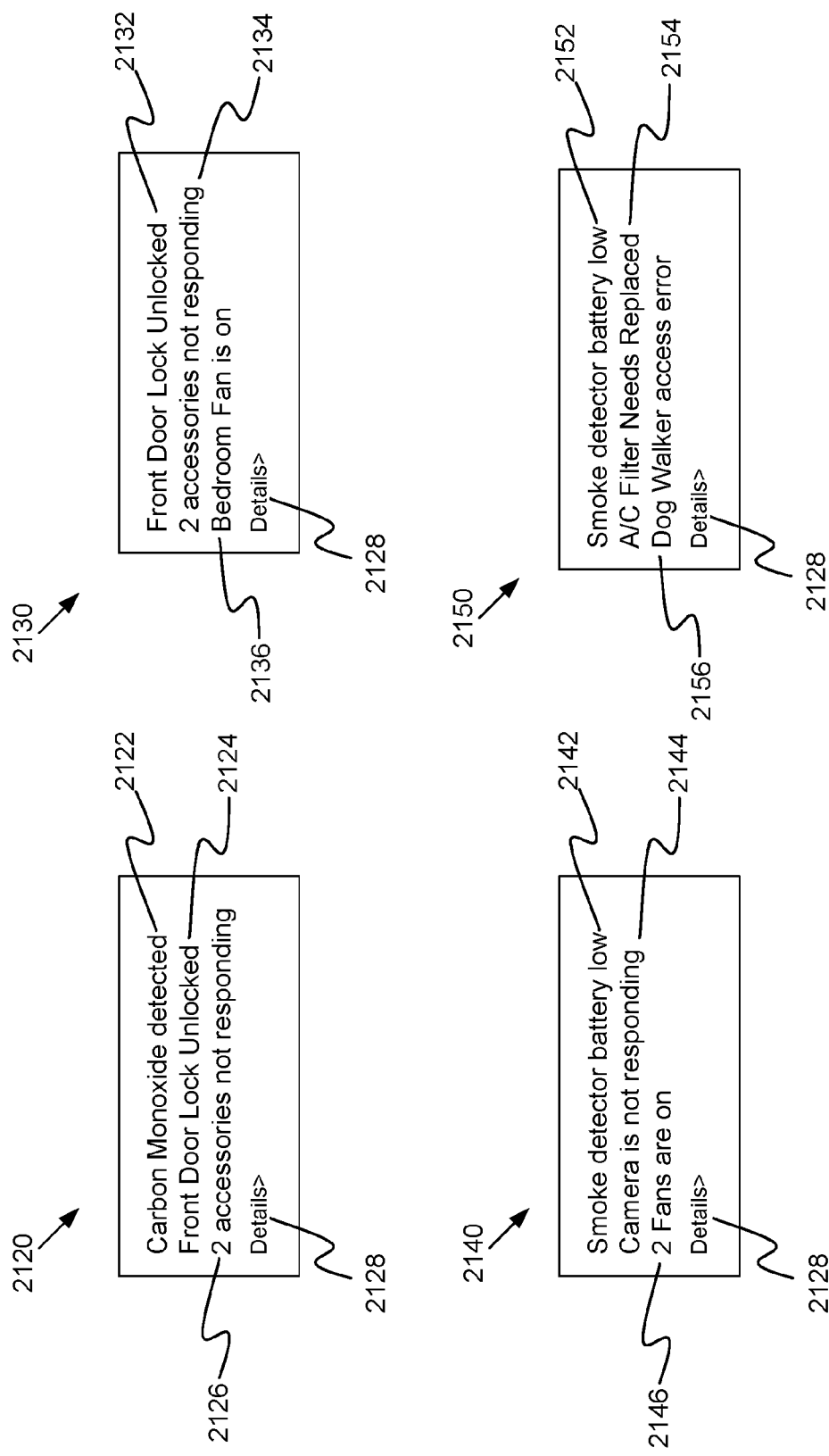
FIG. 21B illustrates examples of status data presented by the home application.

FIG. 21B illustrates examples of status data 2120, 2130, 2140 and 2150 presented by home application 304 on status element 2102. For example, status element 2102 may have limited space for presenting status items reported to home application 304, thus home application 304 can prioritize and/or summarize status data items in order to fit as much status data as possible on status element 2102. For example, status element 2102 may have room for only a certain number (e.g., 3, 4, 5, etc.) of lines of status data. Thus, home application 304 may only be able to present a portion of the available status data (e.g., as determined based on priority) received by home application 304 on status element 2102.

In some implementations, status data 2120 can present safety class status data 2122 at the top of status data 2120 because safety class status data 2122 is the highest priority class. For example, home application 304 can generate safety class status data 2122 indicating that the carbon monoxide detector accessory has reported that carbon monoxide has been detected in the user's house. Below safety class status data 2122, status data 2120 can present security class status data 2124 because security class status data 2124 is the next highest priority class after safety class status data 2122. For example, home application 304 can generate security class status data 2124 indicating that the front door lock accessory has reported that the front door of the user's house is unlocked. Below security class status data 2124, status data 2120 can present administrative class status data 2126 because administrative class status data 2126 is the next highest priority class after security class status data 2124. For example, home application 304 can generate administrative class status 2126 indicating that two accessories managed by home application 304 are not responding or are not reachable over the network. When the user wishes to view more details about the status data, the user can select graphical element 2128 to cause home application 304 to present a detailed view of the status data.

In some implementations, status data 2130 can present security class status data 2132 at the top of status data 2130 because security class status data 2132 is the highest priority class of status data received by home application 304 when status data 2130 is presented. Stated differently, home application 304 can present security class status data at the top of status data 2130 when there is no safety class status data to present. For example, home application 304 can generate security class status data 2132 indicating that the front door lock accessory has reported that the front door of the user's house is unlocked. Below security class status data 2132, status data 2130 can present administrative class status data 2134 because administrative class status data 2134 is the next highest priority class after security class status data 2132. For example, home application 304 can generate administrative class status 2134 indicating that two accessories managed by home application 304 are not responding or are not reachable over the network. Below administrative class status 2134, status data 2130 can present general class status data 2136 because general class status data 2136 is the next highest priority class after administrative class status 2134. For example, home application 304 can generate general class status data 2136 indicating that the bedroom fan is on. When the user wishes to view more details about the status data, the user can select graphical element 2128 to cause home application 304 to present a detailed view of the status data.

In some implementations, status data 2140 can present maintenance class status data 2142 at the top of status data 2140 because maintenance class status data 2142 is the highest priority class of status data received by home application 304 when status data 2140 is presented. Stated differently, home application 304 can present maintenance class status data at the top of status data 2130 when there is no safety class status data and no security class status data to present. For example, home application 304 can generate maintenance class status data 2142 indicating that the smoke detector accessory has reported that the smoke detector's battery is low. For example, even though the smoke detector accessory is a safety class accessory, the smoke detector accessory has reported a maintenance class status item (e.g., battery low) to home application 304. Thus, home application 304 can present the battery low status item from a safety class accessory as a maintenance class status item.

Below maintenance class status data 2142, status data 2140 can present administrative class status data 2144 because administrative class status data 2144 is the next highest priority class after maintenance class status data 2142. For example, home application 304 can generate administrative class status 2144 indicating that a camera accessory managed by home application 304 is not responding or is not reachable over the network. Below administrative class status 2144, status data 2140 can present general class status data 2146 because general class status data 2146 is the next highest priority class (e.g., lowest priority class) after administrative class status 2144. For example, home application 304 can generate general class status data 2146 indicating that two fans are on in the house. When the user wishes to view more details about the status data, the user can select graphical element 2128 to cause home application 304 to present a detailed view of the status data.

In some implementations, status data 2150 can present maintenance class status data 2142 at the top of status data 2140 because maintenance class status data 2142 is the highest priority class of status data received by home application 304 when status data 2140 is presented. Stated differently, home application 304 can present maintenance class status data at the top of status data 2130 when there is no safety class status data and no security class status data to present. For example, home application 304 can generate maintenance class status data 2152 indicating that the smoke detector accessory has reported that the smoke detector's battery is low. Below maintenance class status data 2152, status data 2150 can present another maintenance class status data 2154. For example, home application 304 can generate maintenance class status 2154 indicating that the air conditioner filter needs to be replaced. Home application 304 can generate and present two separate maintenance status items (e.g., 2152 and 2154) on status data 2150 because the two maintenance status items indicate different maintenance tasks (e.g., replace battery, replace filter). However, in some implementations, home application 304 can present a summary of these two maintenance class status items indicting "2 accessories need maintenance" instead of presenting status items 2152 and 2154. Below maintenance class status data 2154, status data 2150 can present administrative class status data 2156 because administrative class status data 2156 is the next highest priority class after maintenance class status data 2154. For example, home application 304 can generate administrative class status data 2156 indicating a user management error. For example, the user management error can be presented when there was some failure when a user attempts to access an accessory. For example, the administrator user may have configured a visitor role for the dog walker that grants the dog walker access to the front door lock. If, when the dog walker attempts to unlock the front door lock, the dog walker is unable to access and/or unlock the front door lock, the front door lock and/or the dog walker's instance of the home application can report a user management error to home application 304 on user device 302. Home application 304 can then present the user management error as an administrative class status item on status data 2150. When the user wishes to view more details about the status data, the user can select graphical element 2128 to cause home application 304 to present a detailed view of the status data.

FIG. 22 illustrates an example graphical user interface 2200 for presenting a detailed view of home application status data. For example, home application 304 can present GUI 2200 on a display of user device 302 in response to receiving a user selection of graphical element 2128, as described with reference to FIG. 21 above.

In some implementations, GUI 2200 can present details about which accessories contributed to the status data presented in status element 2102. For example, when the user selects graphical element 2128 on status data 2120 of FIG. 21B, home application 304 can present GUI 2200 including representations of accessories that contributed to status data 2120. GUI 2200 can present graphical element 2202 representing the carbon monoxide detector accessory that reported carbon monoxide was detected in the user's house. For example, graphical element 2202 can identify the accessory (e.g., carbon monoxide "CO" detector) and the current state of the accessory (e.g., carbon monoxide "CO" detected). GUI 2200 can present graphical element 2204 representing the front door lock accessory that reported the front door is unlocked.

In some implementations, GUI 2200 can present graphical elements 2206 and 2208 representing the two accessories that are not responding to or unreachable by home application 304. For example, graphical elements 2206 and 2208 can be highlighted, diminished, or otherwise graphically modified to distinguish the unresponsive (e.g., not connected) accessories from the responsive accessories (e.g., corresponding to graphical elements 2202 and 2204).

In some implementations, GUI 2200 can provide details of summarized status items. For example, even though home application 304 presented a summary that described two unresponsive accessories without identifying the accessories, GUI 2200 can present individual representations (e.g., graphical elements 2206 and 2208) of the summarized accessory states including identifiers for each accessory. Thus, the user can obtain additional details about accessory states by invoking GUI 2200.

Figure 23:
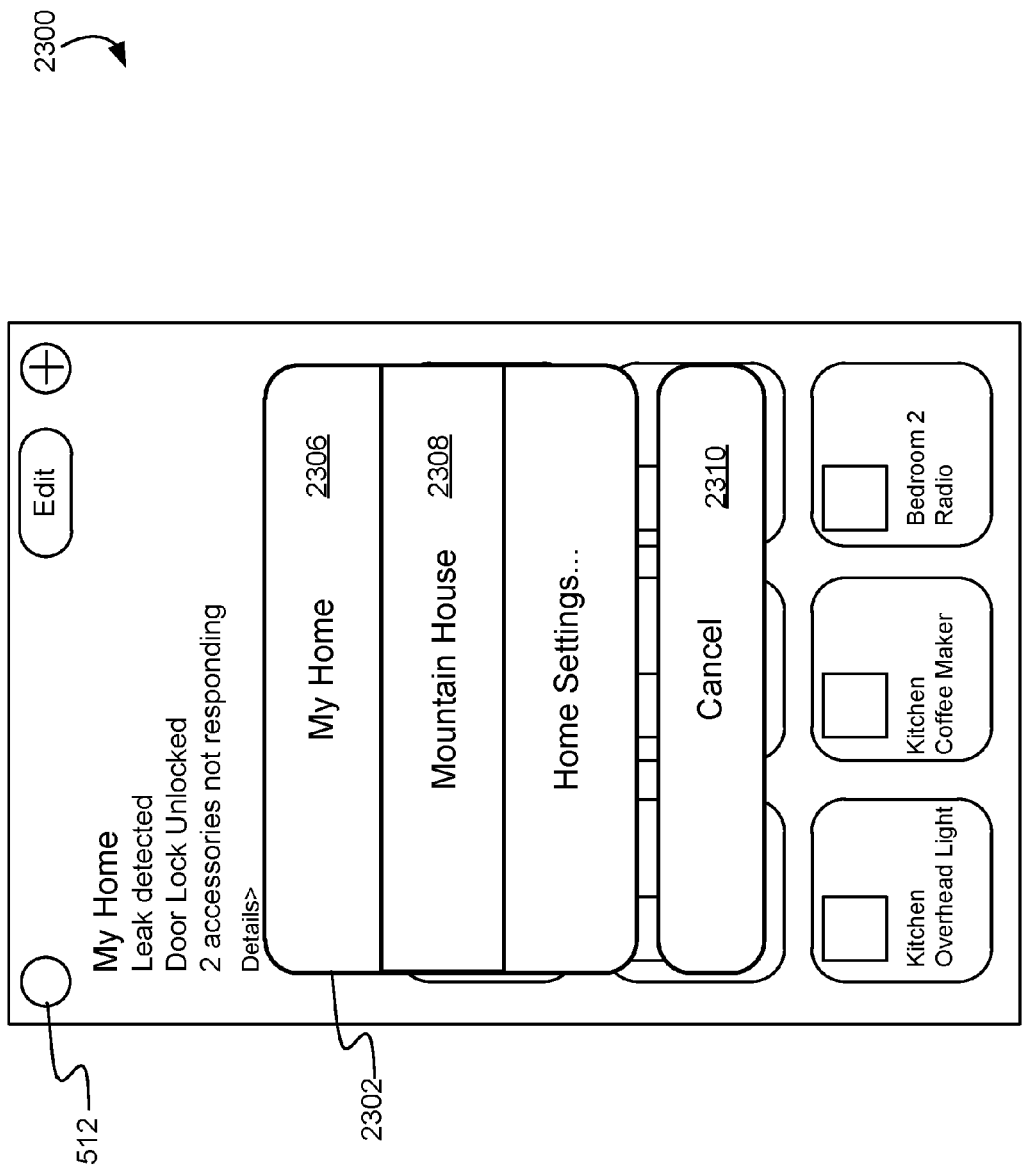
FIG. 23 illustrates an example graphical user interface for selecting a home environment in the home application.

FIG. 23 illustrates an example graphical user interface 2300 for selecting a home environment in home application 304. For example, home application 304 can present GUI 2300 on a display of user device 302. In some implementations, GUI 2300 can be invoked by the use of user device 302 by selecting graphical element 512 of GUI 500 as described above with reference to FIG. 5.

In some implementations, GUI 2300 can include graphical element 2302 for selecting a home environment. For example, graphical element 2302 can be presented by home application 304 in response to the user selecting graphical element 512. Graphical element 2302 can be a pop up menu or a graphical overlay presented over GUI 500, for example. Graphical element 2302 can identify each of the home environments configured in home application 304. For example, if home application 304 is configured with the user's primary home (e.g., "My Home") and the user's secondary home (e.g., "Mountain house"), then graphical element 2302 can include graphical elements 2306 and 2308 representing the user's primary home environment (e.g., "My Home") and the user's secondary home or vacation home (e.g., "Mountain House"), respectively.

In some implementations, home application 304 can switch the home environment presented by home application 304 in response to the user selecting a home environment presented on graphical element 2302. For example, home application 304 may provide a view into only one home environment at a time. The user can select graphical element 2306 corresponding to a first home environment (e.g., the user's primary home) to view the accessories, accessory status, service groups, scenes and other information about the first home environment and/or to control the accessories or devices in the first home environment through home application 304. When the user wishes to view a second home environment (e.g. the secondary home, vacation home, office, etc.), the user can select graphical element 2308 corresponding to the second home environment to view the accessories, accessory status, service groups, scenes and other information about second home environment and/or to control the accessories or devices in the first home environment through home application 304. Thus, the information presented by home application 304 and/or the accessories controlled by home application 304 at a particular moment in time can be determined based on the home environment selected at the particular moment in time.

In some implementations, graphical element 2302 can be dismissed upon receiving a selection of a home environment. Alternatively, the user can dismiss graphical element 2302 without selecting a home by selecting graphical element 2310.

Figure 24:
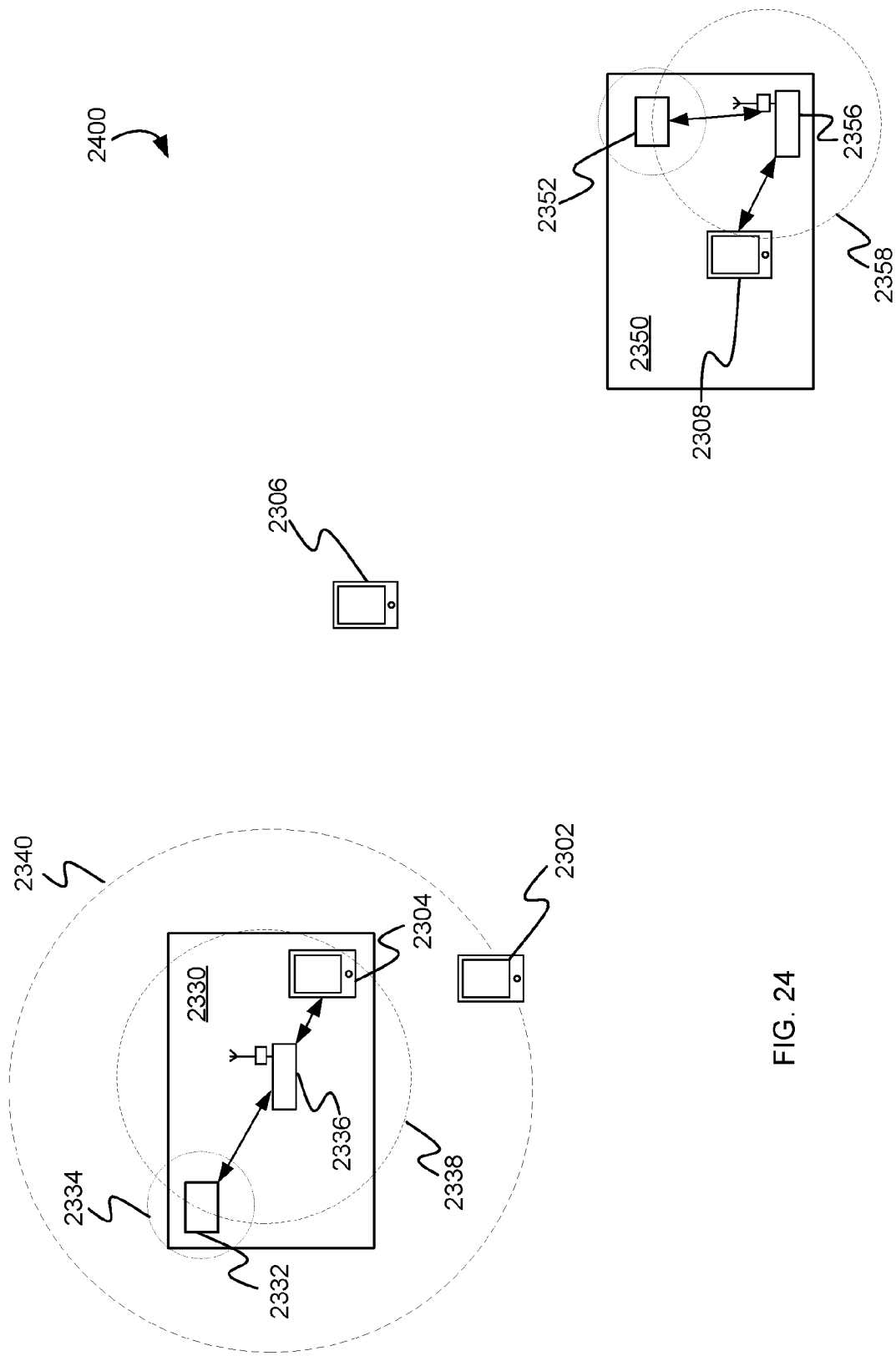
FIG. 24 is an illustration of an example process for automatically selecting a home environment for presentation by the home application.

FIG. 24 is an illustration 2400 of an example process for automatically selecting a home environment for presentation by home application 304. For example, illustration 2400 depicts the positions of user devices 2302-2310 relative to a first home environment 2330 and a second home environment 2350. User devices 2302-2310 can correspond to user device 302, for example. Each user device 2302-2310 can represent the same user device 302 or different devices that are configured similarly to user device 302.

In some implementations, the home application (e.g., home application 304) or home daemon (e.g., home daemon 305) on each user device 2302-2310 can automatically select a home environment (e.g. a current home environment) to present and/or control on the graphical user interfaces of home application 304 based on home environment location information. When home daemon 305 determines a home environment, home daemon 305 can send the home environment determination to home application 304 for presentation to the user.

Determining Home Environment Location

In some implementations, home application 304 can determine location information for a home environment when an accessory is added to the home environment. For example, a user can select graphical element 603 to add a new accessory to a home environment. The accessory can, for example, be added to the home environment presented on GUI 500 and/or GUI 600 when graphical element 602 and/or graphical element 603 is presented. For example, the user can select a home environment and then add the accessory to the selected home environment.

In some implementations, home application 304 can determine that user device 302 is in a particular home environment when the accessory is added. For example, an accessory can be added to home application 304 when home application 304 (e.g., or user device 302) can establish a local (e.g., using a local, in-home Wi-Fi network, Bluetooth, Bluetooth LE, peer-to-peer Wi-Fi, other peer-to-peer connection, etc.) connection to the accessory. Thus, since user device 302 is in the same home environment as the new accessory, and the user has identified the home environment by selecting the home environment for the accessory, home application 304 can determine that user device 302 is located in the selected home environment (e.g., "My Home") at the time when the new accessory is added to the home environment.

In some implementations, home application 304 can collect geographical location information for the selected home environment when the accessory is added. For example, since user device 302 is located in the selected home environment (e.g., "My Home"), the current geographic location of user device 302 is also the geographic location of the selected home environment. For example, the current geographic location of user device 302 can be determined by user device 302 using location determining subsystems of user device 302. These subsystems can determine the current geographic location of user device 302 using global navigational satellite signals, cellular tower signals, Wi-Fi access point signals, or a combination thereof, using well-known techniques. Home application 304 can associate the current geographic location of user device 302 with the selected home environment at the time when the new accessory is added to the selected home environment. Thus, the geographic location of the selected home environment can be determined based on the current geographic location of user device 302 at the time when the new accessory is added to the selected home environment.

In some implementations, home application 304 can generate a geofence around the geographic location of a home environment that can be used to determine when the user is entering or leaving the home environment. For example, after the geographic location of the selected home environment is determined, home application 304 can generate a geofence around the geographic location of the selected home environment. The geofence can, for example, be a circular geofence centered on the geographic location of the selected home environment and having a 150 foot radius. Home application 304 can later determine when the user or user device 302 is entering the selected home environment when user device 302 enters the geofence generated for the home environment.

In some implementations, home application 304 can collect network identification information to associate with the selected home environment when an accessory is added to the home environment. For example, wireless access points (e.g., Wi-Fi routers, Wi-Fi access points, etc.) are rarely moved after being installed in a home environment. Similarly, accessories installed in a home environment are rarely moved after being installed in the home environment. Wireless access points and accessories typically have short transmission ranges. Thus, if home application 304 is connected to an accessory through a wireless access point associated with a home environment, user device 302 is most likely in the home environment.

To generate the association between wireless access point and a home environment within home application 304, home application 304 can collect a wireless access point identifier (e.g., MAC address, SSID, BSSID, etc.) for the wireless access point connected to user device 302 at the time when the new accessory is added to the selected home environment, as described above. Home application 304 can then associate the wireless access point identifier (e.g., network identifier) with the home environment so that later, when user device 302 connects to a wireless access point and receives a wireless access point identifier, home application 304 can determine that user device 302 is in the home environment associated with the received wireless access point identifier.

In some implementations, home application 304 can collect accessory identification information to associate with the selected home environment when an accessory is added to the home environment. For example, accessories installed in a home environment typically have wireless networking hardware (e.g., radio transceivers, Wi-Fi, Bluetooth, etc.) that have very short transmission ranges. To connect directly to one of these accessories, user device 302 must be in close proximity to the accessory. Thus, if user device 302 is directly connected to the accessory, user device 302 must be in the same home environment as the connected accessory. Accordingly, when user device 302 is connected to an accessory, user device 302 can obtain an identifier (e.g., MAC address, BSSID, SSID, etc.) for the accessory based on the wireless signal received from the accessory and associate the accessory identifier with the home environment selected for the accessory. Later, when user device 302 is directly connected to the accessory and receives the accessory identifier, home application 304 can determine that user device 302 is in the home environment associated with the accessory identifier.

Home application 304 can store (e.g., in a metadata file, configuration file, database, etc.) home environment location data associating the selected home environment (e.g., home environment identifier, home environment label, etc.) with the determined home environment geographical location, the home environment geofence, the home environment network identifier, and/or accessory identifiers for accessories assigned to the home environment by the user. Thus, when user device 302 changes locations, connects to a Wi-Fi network, or connects to an accessory, home application 304 can determine in which home environment user device 302 is currently located based on the home environment location data.

Automatically Selecting A Home Environment

In some implementations, home application 304 can automatically select a home environment to present to the user based on home environment location data. For example, the user of user device 302 can move user device 302 in and out of a home environment or between home environments and home application 304 can detect when the user device 302 enters and/or exits a home environment based on the home environment location data (e.g., geographic location, geofence, network identifier, accessory identifier, etc.) associated with the home environment.

For example, when user device 2302 (e.g., user device 302) enters geofence 2340 of home environment 2330 (e.g., "My Home"), home application 304 can select home environment 2330 as the current home environment in home application 304. For example, home application 304 can determine that user device 2302 has entered geofence 2340 based on the current geographical location of user device 2302 as determined by the location determining subsystems described above.

However, for various reasons (e.g. signal multipath, cloud cover, etc.), the current geographical location of user device 2302 may be incorrect. Thus, when user device 2302 moves within range of wireless access point 2336, as depicted by user device 2304 and line 2338, home application 304 can confirm that user device 2304 is in the home environment associated with the identifier for wireless access point 2336. Similarly, when user device 2304 moves within range of accessory 2332, as depicted by line 2334, home application 304 can confirm that user device 2304 is in the home environment associated with the identifier for 2332. Thus, even though the current geographical location of user device 2304 may be unavailable or incorrect, home application 304 can accurately determine when user device 2304 is in home environment 2330 and reconfigure home application 304 to present accessories, service groups, scenes, status and other data or graphical user interfaces associated with home environment 2330.

Automatically Enabling Remote Access

In some implementations, home application 304 or home daemon 305 can automatically enable remote access to a home environment when a user device leaves a home environment. For example, when user device 2304 is in home environment 2330 and connected to wireless access point 2336, user device 2304 has local access to accessory 2332 through wireless access point 2336. When user device 2304 moves outside of home environment 2330, as represented by user device 2306, user device 2306 is no longer connected to wireless access point 2336 and must connect to a coordinator (e.g., coordinator 210) within home environment 2330 (e.g., on wireless access point 2336) to enable remote access to accessory 2332 in home environment 2330. In some implementations, a user of user device 2306 can enable remote access by interacting with home application 304. For example, the user can invoke a user interface of home application 304 and provide input selecting a graphical element to enable remote access to home environment 2330.

In some implementations, home application 304 can automatically determine when user device 2306 exits home environment 2330. For example, as user device 2306 moves away from home environment 2330, user device 2306 will lose the connection to wireless access point 2336. For example, user device 2306 may move beyond the transmission range of wireless access point 2336. If user device 2306 is unable to determine its current geographical location (e.g., no global navigational satellite signal, satellite receiver turned off, cloud cover, etc.), home application 304 can determine that user device 2306 has exited home environment 2330.

When user device 2306 can determine its current geographical location (e.g., location subsystems are turned on, satellite reception is good, etc.), then when user device 2306 moves outside the range of wireless access point 2336, home application 304 can determine that user device 2306 is still within the home environment when the current geographical location of user device 2306 is within geofence 2340. However, when the current geographical location of user device 2306 is outside of geofence 2340, home application 304 can determine that user device 2306, and therefore the user, has exited home environment 2330.

In some implementations, home application 304 can automatically enable remote access to home environment 2330 when user device 2306 exits home environment 2330. For example, home application 304 can establish a connection to a coordinator device (e.g., coordinator 210) within home environment 2330 through a wide area network (e.g., the Internet) so that the user can control accessories and receive accessory status from accessories within home environment 2330 even though user device 2306 is no longer locally (e.g., directly) connected to wireless access point 2336.

In some implementations, home application 304 can retain home environment 2330 as the current home environment presented on graphical user interfaces of home application 304 when user device 2306 has exited home environment 2330. Alternatively, home application 304 can automatically switch the current home environment presented on graphical user interfaces of home application 304 to a user specified primary home environment upon exiting home environment 2330.

Using Motion to Confirm Exit

In some implementations, home application 304 (or home daemon 305) can use motion data to confirm that user device 2308 has exited home environment 2350. For example, user device 2308 can correspond to user device 302, as described above. User device 2308 can include motion sensors (e.g., accelerometer, gyroscopes, etc.) for detecting the movements of user device 2308, if any. The motion sensors can detect the motion of user device 2308 and generate motion data describing the motion of user device 2308.

In some implementations, user device 2308 can be intermittently connected to wireless access point 2356. For example, home application 304 on user device 2308 may be connected to accessory 232 in home environment 2350 through wireless access point 2356 but user device 2308 may be at the edge (e.g., limit) of the transmission range of wireless access point 2356, as indicated by line 2358. When at the limit of the transmission range of wireless access point 2356, user device 2308 may repeatedly connect to and disconnect from wireless access point 2356 because of the weak or intermittent signal received from wireless access point 2356 at the location of user device 2308. If user device 2358 is unable to determine its current geographical location, home application 304 may automatically and repeatedly determine that user device 2350 has exited and entered home environment 2350 and automatically and repeatedly switch between local access to home environment 2350 and remote access to home environment 2350 thereby causing a user device 2308 to waste battery power, processing cycles, and/or network resources.

To avoid repeatedly cycling between local access and remote access to home environment 2350, home application 304 can confirm that user device 2308 has exited home environment 2350 using motion data generated by motion sensors on user device 2308. For example, home application 304 can obtain motion sensor data for a period of time (e.g., 2 minutes, 3 minutes, etc.) immediately before losing the connection to wireless access point 2356 and/or a period of time immediately after losing the connection to wireless access point 2356. Home application 304 can determine based on the motion data whether user device 2308 was moving or in motion at the time when the connection to wireless access point 2356 was lost. If user device 2308 was in motion when the connection to wireless access point 2356 was lost, home application 304 can determine that user device 2308 moved away from wireless access point 2356 and has, therefore, exited home environment 2350. If user device 2308 was not in motion when the connection to wireless access point 2356 was lost, home application 304 can determine that user device 2308 has not moved away from wireless access point 2356 (e.g., the wireless access point was turned off or the signal is too weak) and has, therefore, not exited home environment 2350. Thus, home application 304 can confirm whether user device 2358 has exited home environment 2350 or remains within home environment 2350 based on the movement of user device 2358.

Example Processes

Figure 25:
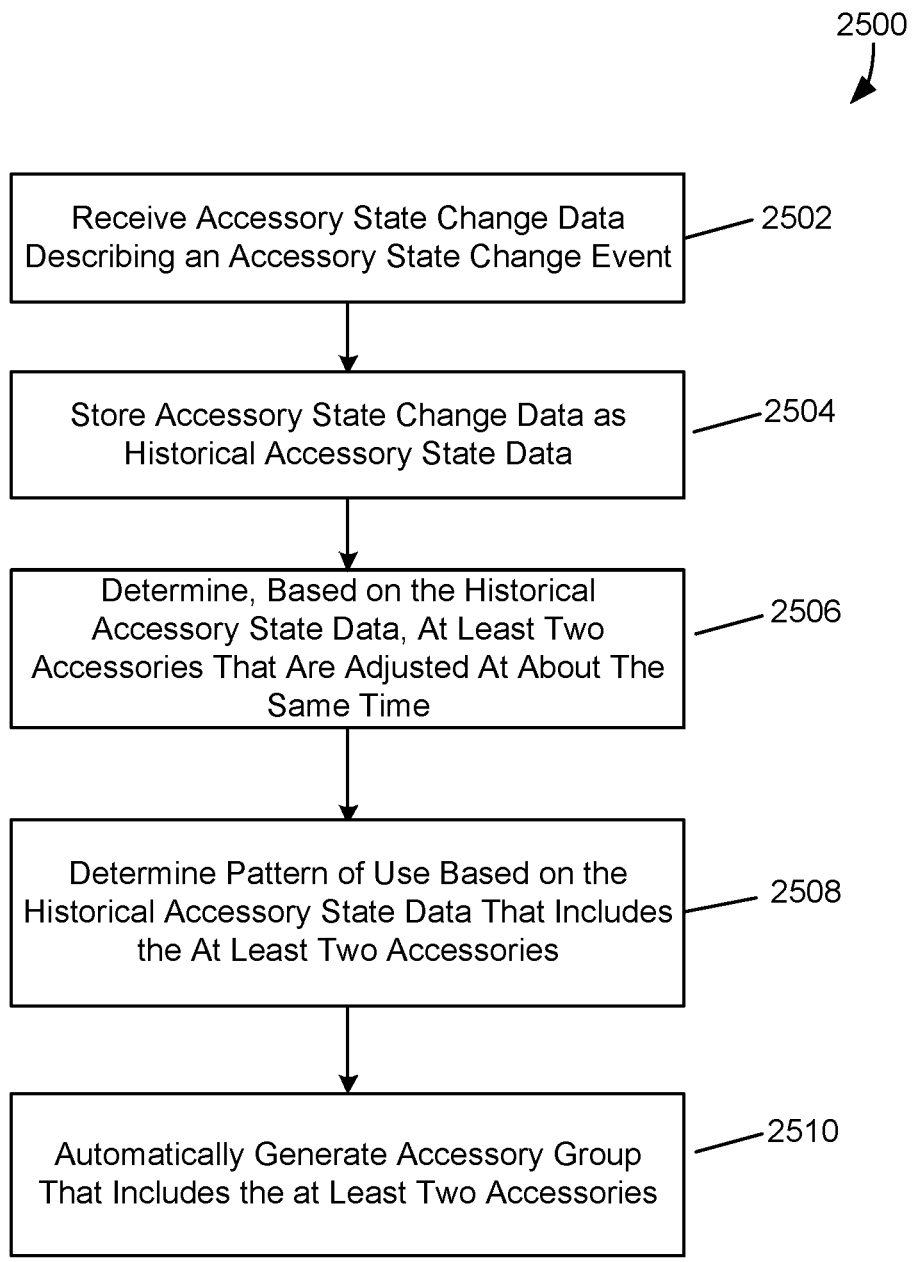
FIG. 25 is flow diagram of an example process for automatically generating a service group.

FIG. 25 is flow diagram of an example process 2500 for automatically generating a service group. For example, home application 304 can automatically generate a service group based on historical accessory state change data that indicates that two or more accessories typically change state at about the same time, as discussed above with reference to FIG. 4. Process 2500 can be performed by home application 304 periodically (e.g., based on a time interval). Process 2500 can be performed by home application 304 in response to receiving accessory state change data from an accessory. Process 2500 can be performed by home application 304 in response to the user initiating the creation of a new service group. For example, home application 304 can perform process 2500 to suggest a new service group to the user in response to the user selecting graphical element 604 of FIG. 6.

At step 2502, user device 302 can receive accessory state change data describing an accessory state change event. For example, home application 304 can, over time, can receive accessory state change events from various accessories that describe accessory state changes that occur at different points in time. The accessory state change data can include an identifier for the accessory reporting the state change event, a timestamp indicating when the state change occurred, and the new state of the accessory, for example.

At step 2504, user device 302 can store the accessory state change data as historical accessory state data. For example, home application 304 can store the accessory state change data received at step 2502 in accessory state database 308.

At step 2506, user device 302 can determine, based on the historical accessory state data, at least two accessories that are adjusted at about the same time. For example, home application 304 can search through accessory state database to find clusters or groupings of accessories that change state at about the same time. Home application 304 can, for example, identify groups of accessories that change states at about the same time (e.g., within 5 minutes, within 9 minutes, etc.) and where the state changes are related to user-facing features (e.g., on/off, dimmer level, speed, volume, etc.) and not related to accessory configuration settings, error states, and the like. Stated differently, home application 304 can identify state changes that are relevant or related to how the user uses the accessory when determining which accessories are adjusted at about the same time.

At step 2508, user device 302 can determine a historical pattern of use based on the historical accessory state data that includes at least two accessories. For example, after identifying accessories that change states at about the same time, home application 304 can determine whether a historical pattern of state changes exists in accessory state database 308 for the identified accessories. For example, if the group of accessories identified at step 2506 only occurs once in database 308, then there is no historical pattern of use and home application 304 can attempt to identify another service group. If the group of accessories identified at step 2506 appear together (e.g., temporally) many times (e.g., at least 10 times) in database 308, then home application can determine that a pattern of use exists that indicates the identified accessories are related.

At step 2510, user device 302 can automatically generate a service group that includes the at least two accessories. For example, when home application 304 determines a pattern of use exists that indicates the identified accessories are related, home application 304 can automatically create a service group that allows the user to manage and/or control the accessories in the service group as if a single accessory.

Figure 26:
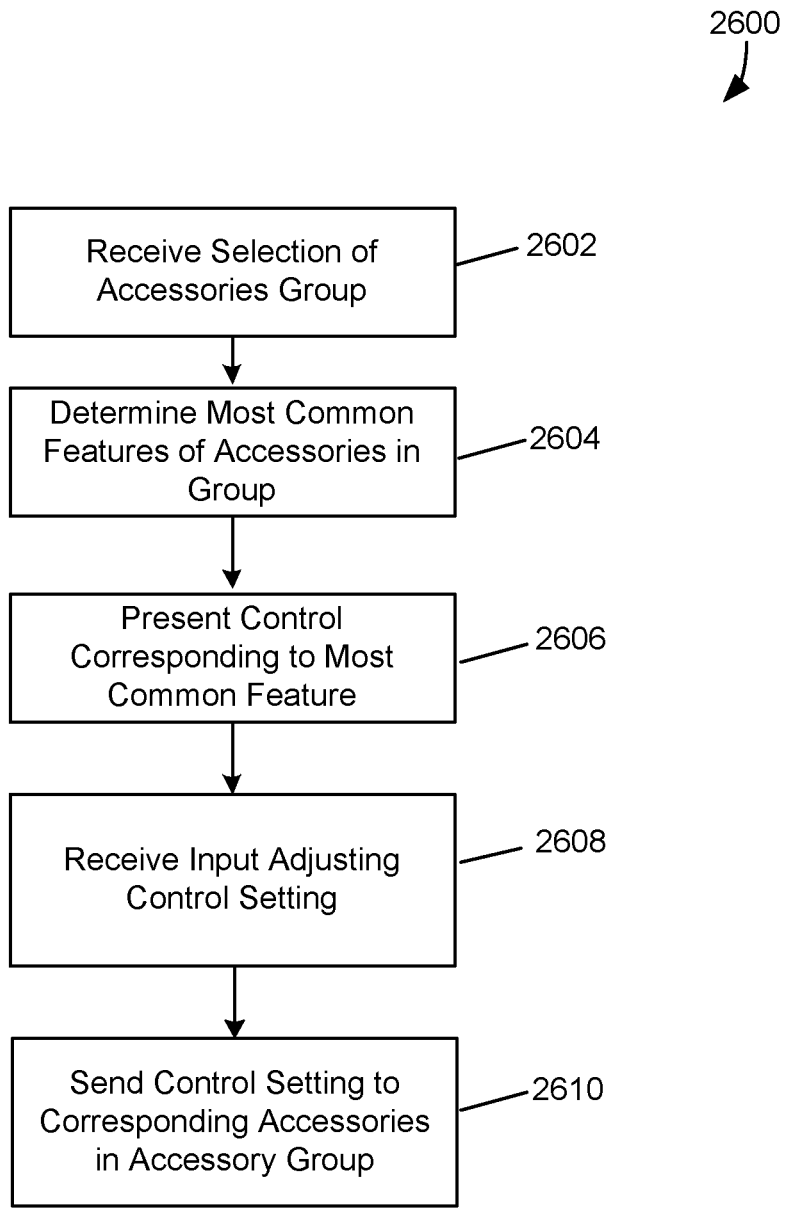
FIG. 26 is a flow diagram of an example process for selecting service group controls.

FIG. 26 is a flow diagram of an example process 2600 for selecting service group controls. For example, a service group may include a heterogeneous group of accessories having a variety of different controls. Home application 304 can use process 2600 to determine what controls to present for a service group and/or when to present the controls, as described above with reference to FIGS. 9-12.

At step 2602, user device 302 can receive a selection of a service group. For example, home application 304 can receive a selection of a graphical representation of a service group, as described above with reference to FIG. 8.

At step 2604, user device 302 can determine the most common features of the accessories in the service group. For example, home application 304 can determine that a particular feature is the most common feature when the particular feature is provided by more accessories in the service group than any other feature. For example, if the service group has two lights that both have dimmer features but only one light has a color feature, the dimmer feature is the most common feature because the dimmer feature is provided by two lights and the color feature is only provided by one light.

At step 2606, user device 302 can present a service group control corresponding to the most common feature. Continuing the example described at step 2608, home application 304 can present a service group control for the dimmer feature because the dimmer feature is the most common feature between the two lights. In some implementations, home application 304 may present multiple controls for a service group. For example, home application 304 can present controls for the most common features of the service group first, followed by controls for the next most common features, followed by controls for the least common features (e.g., the color feature described above), as described above with reference to FIGS. 9-9.

At step 2608, user device 302 can receive user input adjusting a service group control setting. For example, home application 304 can receive user input adjusting the dimmer control setting of the lights described above.

At step 2610, user device 302 can send the adjusted control setting to corresponding accessories in the service group. For example, home application 304 can send the adjusted dimmer control setting to each of the lights described above. If the user has provided input to adjust a color control setting, home application 304 can send the adjusted color control setting to only the light that has the color feature described above.

While process 2600 selects and/or presents service group controls based on which features are most common within the service group, other service group control selection and/or presentation criteria can be used to determine which service group control to present and/or how to present service group controls. For example, home application 304 can select a service group control or order the presentation of service group controls based on which service group control (e.g., feature) is most frequently used or selected by the user. As another example, home application 304 can select a service group control or order the presentation of service group controls based on which service group control (e.g., feature) is associated with a live media feed (e.g., live audio and/or video feed), as described above. Thus, home application 304 can intelligently present service group controls for a heterogeneous group of accessories.

Figure 27:
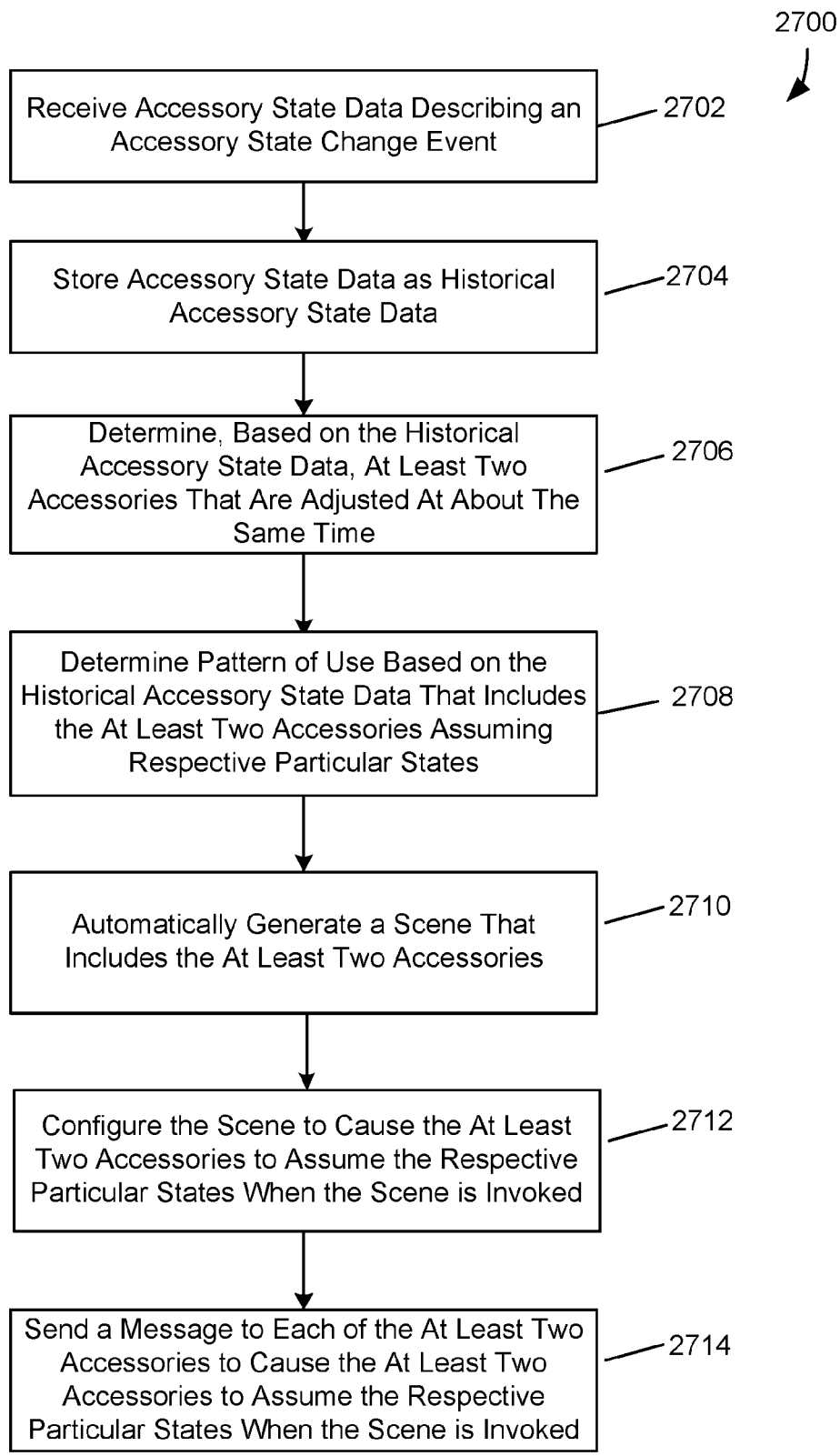
FIG. 27 is a flow diagram of an example process for automatically generating a scene.

FIG. 27 is a flow diagram of an example process 2700 for automatically generating a scene. For example, home application 304 can automatically generate an scene based on historical accessory state change data that indicates that two or more accessories typically change state at about the same time and that the states into which each respective accessories changes is repeated in the historical state change data, as discussed above with reference to FIG. 4 above. Process 2700 can be performed by home application 304 periodically (e.g., based on a time interval). Process 2700 can be performed by home application 304 in response to receiving accessory state change data from an accessory. Process 2700 can be performed by home application 304 in response to the user initiating the creation of a new scene. For example, home application 304 can perform process 2700 to suggest a new scene to the user in response to the user selecting graphical element 606 or graphical element 607 of FIG. 6.

At step 2702, user device 302 can receive accessory state change data describing an accessory state change event. For example, home application 304 can, over time, can receive accessory state change events from various accessories that describe accessory state changes that occur at different points in time. The accessory state change data can include an identifier for the accessory reporting the state change event, a timestamp indicating when the state change occurred, and the new state of the accessory, for example.

At step 2704, user device 302 can store the accessory state change data as historical accessory state data. For example, home application 304 can store the accessory state change data received at step 2702 in accessory state database 308.

At step 2706, user device 302 can determine, based on the historical accessory state data, at least two accessories that are adjusted at about the same time. For example, home application 304 can search through accessory state database to find clusters or groupings of accessories that change state at about the same time. Home application 304 can, for example, identify groups of accessories that change states at about the same time (e.g., within 5 minutes, within 7 minutes, etc.) and where the state changes are related to user-facing features (e.g., on/off, dimmer level, speed, volume, etc.) and not related to accessory configuration settings, error states, and the like. Stated differently, home application 304 can identify state changes that are relevant or related to how the user uses the accessory when determining which accessories are adjusted at about the same time.

At step 2708, user device 302 can determine a historical pattern of use based on the historical accessory state data that includes at least two accessories assuming respective particular states repeatedly over time. For example, after identifying accessories that change states at about the same time, home application 304 can determine whether a historical pattern of state changes exists in accessory state database 308 for the identified accessories. For example, if the group of accessories identified at step 2706 only occurs once in database 308, then there is no historical pattern of use and home application 304 can attempt to identify another service group. If the group of accessories identified at step 2706 appear together (e.g., temporally) many times (e.g., at least 10 times) in database 308, then home application 304 can determine that a pattern of use exists that indicates the identified accessories are related.

In some implementations, home application 304 can determine that the related accessories are suitable for a scene when the related accessories assume the same state values repeatedly over time. For example, if a historical pattern of use exists in database 308 indicating that when air conditioner controller 412, smart fan 418, streaming media device 414, and smart television 416 are used together (e.g., their states change at about the same time), air conditioner controller 412 is set to 60 degrees, smart fan 418 is set to medium speed, streaming media device 414 is turned on, and smart television 416 is set to the input for streaming media device 414, home application 304 can determine that air conditioner controller 412, smart fan 418, streaming media device 414, and smart television 416 are suitable for a scene.

At step 2710, user device 302 can automatically generate a scene that includes the at least two accessories. For example, when home application 304 determines that air conditioner controller 412, smart fan 418, streaming media device 414, and smart television 416 are suitable for a scene, home application 304 can automatically generate a new scene that includes air conditioner controller 412, smart fan 418, streaming media device 414, and smart television 416.

At step 2712, user device 302 can configure the scene to cause the at least two accessories to assume the respective particular states when the scene is invoked. For example, home application 304 can configure the scene with state values for air conditioner controller 412, smart fan 418, streaming media device 414, and smart television 416 corresponding to the state values for each accessory repeatedly observed in database 308. For example, home application 304 can configure the scene so that air conditioner controller 412 has a scene setting of '60 degrees,' smart fan 418 has a scene setting of 'medium speed,' streaming media device 414 has a scene setting of 'on,' and smart television 416 has a scene setting corresponding to the television input for streaming media device 414.

At step 2714, user device 302 can send a message to each of the at least two accessories to cause the at least two accessories to assume the respective particular states when the scene is invoked. For example, home application 304 can receive user input invoking or selecting the scene, as described above with reference to FIG. 20. In response to receiving the selection of the scene, home application 304 can send a message to each of the accessories associated with the scene to cause the accessories to change their states to the respective scene settings for each accessory. For example, home application 304 can send the scene setting '60 degrees' to air conditioner controller 412 to cause air conditioner controller 412 to set the air conditioner to 60 degrees. Home application 304 can send the scene setting 'medium speed' to smart fan 418 to cause smart fan 418 to set the fan speed to medium. Home application 304 can send the scene setting 'on' to streaming media device 414 to turn streaming media device 414 on. Home application 304 can send the scene setting specifying the television input for streaming media device 414 to smart television 416 to cause smart television 416 to turn on and set the television input to streaming media device 414. Thus, home application 304 can automatically generate scenes for the user based on the user's behavior as evidenced by the historical pattern of accessory use recorded in database 308.

Figure 28:
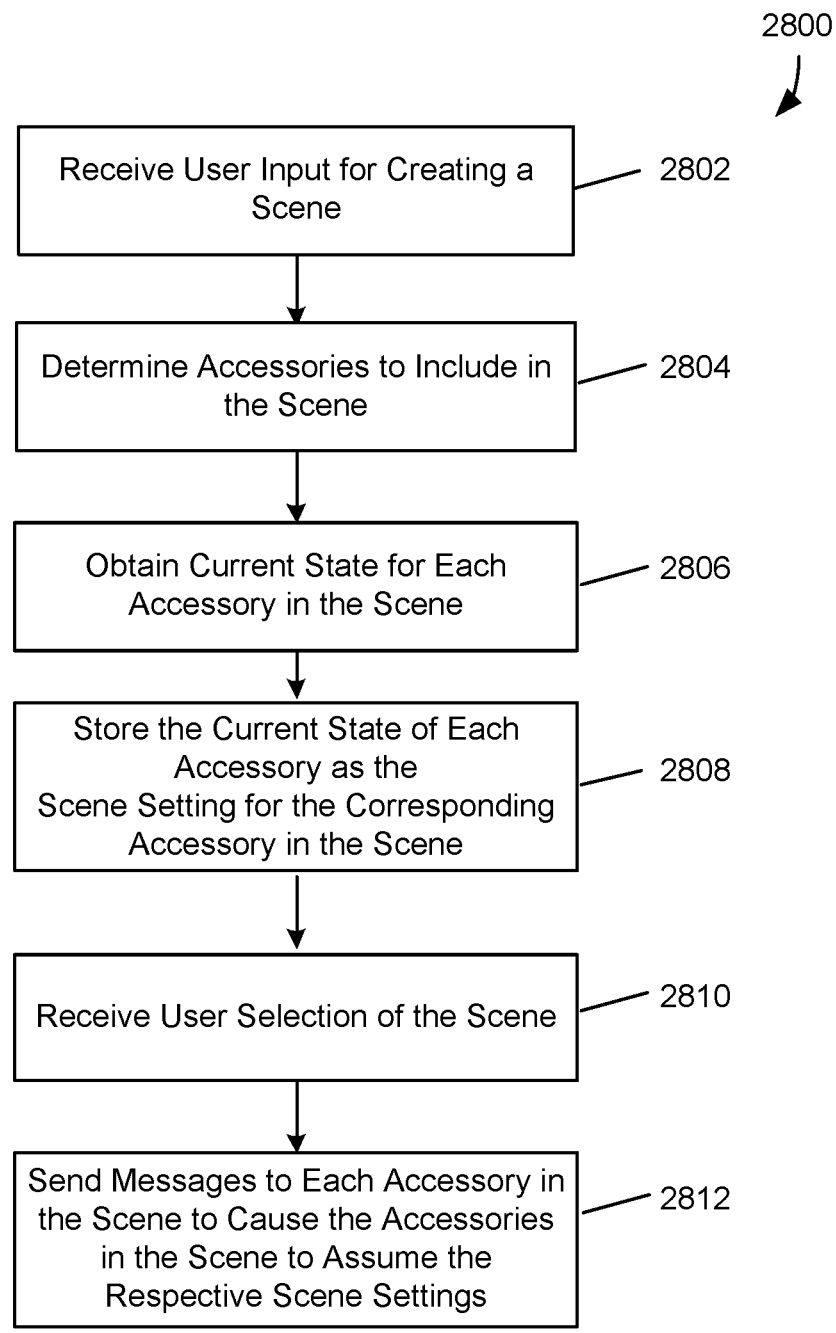
FIG. 28 is a flow diagram of an example process for creating a scene from a snapshot of accessory states.

FIG. 28 is a flow diagram of an example process 2800 for creating a scene from a snapshot of accessory states. For example, home application 304 can obtain a snapshot of current accessory states to configure scene settings for accessories associated with a scene using process 2800 and as described above with reference to FIG. 19.

At step 2802, user device 302 can receive user input for creating a scene. For example, home application 304 can determine that the user wishes to create a new scene when the user selects graphical element 606 or graphical element 607 of FIG. 6.

At step 2804, user device 302 can determine which accessories to include in the scene. For example, home application 304 can determine which accessories to include in the scene based on user input selecting accessories for the scene, as described above with reference to FIG. 19. Home application 304 can automatically determine which accessories to include in the scene (e.g., in response to the user's selection of graphical element 607) based on the most recent grouping of related accessories in database 308, as described above with reference to FIG. 19. After determining the accessories for the scene, home application 304 can associate the accessories with the scene.

At step 2806, user device 302 can obtain the current state for each accessory in the scene. For example, after associating accessories with the scene, home application 304 can determine the current state of each accessory associated with the scene. In some implementations, home application 304 can send a message to each accessory associated with the scene requesting the current state of the accessory. Each accessory can respond to the request with its current state. Alternatively, home application 304 can obtain the current state of each accessory associated with the scene from accessory state database 308.

At step 2808, user device 302 can store the current state of each accessory as the scene setting for the corresponding accessory in the scene. For example, if the scene includes two lights and a fan and the two lights are currently off and the fan is currently at high speed, then home application 304 can store the 'off' state as the scene setting for the two lights and the 'high' speed state as the scene setting for the fan. Thus, home application 304 can configure a scene using a snapshot of the current states of each accessory associated with the scene.

At step 2810, user device 302 can receive user input selecting the scene. For example, home application 304 can receive user input selecting graphical element 2002 of FIG. 20.

At step 2812, user device 302 can send message to each accessory in the scene to cause the accessories in the scene to assume the respective scene settings. For example, if the scene includes the two lights and the fan described above, home application 304 can send a message to each of the lights indicating that the lights should turn off and a message to the fan indicating that the fan should operate at 'high' speed. In response to receiving the messages, both lights can turn off and the fan can adjust its speed setting so that it operates at high speed.

Figure 29:
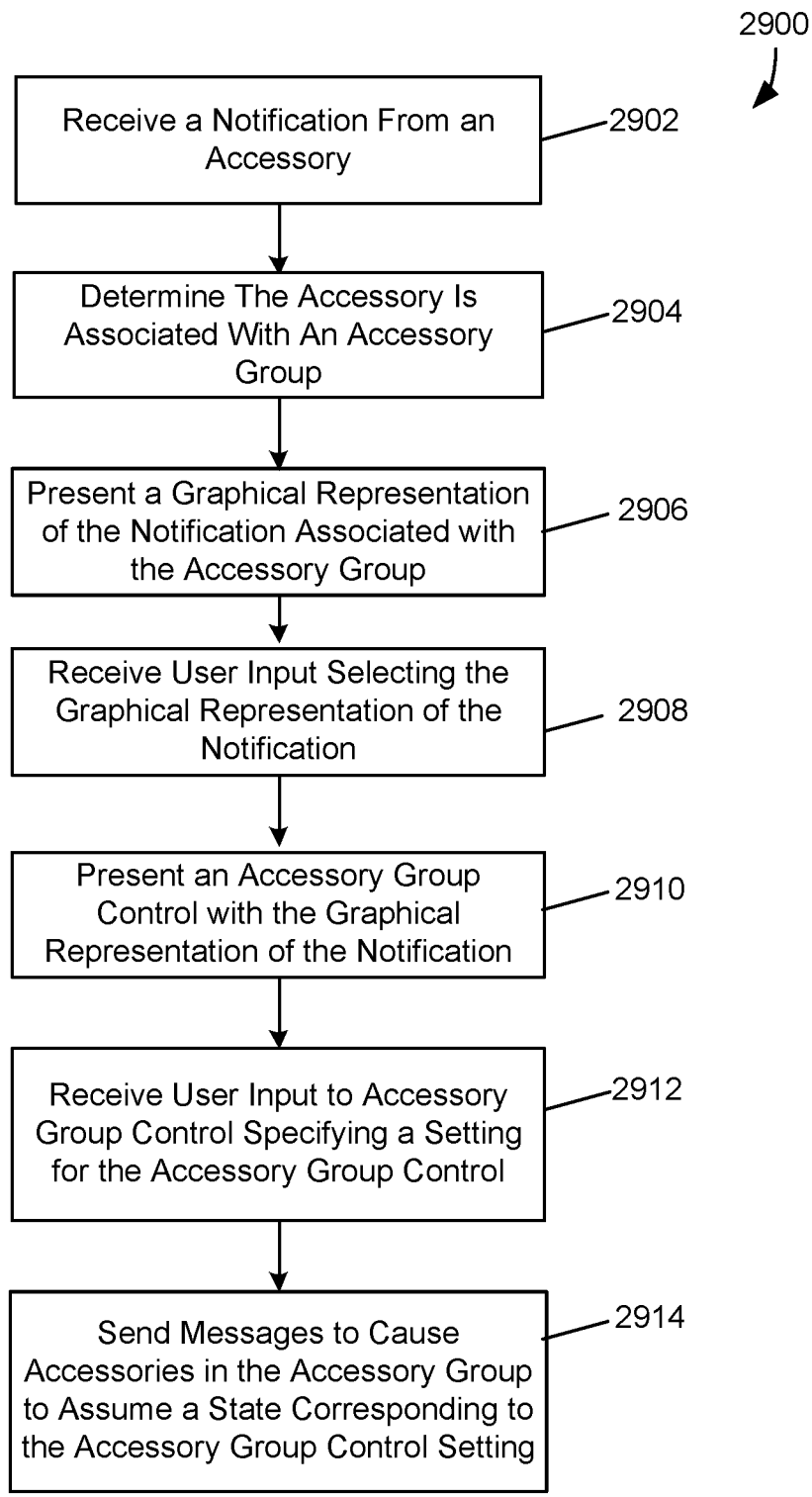
FIG. 29 is a flow diagram of an example process for presenting service group notifications.

FIG. 29 is a flow diagram of an example process 2900 for presenting service group notifications. For example, home application 304 can perform process 2900 to present a service group notification in response to receiving a state change event or notification from an accessory associated with a service group managed by home application 304. In some implementations, a service group notification can present service group controls so that the user can control the service group from the notification without having to invoke a graphical user interface of home application 304, as described above with reference to FIG. 17, FIG. 18A, and FIG. 18B.

At step 2902, user device 302 can receive a notification from an accessory. For example, some accessories can be configured to send notifications to home application 304 and/or user device 302. In some implementations, notifications can be different than state change event messages. For example, while state change messages are sent to home application 304 whenever an accessory's state changes so that home application 304 can monitor the states of the various accessories managed by home application 304, accessories may only send notifications when an event occurs that requires the user's attention. Alternatively, home application 304 can monitor state change events and determine when a state change event should be presented as a notification to the user on a display of user device 302. Thus, when doorbell 406 is actuated by a visitor to the user's house, doorbell 406 can send a notification to home application 304 and/or user device 302 so that home application 304 and/or user device 302 can present a notification to the user indicating that a visitor is at the front door.

At step 2904, user device 302 can determine that the accessory sending the notification is associated with a service group. For example, home application 304 can obtain an accessory identifier from the notification sent by the accessory. Home application 304 can determine that the accessory identifier corresponds to an accessory associated with a service group. For example, home application 304 can determine that doorbell 406 is associated with the "Front Door Security" group as described above because home application stores data identifying each accessory assigned to a service group.

In some implementations, user device 302 can obtain information from other accessories in the service group when a notification associated with a service group is received. For example, user device 302 can obtain image data from the camera associated with the "Front Door Security" group and/or cause the light associated with the "Front Door Security" group to turn on.

At step 2906, user device 302 can present a graphical representation of the notification associated with the service group. For example, home application 304 can present a graphical representation (e.g., graphical element 1702 of FIG. 17) of the notification on a display of user device 302. The graphical representation of the notification can identify the service group associated with the accessory that sent the notification, identify an event that triggered the notification (e.g., the doorbell being rung), and prompt the user to interact with the graphical representation of the notification to invoke one or more controls associated with the identified service group.

At step 2908, user device 302 can receive user input selecting the graphical representation of the notification. For example, home application 304 can receive user input (e.g., a tap, long touch, pressure touch, etc.) selecting the graphical representation of the notification.

At step 2910, user device 302 can present a service group control with the graphical representation of the notification. For example, in response to receiving the selection of the graphical representation of the notification at step 2908, home application 304 can select and present a service group control, as described above with reference to FIG. 18A and FIG. 18B. For example, when the user selects the graphical representation of the "Front Door Security" group doorbell notification, home application 304 can present a camera control and/or lock control for the camera and lock accessories associated with the "Front Door Security" service group.

At step 2912, user device 302 can receive user input to the service group control specifying a setting for the service group control. For example, home application 304 can receive user input to the camera control for turning on the camera and initiating a video feed from the camera. Home application 304 can receive user input to the lock control for unlocking the lock.

At step 2914, user device 302 can send messages to accessories in the service group to cause accessories in the service group to assume a state corresponding to the service group control setting. For example, home application 304 can send a message to the camera accessory to cause the camera to turn on and initiate a video feed. Home application 304 can send a message to the lock accessory to cause the lock to unlock.

Figure 30:
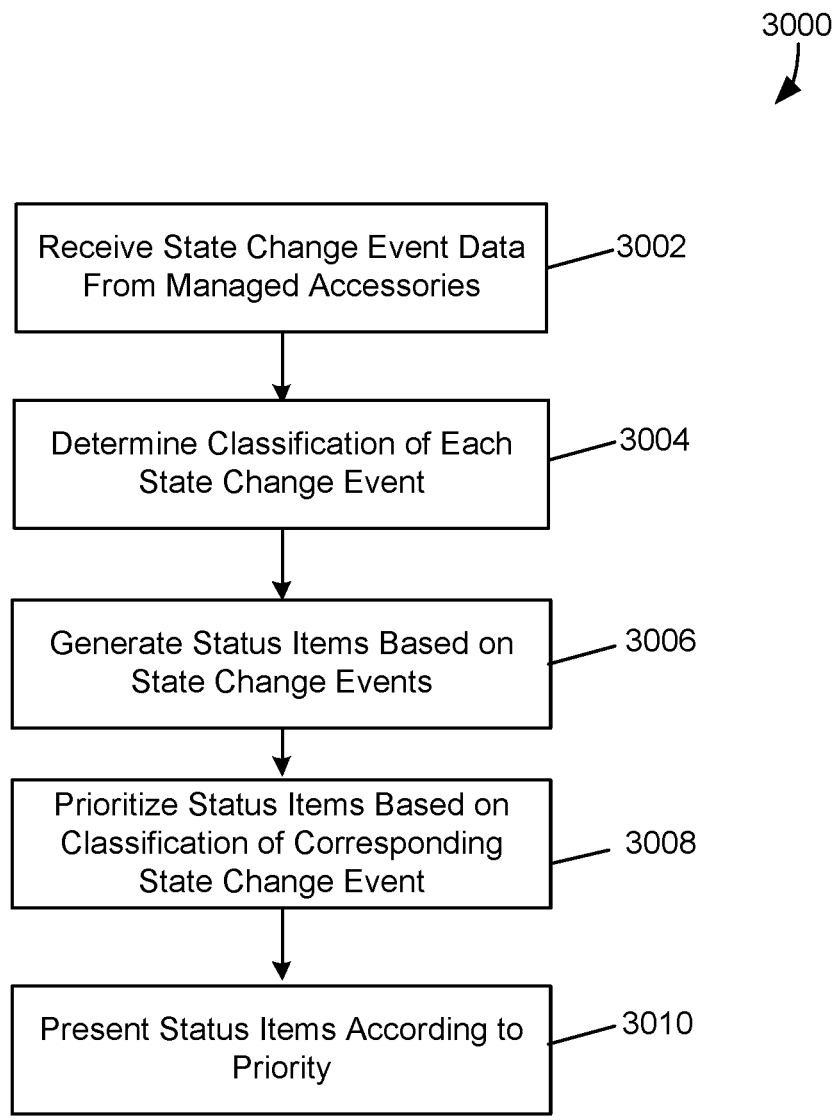
FIG. 30 is a flow diagram of an example process for presenting accessory state information.

FIG. 30 is a flow diagram of an example process 3000 for presenting accessory state information. For example, home application 304 can present accessory state information on a display of user device 302 according to process 3000 and as described with reference to FIG. 21A, FIG. 21B, and FIG. 22 above.

At step 3002, user device 302 can receive state change event data from accessories managed by user device 302. For example, home application 304 and/or home daemon 305 can receive data describing state change events from accessories configured in, paired with, connected to and/or managed by home application 304 and/or home daemon 305. Home application 304 and/or home daemon 305 can store the received state change information in accessory state database 308. In some implementations, home application 304 and/or home daemon 305 can maintain a repository of current accessory state information separately from or within accessory state database 308. Thus, home application 304 can quickly determine the current state of each accessory managed by home application 304 and/or home daemon 305.

At step 3004, user device 302 can determine a classification of each received state change event. For example, home application 304 can classify each state change event (e.g., each item of status data) as a safety class event, a security class event, maintenance class event, administrative class event, or general class event based on a classification assigned to the event by the reporting accessory and/or based on a classification assigned to the reporting accessory, as described above.

At step 3006, user device 302 can generate status items for presentation on a display of user device 302 based on the state change events. For example, home application 304 can generate a status item for an individual event. User device 302 can generate a status item by summarizing similar events. Similar events can be determined based on the classification of the event, the type of accessory reporting the event, and/or the location of the accessory. For example, if five accessories are turned on in the user's bedroom, home application 304 can generate a status item "5 accessories on in bedroom." In some implementations, home application 304 can filter accessory change events based on a role assigned to the user of user device 302. For example, home application 304 may only generate status items for display on the user device for state change events relevant to the user's role.

At step 3008, user device 302 can prioritize status items based on the classification of the corresponding change event. For example, home application 304 can prioritize status items associated with safety class events over status items associated with security class events. Home application 304 can prioritize status items associated with security class events over status items associated with maintenance class events, as described above with reference to FIGS. 21A-20B.

At step 3010, user device 302 can present status items according to the priority determined at step 3008. For example, home application 304 can present higher priority status items above lower priority status items, as described with reference to FIGS. 21A-20B. Home application 304 can prefer higher priority status items over lower priority status items. For example, if there are too many status items and all of the status items cannot fit in the status presentation area, home application 304 can present high priority status items and filter out (e.g., not present) low priority status items.

Figure 31:
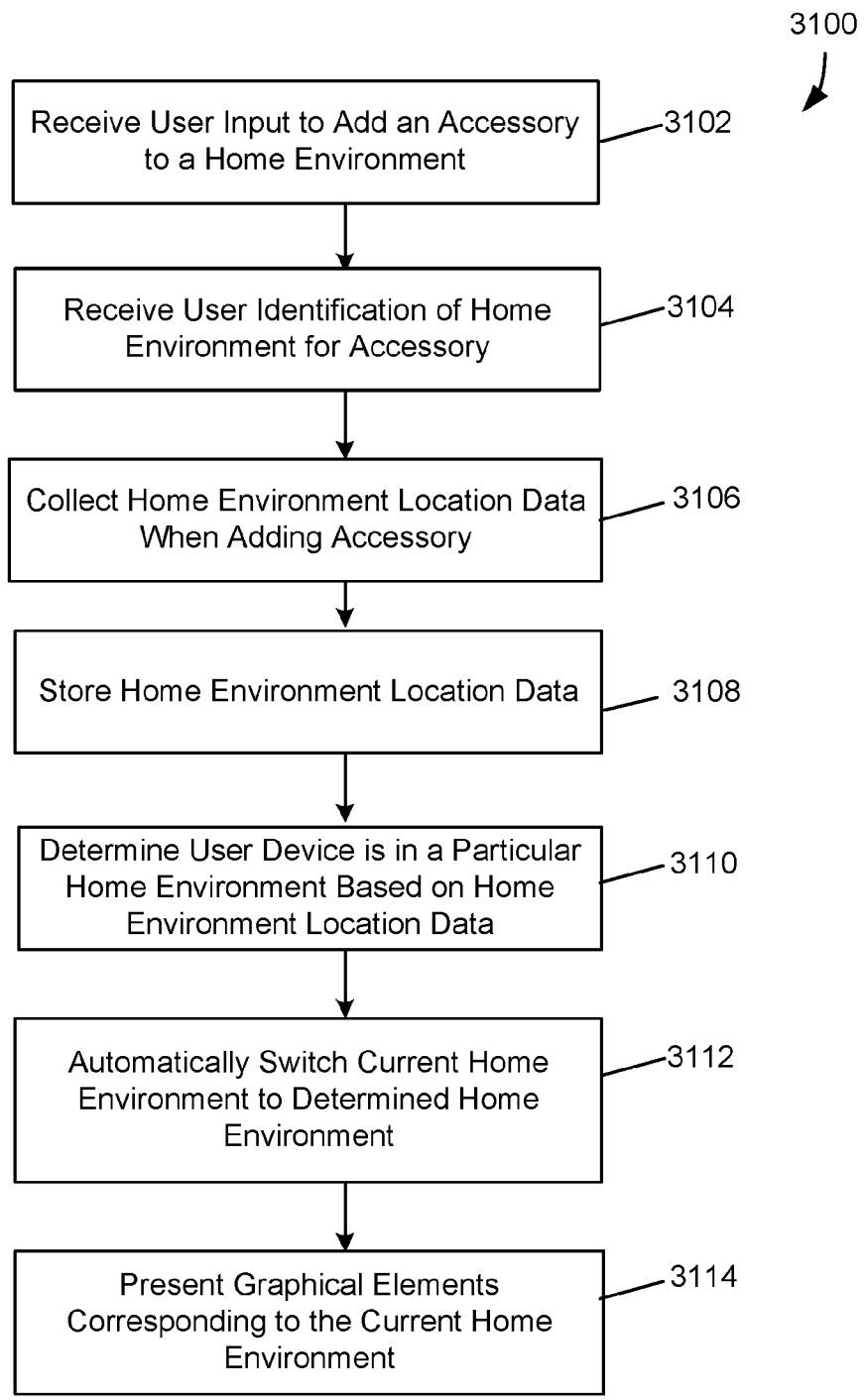
FIG. 31 is a flow diagram of an example process for automatically switching home environments in a home application.

FIG. 31 is a flow diagram of an example process 3100 for automatically switching home environments in home application 304. For example, home application 304 may present graphical elements, information, controls, etc., for only one home environment at a time. The user can switch the current home environment presented by home application by providing user input selecting or identifying which home environment should be the current home environment presented by home application 304, as described above with reference to FIG. 23. In some implementations, home application 304 can perform process 3100 to automatically change the current home environment presented by home application 304 based on detecting that user device 302 has entered a home environment that is different than the current home environment, as described with reference to FIG. 24 above. Thus, home application 304 can anticipate the needs of the user by loading and presenting data corresponding to the home environment in which the user (e.g., user device) is currently located.

At step 3102, user device 302 can receive user input indicating that the user wishes to add an accessory to a home environment. For example, home application 304 can receive a user selection of graphical element 603 of FIG. 6. In response to receiving the user input, home application 304 can present graphical user interfaces (not shown) for adding and/or configuring the new accessory in a home environment.

At step 3104, user device 302 can receive user input identifying a home environment for the accessory. For example, the user can select a home environment before step 3102 by selecting a current home environment for home application 304. The user can select a home environment after step 3102 while configuring the accessory in home application 304, for example.

At step 3106, user device 302 can collect home environment location data when adding the accessory. For example, after adding the accessory and identifying the home environment for the accessory, home application 304 can collect home environment location data. The home environment location data can include geographical location data corresponding to the current geographical location of user device 302, wireless access point identification data, and/or accessory identification data. User device 302 can generate a geofence based on the geographical location data and add it to the collected home environment location data.

At step 3108, user device 302 can store the home environment location data. For example, home application 304 can send the home environment location data to home daemon 305. Home daemon 305 can store the home environment location data in metadata associated with home application 304 and/or share the home environment location data with other user devices, controllers, coordinators, etc., that connect to home daemon 305.

At step 3110, user device 302 can determine that user device 302 is in a particular home environment based on the home environment data. For example, sometime later, home application 304 can determine the current geographical location of user device 302. Home application 304 can compare the current geographical location of user device 302 with the geographical locations stored for the home environments managed by home application 304 and determine that user device 302 and, therefore, the user, is in a particular home environment when the current location of user device 302 is within a geofence defined for the particular home environment.

Similarly, home application 304 can determine that user device 302 is connected to a particular wireless access point corresponding to a particular wireless access point identifier. Home application 304 can compare the particular wireless access point identifier with the wireless access point identifiers stored for the home environments managed by home application 304 and determine that user device 302 and, therefore, the user, is in a particular home environment when the particular wireless access point identifier corresponds to the wireless access point identifier associated with the particular home environment.

At step 3112, user device 302 can automatically switch the current home environment presented by home application 304 to the determined home environment. For example, if the particular home environment determined at step 3110 is different than the current home environment of home application 304, home application 304 can switch the current home environment to correspond to the particular home environment determined at step 3110.

At step 3114, user device 302 can present graphical elements corresponding to the current home environment. For example, home application 304 can present graphical elements, accessory information, accessory controls, service group controls, scenes, etc., corresponding to the particular home environment on a display of user device 302.

Figure 32:
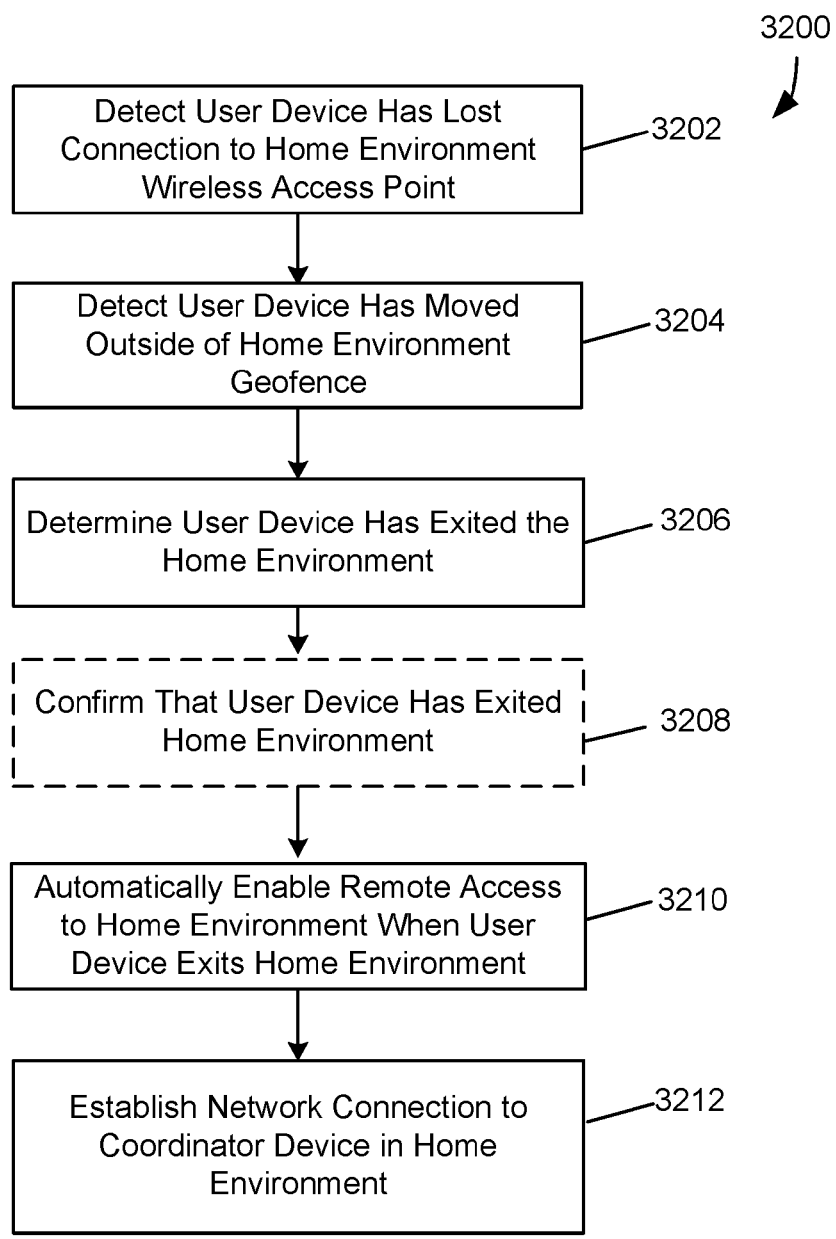
FIG. 32 is a flow diagram of an example process for automatically enabling remote access to a home environment in a home application.

FIG. 32 is a flow diagram of an example process 3200 for automatically enabling remote access to a home environment in home application 304. For example, home application 304 running on user device 302 can perform process 3200 to automatically enable remote access to a home environment in response to detecting that user device 302 has exited the home environment.

At step 3202, user device 302 can detect that user device 302 has lost a connection to a wireless access point in a home environment. For example, home application 304 may use the wireless access point connection as a basis for determining that user device 302 is in the home environment. Thus, when the connection to the wireless access point is lost, home application may determine that user device 302 is no longer located within the home environment. However, if user device 302 can determine the current geographical location of user device 302, user device 302 may use a geofence associated with the home environment to determine when user device 302 exits the home environment.

At step 3204, user device 302 can detect that user device 302 has moved outside of a geofence defined for the home environment. For example, if user device 302 can determine the current geographical location of user device 302, user device 302 may use the geofence associated with the home environment to determine when user device 302 exits the home environment. For example, home application 304 can determine that the current geographical location of user device 302 corresponds to a geographical location outside of the geofence defined for the home environment.

At step 3206, user device 302 can determine that user device 302 has exited the home environment. For example, home application 304 can determine that user device 302 has exited the home environment when home application 304 detects that the connection to the home environment wireless access point is lost. Home application 304 can determine that user device 302 has exited the home environment when home application 304 detects that the current geographical location of user device 302 is outside of the geofence defined for the home environment.

At step 3208, user device 302 can confirm that user device 302 has exited the home environment. For example, when user device 302 cannot determine its current geographical location, home application 304 can determine that user device 302 has exited a home environment when user device 302 loses its connection to the wireless access point in the home environment. However, user device 302 may lose its connections for reasons unrelated to exiting the home environment, as described above. Thus, home application 304 can confirm that user device 302 has moved out of the home environment by analyzing motion data generated by user device 302 to confirm whether user device 302 has actually, physically moved out of the home environment, as described above.

At step 3210, user device 302 can automatically enable remote access to the home environment. For example, upon determining and/or confirming that user device 302 has exited the home environment, home application 304 can enable remote access to the home environment so that the user can continue to view accessory information and/or control accessories within the home environment even when outside of the home environment.

At step 3212, user device 302 can automatically establish a network connection to a coordinator in the home environment. For example, upon enabling remote access, home application 304 can establish a network connection (e.g., through the internet) to a coordinator device within the home environment so that home application 304 can receive accessory status information and/or send accessory control messages to the accessories within the home environment even when outside of the home environment.

Many of the features and technologies disclosed above are described as being performed by home application 304. However, many of the features, processes, algorithms, analyses, etc., described above may be performed by home daemon 305. For example, features that can be performed in the background on user device 302 might be performed by home daemon 305 instead of home application 304. Some examples, of these features include analyzing accessory state database 308 to determine patterns of use to automatically generate service groups, scenes, and the like. Another example might include determining home application status.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers, smart phones, and wearable devices (e.g., a smart watch, smart glasses, etc.). One or more of these electronic devices can include a touch-sensitive surface and/or pressure sensitive surface. The touch-sensitive surface can process multiple simultaneous points of input, including processing data related to the pressure, degree or position of each point of input. Such processing can facilitate gestures with multiple fingers, including pinching and swiping. Such processing can facilitate distinguishing types of inputs based on length of touch and pressure applied so that different responses, operations, and/or features can be provided based on the type of touch input. Thus, a tap, long touch, and pressure touch can all be interpreted as different types of input to illicit different types of responses from the computing devices described herein.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architectures

Figure 33:
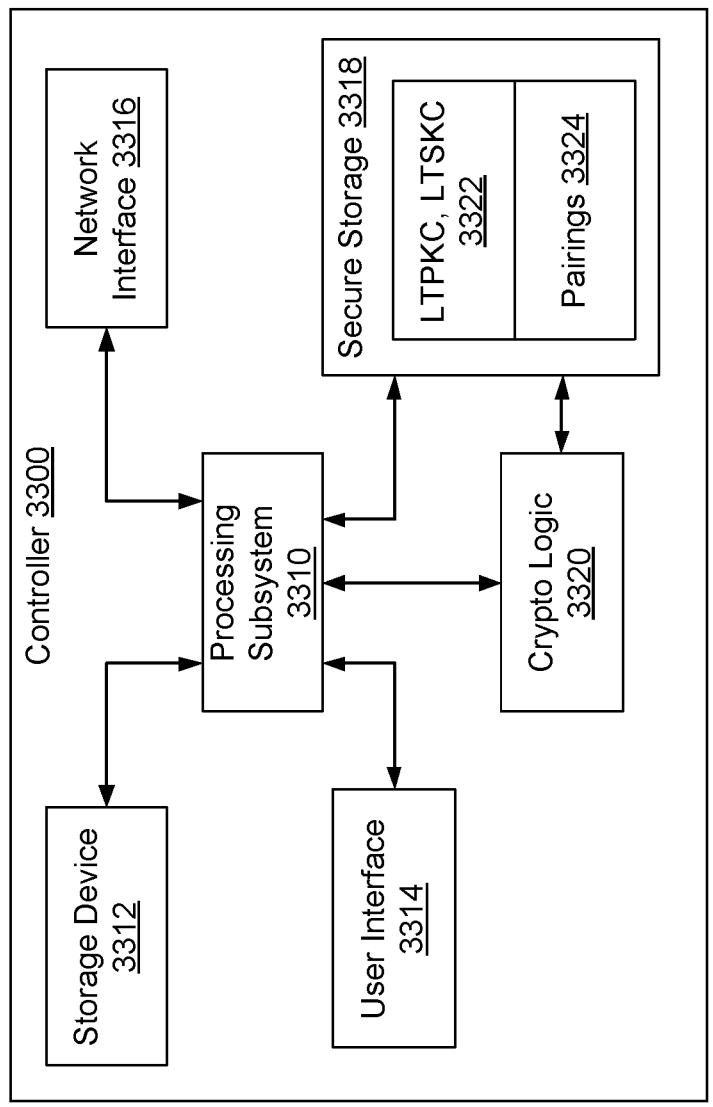
FIG. 33 shows a simplified block diagram of an example system architecture for controller 3300.

FIG. 33 shows a simplified block diagram of an example system architecture for controller 3300. Controller 3300 can implement any or all of the controller functions, behaviors, and capabilities described herein, as well as other functions, behaviors, and capabilities not expressly described. Controller 3300 can include processing subsystem 3310, storage device 3312, user interface 3314, communication interface 3316, secure storage module 3318, and cryptographic logic module 3320. Controller 3300 can also include other components (not explicitly shown) such as a battery, power controllers, and other components operable to provide various enhanced capabilities. In various embodiments, controller 3300 can be implemented in a desktop computer, laptop computer, tablet computer, smart phone, other mobile phone, wearable computing device, or other systems having any desired form factor. Further, as noted above, controller 3300 can be implemented partly in a base station and partly in a mobile unit that communicates with the base station and provides a user interface.

Storage device 3312 can be implemented, e.g., using disk, flash memory, or any other non-transitory storage medium, or a combination of media, and can include volatile and/or non-volatile media. In some embodiments, storage device 3312 can store one or more application and/or operating system programs to be executed by processing subsystem 3310, including programs to implement various operations described above as being performed by a controller. For example, storage device 3312 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 3312 can also store apps designed for specific accessories or specific categories of accessories (e.g., an IP camera app to manage an IP camera accessory or a security app to interact with door lock accessories). Storage device 3312 can also store other data produced or used by controller 3300 in the course of its operations, including trigger data objects and/or other data pertaining to an environment model.

User interface 3314 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 3314 to invoke the functionality of controller 3300 and can view and/or hear output from controller 3300 via output devices of user interface 3314.

Processing subsystem 3310 can be implemented as one or more integrated circuits, e.g., one or more single-core or multi-core microprocessors or microcontrollers, examples of which are known in the art. In operation, processing system 3310 can control the operation of controller 3300. In various embodiments, processing subsystem 3310 can execute a variety of programs in response to program code and can maintain multiple concurrently executing programs or processes. At any given time, some or all of the program code to be executed can be resident in processing subsystem 3310 and/or in storage media such as storage device 3312.

Through suitable programming, processing subsystem 3310 can provide various functionality for controller 3300. For example, in some embodiments, processing subsystem 3310 can implement various processes (or portions thereof) described above as being implemented by a controller. Processing subsystem 3310 can also execute other programs to control other functions of controller 3300, including application programs that may be stored in storage device 3312. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 3316 can provide voice and/or data communication capability for controller 3300. In some embodiments communication interface 3316 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 3316 can provide wired network connectivity (e.g., Ethernet) in addition to or instead of a wireless interface. Communication interface 3316 can be implemented using a combination of hardware (e.g., driver circuits, antennas, modulators/demodulators, encoders/decoders, and other analog and/or digital signal processing circuits) and software components. In some embodiments, communication interface 3316 can support multiple communication channels concurrently or at different times, using the same transport or different transports.

Secure storage module 3318 can be an integrated circuit or the like that can securely store cryptographic information for controller 3300. Examples of information that can be stored within secure storage module 3318 include the controller's long-term public and secret keys 3322 (LTPKC, LTSKC as described above), and a list of paired accessories 3324 (e.g., a lookup table that maps accessory ID to accessory long-term public key LTPKA for accessories that have completed a pair setup or pair add process as described above).

In some embodiments, cryptographic operations can be implemented in a cryptographic logic module 3320 that communicates with secure storage module 3318. Physically, cryptographic logic module 3320 can be implemented in the same integrated circuit with secure storage module 3318 or a different integrated circuit (e.g., a processor in processing subsystem 3310) as desired. Cryptographic logic module 3320 can include various logic circuits (fixed or programmable as desired) that implement or support cryptographic operations of controller 3300, including any or all cryptographic operations described above. Secure storage module 3318 and/or cryptographic logic module 3320 can appear as a "black box" to the rest of controller 3300. Thus, for instance, communication interface 3316 can receive a message in encrypted form that it cannot decrypt and can simply deliver the message to processing subsystem 3310. Processing subsystem 3310 may also be unable to decrypt the message, but it can recognize the message as encrypted and deliver it to cryptographic logic module 3320. Cryptographic logic module 3320 can decrypt the message (e.g., using information extracted from secure storage module 3318) and determine what information to return to processing subsystem 3310. As a result, certain information can be available only within secure storage module 3318 and cryptographic logic module 3320. If secure storage module 3318 and cryptographic logic module 3320 are implemented on a single integrated circuit that executes code only from an internal secure repository, this can make extraction of the information extremely difficult, which can provide a high degree of security. Other implementations are also possible.

Figure 34:
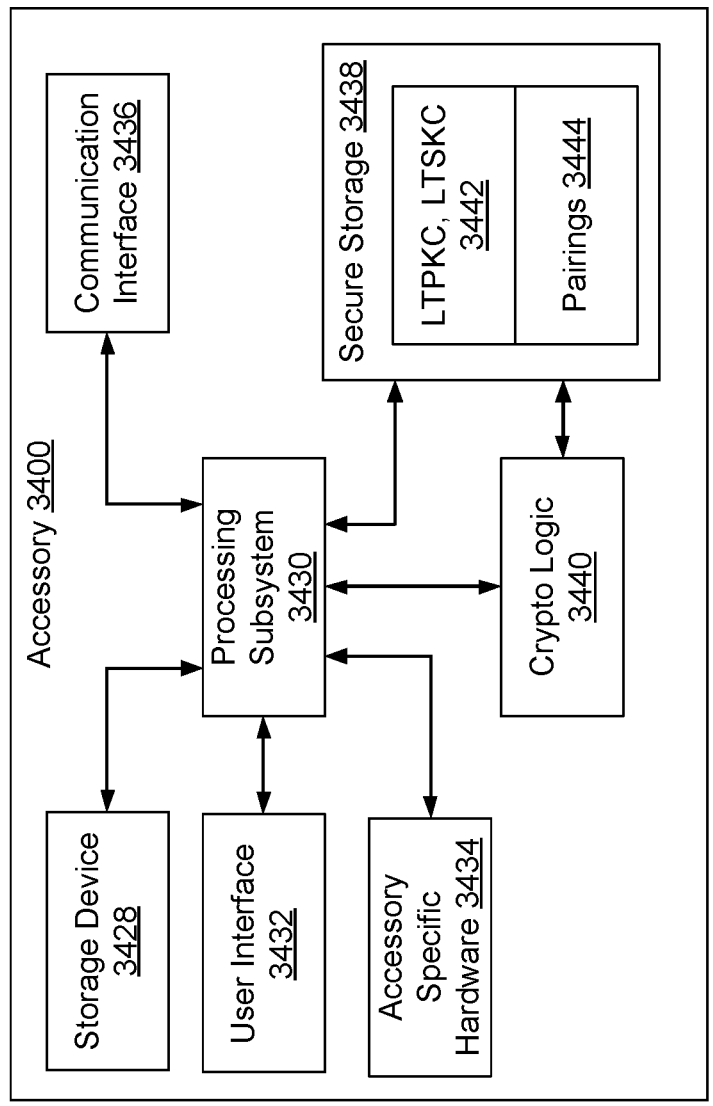
FIG. 34 shows a simplified block diagram of an example system architecture for accessory 3400.

FIG. 34 shows a simplified block diagram of an example system architecture for accessory 3400. Accessory 3400 can implement any or all of the accessory functions, behaviors, and capabilities described herein, as well as other functions, behaviors, and capabilities not expressly described. Accessory 3400 can include storage device 3428, processing subsystem 3430, user interface 3432, accessory-specific hardware 3434, communication interface 3436, secure storage module 3438, and cryptographic logic module 3440. Accessory 3400 can also include other components (not explicitly shown) such as a battery, power controllers, and other components operable to provide various enhanced capabilities.

Accessory 3400 is representative of a broad class of accessories that can be operated by a controller such as controller 3300, and such accessories can vary widely in capability, complexity, and form factor. Various accessories may include components not explicitly shown in FIG. 34, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 3428 can be implemented, e.g., using disk, flash memory, or any other non-transitory storage medium, or a combination of media, and can include volatile and/or non-volatile media. In some embodiments, storage device 3428 can store one or more programs (e.g., firmware) to be executed by processing subsystem 3430, including programs to implement various operations described above as being performed by an accessory, as well as operations related to particular accessory behaviors. Storage device 3428 can also store an accessory object or accessory definition record that can be furnished to controller devices, e.g., during device discovery as described in above-referenced U.S. application Ser. No. 14/614,914. Storage device 3428 can also store accessory state information and any other data that may be used during operation of accessory 3400.

Processing subsystem 3430 can include, e.g., one or more single-core or multi-core microprocessors and/or microcontrollers executing program code to perform various functions associated with accessory 3400. For example, processing subsystem 3430 can implement various processes (or portions thereof) described above as being implemented by an accessory, e.g., by executing program code stored in storage device 3428. Processing subsystem 3430 can also execute other programs to control other functions of accessory 3430. In some instances programs executed by processing subsystem 3430 can interact with a controller (e.g., controller 3300), e.g., by generating messages to be sent to the controller and/or receiving messages from the controller.

User interface 3432 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 3400, a user can operate input devices of user interface 3432 to invoke functionality of accessory 3400 and can view and/or hear output from accessory 3400 via output devices of user interface 3432. Some accessories may provide a minimal user interface or no user interface at all. Where the accessory does not have a user interface, a user can still interact with the accessory using a controller (e.g., controller 3300).

Accessory-specific hardware 3434 can include any other components that may be present in accessory 3400 to enable its functionality. For example, in various embodiments accessory-specific hardware 3434 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 3434 and that accessory-specific hardware can include mechanical as well as electrical or electronic components.

Communication interface 3436 can provide voice and/or data communication capability for accessory 3400. In some embodiments communication interface 3436 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 3436 can provide wired network connectivity (e.g., Ethernet) in addition to or instead of a wireless interface. Communication interface 3436 can be implemented using a combination of hardware (e.g., driver circuits, antennas, modulators/demodulators, encoders/decoders, and other analog and/or digital signal processing circuits) and software components. In some embodiments, communication interface 3436 can support multiple communication channels concurrently or at different times, using the same transport or different transports.

Secure storage module 3438 can be an integrated circuit or the like that can securely store cryptographic information for accessory 3400. Examples of information that can be stored within secure storage module 3438 include the accessory's long-term public and secret keys 3442 (LTPKA, LTSKA as described above), and a list of paired controllers 3444 (e.g., a lookup table that maps controller ID to controller long-term public key LTPKC for controllers that have completed a pair setup or pair add process as described above). In some embodiments, secure storage module 3438 can be omitted; keys and lists of paired controllers can be stored in storage device 3428.

In some embodiments, cryptographic operations can be implemented in a cryptographic logic module 3440 that communicates with secure storage module 3438. Physically, cryptographic logic module 3440 can be implemented in the same integrated circuit with secure storage module 3438 or a different integrated circuit (e.g., a processor in processing subsystem 3430) as desired. Cryptographic logic module 3440 can include various logic circuits (fixed or programmable as desired) that implement or support cryptographic operations of accessory 3400, including any or all cryptographic operations described above. Secure storage module 3438 and/or cryptographic logic module 3440 can appear as a "black box" to the rest of accessory 3400. Thus, for instance, communication interface 3436 can receive a message in encrypted form that it cannot decrypt and can simply deliver the message to processing subsystem 3430. Processing subsystem 3430 may also be unable to decrypt the message, but it can recognize the message as encrypted and deliver it to cryptographic logic module 3440. Cryptographic logic module 3440 can decrypt the message (e.g., using information extracted from secure storage module 3438) and determine what information to return to processing subsystem 3430. As a result, certain information can be available only within secure storage module 3438 and cryptographic logic module 3440. If secure storage module 3438 and cryptographic logic module 3440 are implemented on a single integrated circuit that executes code only from an internal secure repository, this can make extraction of the information extremely difficult, which can provide a high degree of security. Other implementations are also possible.

Accessory 3400 can be any electronic apparatus that interacts with controller 3300. In some embodiments, controller 3300 can provide remote control over operations of accessory 3400 as described above. For example controller 3300 can provide a remote user interface for accessory 3400 that can include both input and output controls (e.g., a display screen to display current status information obtained from accessory 3400 and an input control such as a touchscreen overlay to allow changes to the status information). Controller 3300 in various embodiments can control any function of accessory 3400 and can also receive data from accessory 3400.

It will be appreciated that the system configurations and components described herein are illustrative and that variations and modifications are possible. It is to be understood that an implementation of controller 3300 can perform all operations described above as being performed by a controller and that an implementation of accessory 3400 can perform any or all operations described above as being performed by an accessory. A proxy, bridge, tunnel, or coordinator can combine components of controller 3300 and accessory 3400, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present technologies described herein can be realized in a variety of apparatus including electronic devices implemented using any combination of circuitry and software.

Further Embodiments

While the technologies described herein have been described with respect to specific embodiments, one skilled in the art will recognize that numerous modifications are possible. Controller networks and/or accessory networks can include as many or as few devices as desired. Use of a proxy or coordinator is not required; regardless of the number of accessories or number of controllers, it is always possible (at least in principle) to establish pairings between each controller and each accessory and to have all controllers operate by controlling accessories directly. Where an accessory-network model (e.g., an environment model) is provided, each controller can obtain a copy of the model (e.g., via synchronization) and can provide access to the model through its user interface.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator.

Embodiments of the present technologies described herein can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present technologies described herein may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the technologies described herein have been described with respect to specific embodiments, it will be appreciated that the disclosure is intended to cover all modifications and equivalents within the scope of the following claims.

What is claimed is:

1. A method comprising:
receiving, by a computing device, first user input selecting a representation of a service group presented on a graphical user interface of the computing device, where the service group includes a plurality of related accessories;
in response to receiving the selection of the service group, automatically selecting, by the computing device, a first service group control to present for the service group, where the first service group control is selected from a plurality of service group controls corresponding to respective accessory features of the plurality of related accessories associated with the service group;
automatically selecting, by the computing device, a second service group control to present for the service group, where the second service group control is selected from the plurality of service group controls corresponding to the respective accessory features of the plurality of related accessories associated with the service group;
presenting, by the computing device, the first service group control on the graphical user interface of the computing device;
receiving second user input on the graphical user of the computing device, the second user input indicating a request to change to a different service group control; and
in response to the second user input, adjusting the graphical user interface of the computing device to present the second service group control on the graphical user interface of the computing device, where the first service group control and the second service group control correspond to different accessory features and where the first service group control and the second service group control can be manipulated by the user to adjust a state of two or more accessories having the different accessory features.

2. The method of claim 1, further comprising:
determining that a particular feature is most common among the accessories in the service group; and
selecting the first service group control corresponding to the particular feature based on the determination.

3. The method of claim 1, further comprising:
determining that a particular feature is most frequently used among the accessories in the service group; and
selecting the first service group control corresponding to the particular feature based on the determination.

4. The method of claim 1, further comprising:
presenting representations of each accessory associated with the service group; and
highlighting the representations of the accessories associated with the selected service group control.

5. The method of claim 1, wherein the two or more accessories include a first accessory of a first type and a second accessory of a second type that is different than the first type.

6. The method of claim 1, further comprising:
receiving user input with respect to the first service group control specifying a state for a feature corresponding to an accessory group control; and
in response to receiving the user input, sending a message to each accessory having the feature corresponding to the first service group control that causes each accessory to adjust the feature to the specified state.

7. A non-transitory computer-readable medium including one or more sequences of instructions that, when executed by one or more processors, cause:
receiving, by a computing device, first user input selecting a representation of a service group presented on a graphical user interface of the computing device, where the service group includes a plurality of related accessories;
in response to receiving the selection of the service group, automatically selecting, by the computing device, a first service group control to present for the service group, where the first service group control is selected from a plurality of service group controls corresponding to respective accessory features of the plurality of related accessories associated with the service group;
automatically selecting, by the computing device, a second service group control to present for the service group, where the second service group control is selected from the plurality of service group controls corresponding to the respective accessory features of the plurality of related accessories associated with the service group;
presenting, by the computing device, the first service group control on the graphical user interface of the computing device;
receiving second user input on the graphical user of the computing device, the second user input indicating a request to change to a different service group control; and
in response to the second user input, adjusting the graphical user interface of the computing device to present the second service group control on the graphical user interface of the computing device, where the first service group control and the second service group control correspond to different accessory features and where the first service group control and the second service group control can be manipulated by the user to adjust a state of two or more accessories having the different accessory features.

8. The non-transitory computer-readable medium of claim 7, where the instructions cause:
determining that a particular feature is most common among the accessories in the service group; and
selecting the first service group control corresponding to the particular feature based on the determination.

9. The non-transitory computer-readable medium of claim 7, where the instructions cause:
determining that a particular feature is most frequently used among the accessories in the service group; and
selecting the first service group control corresponding to the particular feature based on the determination.

10. The non-transitory computer-readable medium of claim 7, where the instructions cause:

presenting representations of each accessory associated with the service group; and highlighting the representations of the accessories associated with the selected service group control.

11. The non-transitory computer-readable medium of claim 7, wherein the two or more accessories include a first accessory of a first type and a second accessory of a second type that is different than the first type.

12. The non-transitory computer-readable medium of claim 7, where the instructions cause:

receiving user input with respect to the first service group control specifying a state for a feature corresponding to an accessory group control; and in response to receiving the user input, sending a message to each accessory having the feature corresponding to the first service group control that causes each accessory to adjust the feature to the specified state.

13. A system comprising:

one or more processors; and a non-transitory computer-readable medium including one or more sequences of instructions that, when executed by one or more processors, cause:

receiving, by a computing device, first user input selecting a representation of a service group presented on a graphical user interface of the computing device, where the service group includes a plurality of related accessories;

in response to receiving the selection of the service group, automatically selecting, by the computing device, a first service group control to present for the service group, where the first service group control is selected from a plurality of service group controls corresponding to respective accessory features of the plurality of related accessories associated with the service group;

automatically selecting, by the computing device, a second service group control to present for the service group, where the second service group control is selected from the plurality of service group controls corresponding to the respective accessory features of the plurality of related accessories associated with the service group;

presenting, by the computing device, the first service group control on the graphical user interface of the computing device;

receiving second user input on the graphical user of the computing device, the second user input indicating a request to change to a different service group control; and in response to the second user input, adjusting the graphical user interface of the computing device to present the second service group control on the graphical user interface of the computing device, where the first service group control and the second service group control correspond to different accessory features and where the first service group control and the second service group control can be manipulated by the user to adjust a state of two or more accessories having the different accessory features.

14. The system of claim 13, where the instructions cause:

determining that a particular feature is most common among the accessories in the service group; and selecting the first service group control corresponding to the particular feature based on the determination.

15. The system of claim 13, where the instructions cause:

determining that a particular feature is most frequently used among the accessories in the service group; and selecting the first service group control corresponding to the particular feature based on the determination.

16. The non-transitory computer-readable medium of claim 13, where the instructions cause:

presenting representations of each accessory associated with the service group; and highlighting the representations of the accessories associated with the selected service group control.

17. The system of claim 13, wherein the two or more accessories include a first accessory of a first type and a second accessory of a second type that is different than the first type.

18. The system of claim 13, where the instructions cause:

receiving user input with respect to the first service group control specifying a state for a feature corresponding to an accessory group control; and in response to receiving the user input, sending a message to each accessory having the feature corresponding to the first service group control that causes each accessory to adjust the feature to the specified state.

* * * * *